US012613198B2

(12) United States Patent
Namba

(10) Patent No.: US 12,613,198 B2
(45) Date of Patent: Apr. 28, 2026

(54) LAMINATED BLOCK CORRECTNESS DETERMINING METHOD

(71) Applicant: TOYOTA BOSHOKU KABUSHIKI KAISHA, Aichi-ken (JP)

(72) Inventor: Keita Namba, Nagoya (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 205 days.

(21) Appl. No.: 18/438,672

(22) Filed: Feb. 12, 2024

(65) Prior Publication Data

US 2024/0280507 A1    Aug. 22, 2024

(30) Foreign Application Priority Data

Feb. 17, 2023    (JP) ................................. 2023-023678

(51) Int. Cl.
| *G01N 21/95* | (2006.01) |
| *G01N 21/88* | (2006.01) |
| *G06T 7/00* | (2017.01) |

(52) U.S. Cl.
CPC ..... *G01N 21/9515* (2013.01); *G01N 21/8851* (2013.01); *G06T 7/0008* (2013.01); *G06T 2207/30164* (2013.01)

(58) Field of Classification Search
CPC ............ G01N 21/9515; G01N 21/8851; G06T 7/0008; G06T 2207/30164
See application file for complete search history.

(56) References Cited

U.S. PATENT DOCUMENTS

| 2017/0040850 A1* | 2/2017 | Hashimoto | ............ | H02K 15/02 |
| 2018/0358871 A1* | 12/2018 | Hasuo | .................... | H02K 15/02 |
| 2019/0089229 A1* | 3/2019 | Sameshima | .............. | H02K 1/27 |
| 2021/0194336 A1* | 6/2021 | Nagasugi | ................ | H01F 41/14 |

FOREIGN PATENT DOCUMENTS

JP        2021-72675        5/2021

* cited by examiner

*Primary Examiner* — Sang H Nguyen
(74) *Attorney, Agent, or Firm* — Greenblum & Bernstein, P.L.C.

(57)        ABSTRACT
Laminated blocks include a laminated block that has a groove formed on an outer circumferential surface of each laminated block and a laminated block that does not have the groove. A laminated block correctness determining method includes detecting presence or absence of the groove in the laminated block. The detecting presence or absence of the groove includes detecting a position of the groove when detecting the groove. The laminated block correctness determining method further includes determining whether a laminating order of the laminated blocks is correct from a detection result of the detecting presence or absence of the groove.

7 Claims, 33 Drawing Sheets

Fig.3
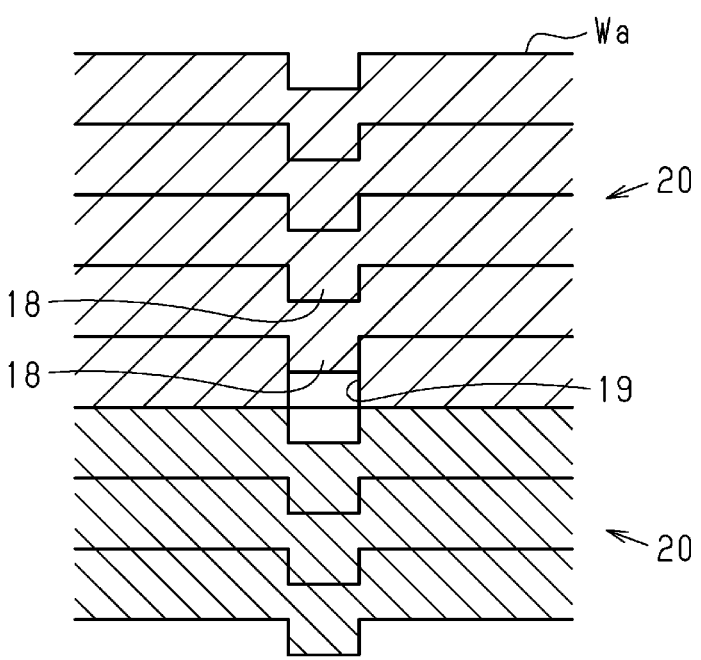
Fig.4A                    Fig.4B
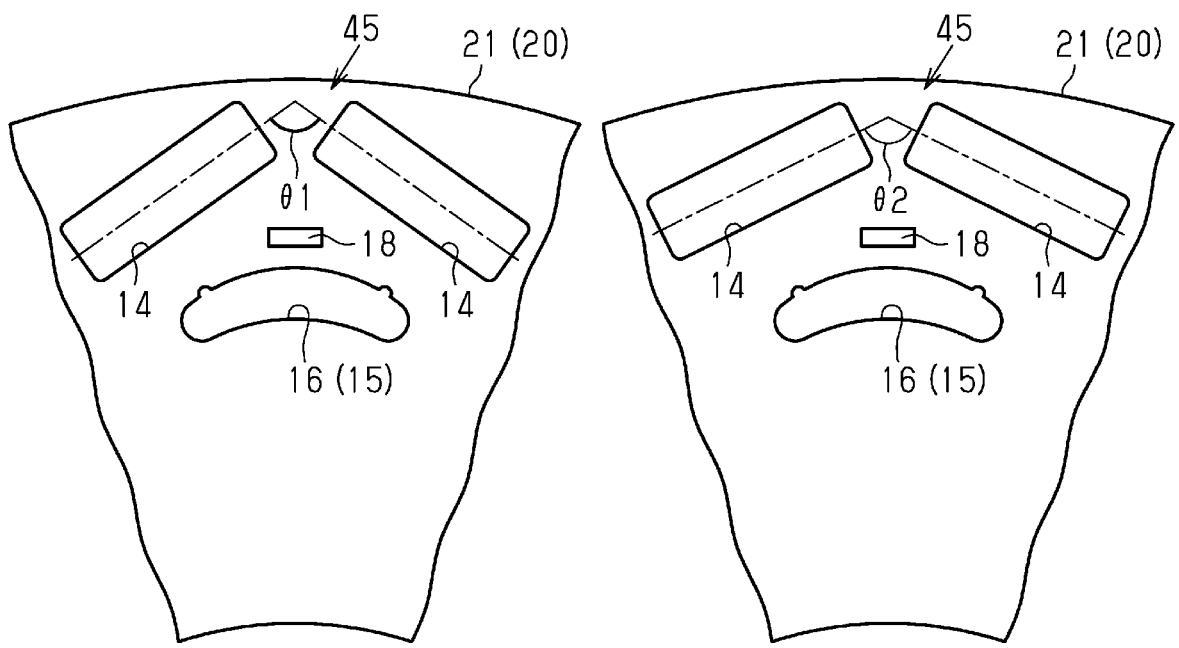

Fig.35

| Type of laminated block | Determination result of block determining step | Detection result of groove detecting step |
|---|---|---|
| 26 (20) ~33 | Not third or fourth block | Upper sensor: detected<br>Lower sensor: not detected |
| 25 (20) | Not third or fourth block | Upper sensor: not detected<br>Lower sensor: not detected |
| 24 (20) | Fourth block | — |
| 23 (20) | Third block | — |
| 22 (20) | Not third or fourth block | Upper sensor: not detected<br>Lower sensor: not detected |
| 21 (20) ~33 | Not third or fourth block | Upper sensor: not detected<br>Lower sensor: detected |

LAMINATED BLOCK CORRECTNESS DETERMINING METHOD

BACKGROUND

1. Field

The present disclosure relates to a laminated block correctness determining method.

2. Description of Related Art

Japanese Laid-Open Patent Publication No. 2021-72675 discloses a laminated iron core of a rotating electric machine that is formed by laminating laminated blocks, each including iron core pieces punched out of an electrical steel sheet.

The laminated iron core is formed by laminating laminated blocks, each having a different shape. This may cause erroneous coupling. Specifically, the laminated blocks may be laminated with an incorrect orientation (i.e., front or rear) or the laminating order of the laminated blocks may be incorrect. The erroneously-coupled laminated iron core cannot perform adequately as a motor core and is thus treated as a defective product. Thus, it is desired that erroneous coupling of laminated blocks be limited.

SUMMARY

This Summary is provided to introduce a selection of concepts in a simplified form that are further described below in the Detailed Description. This Summary is not intended to identify key characteristics or essential characteristics of the claimed subject matter, nor is it intended to be used as an aid in determining the scope of the claimed subject matter.

An aspect of the present disclosure provides a laminated block correctness determining method for determining whether a laminated block to be laminated is a correct laminated block when manufacturing a laminated iron core by laminating cylindrical laminated blocks, each including laminated iron core pieces. The laminated blocks include a laminated block that has a groove formed on an outer circumferential surface of the laminated block and a laminated block that does not have the groove. The laminated block correctness determining method includes detecting presence or absence of the groove in the laminated block. The detecting presence or absence of the groove includes detecting a position of the groove when detecting the groove. The laminated block correctness determining method further includes determining whether a laminating order of the laminated blocks is correct from a detection result of the detecting presence or absence of the groove.

Other features and aspects will be apparent from the following detailed description, the drawings, and the claims.

BRIEF DESCRIPTION OF DRAWINGS

FIG. 3 is a cross-sectional view of the dowels of the rotor core shown in FIG. 1.

FIG. 4A is a plan view showing the rotor core of a first type.

FIG. 4B is a plan view showing the rotor core of a second type.

FIG. 35 is a table illustrating determination criteria of the correctness determining step.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the modes, devices, and/or systems described. Modifications and equivalents of the modes, devices, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

An embodiment will now be described with reference to FIGS. 1 to 54.

Figure 1:
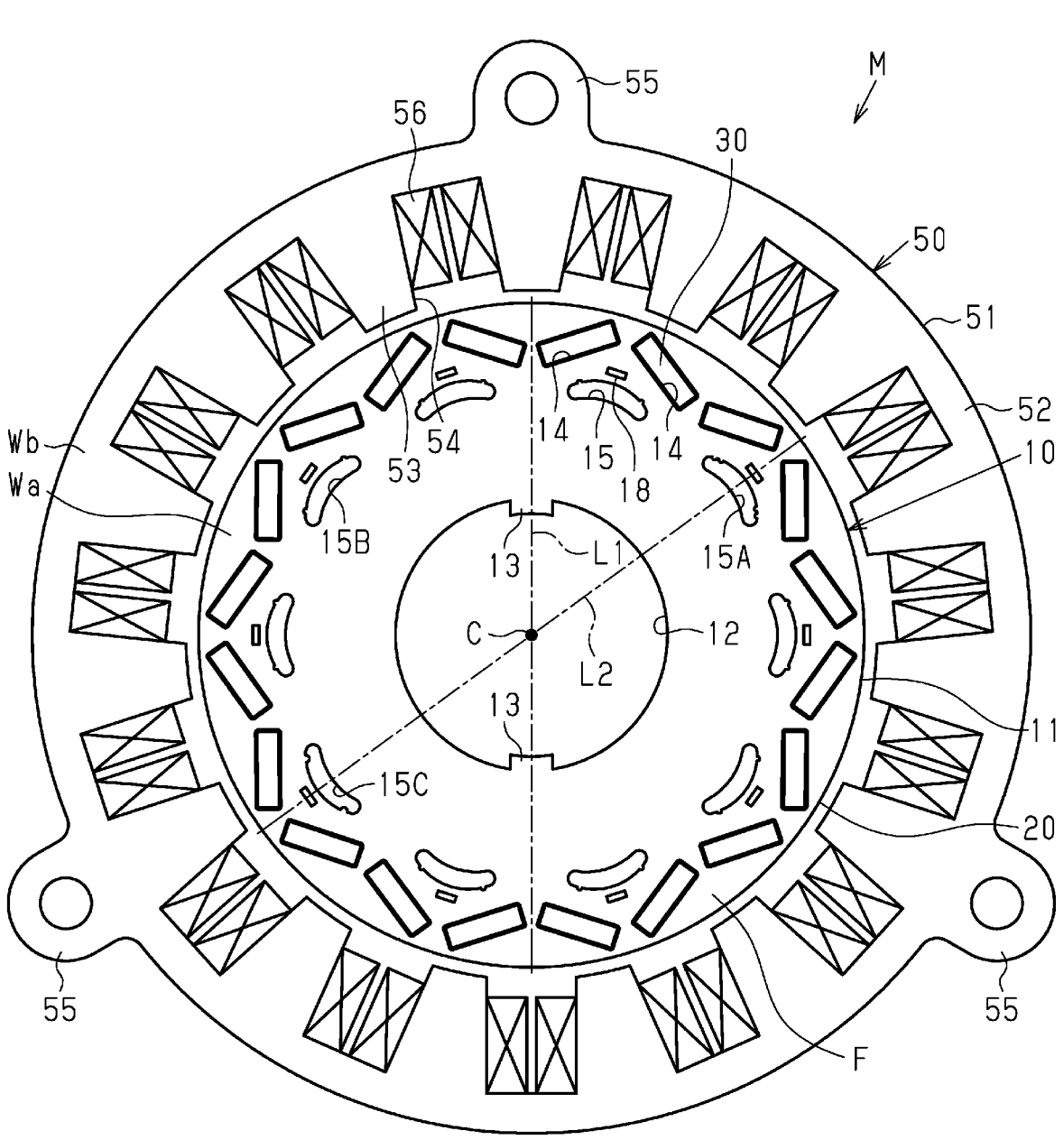
FIG. 1 is a plan view showing a rotating electric machine according to an embodiment.

As shown in FIG. 1, a rotating electric machine M includes a rotor 10 and a stator 50. Each of the rotor 10 and the stator 50 has a cylindrical shape. The stator 50 is fixed to a housing (not shown). The rotor 10 is rotatable in a central hole of the stator 50.

Rotor 10

Figure 2:
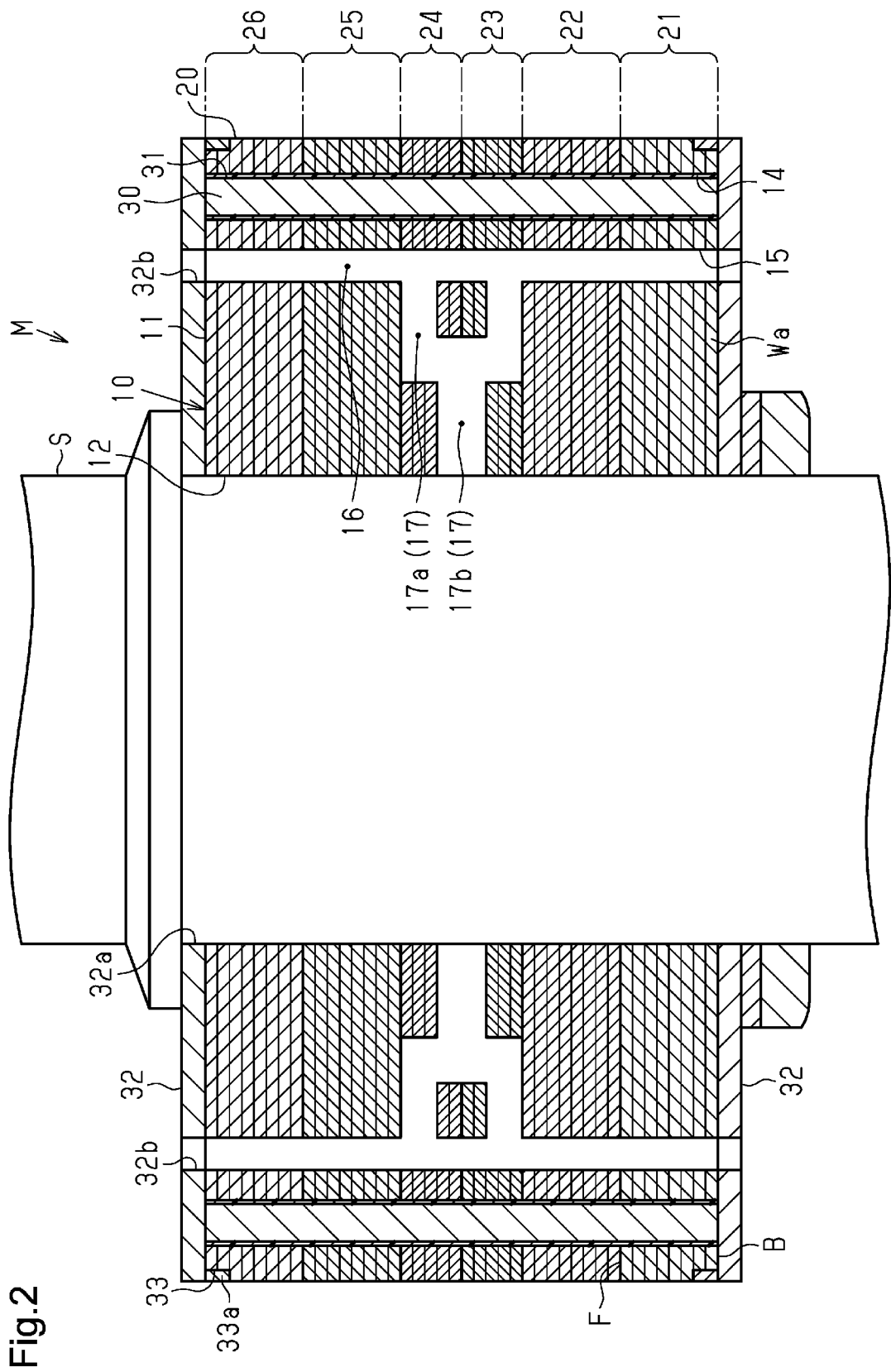
FIG. 2 is a cross-sectional view of the rotor shown in FIG. 1.

As shown in FIG. 2, the rotor 10 includes a rotor core 11, magnets 30, resin materials 31, and two end plates 32. The rotor 10 is, for example, a magnet-embedded rotor.

Rotor Core 11

The rotor core 11 has a cylindrical shape, with an axis C as its central axis. The rotor core 11 is an example of a laminated iron core.

Hereinafter, the axial direction of the rotor core 11 is simply referred to as the axial direction. The radial direction around the axis C of the rotor core 11 is simply referred to as the radial direction. The circumferential direction around the axis C of the rotor core 11 is simply referred to as the circumferential direction.

The rotor core 11 includes a central hole 12 into which a shaft S is inserted, magnet accommodating holes 14, each accommodating a corresponding magnet 30, and cooling passages 15 through which a cooling medium flows. The central hole 12, the magnet accommodating holes 14, and the cooling passages 15 extend through the rotor core 11 in the axial direction.

As shown in FIG. 1, the central hole 12 has a circular shape. Two keys 13 protrude from the inner surface of the central hole 12 and oppose each other in the radial direction. The two keys 13 are respectively fitted into key grooves (not shown) in the shaft S to restrict the rotor core 11 from moving relative to the shaft S in the circumferential direction.

The magnet accommodating holes 14 are located outward from the central hole 12 in the radial direction, and located at equal intervals in the circumferential direction. The rotor core 11 has, for example, twenty magnet accommodating holes 14. The opening of each magnet accommodating hole 14 has, for example, a substantially rectangular shape in plan view. Two magnet accommodating holes 14 adjacent to each other in the circumferential direction are inclined in opposite directions with respect to the circumferential direction. The cooling passages 15 are respectively located inward from the magnet accommodating holes 14 in the radial direction, and located at equal intervals in the circumferential direction. The rotor core 11 includes, for example, ten cooling passages 15.

As shown in FIG. 2, each cooling passage 15 includes an axial passage 16, which extends in the axial direction, and a radial passage 17, which extends in the radial direction.

The axial passage 16 extends through the rotor core 11 in the axial direction. The axial passage 16 has openings that respectively open in opposite end surfaces of the rotor core 11. Each opening has a curved shape extending generally in the circumferential direction in plan view (refer to FIG. 1).

The radial passage 17 extends radially inward from the axial passage 16 and opens in the inner circumferential surface of the central hole 12. That is, the radial passage 17 connects the axial passage 16 to the central hole 12.

The radial passage 17 includes two first passages 17a and a second passage 17b.

The two first passages 17a extend radially inward from two locations of the axial passage 16 that are spaced apart from each other in the axial direction. The radially inner ends of the two first passages 17a are connected to each other in the axial direction.

The second passage 17b extends radially inward from a portion in which the two first passages 17a are connected to each other. For example, the second passage 17b is located at a central portion of the rotor core 11 in the axial direction and extends in the radial direction. The second passage 17b opens in the inner circumferential surface of the central hole 12, and is connected to a connection hole (not shown) in the outer circumferential surface of the shaft S.

In FIG. 3 and the subsequent drawings, the cooling passages 15 may be omitted.

Laminated Block 20

The rotor core 11 is formed by axially laminating, in the axial direction, annular first iron core pieces Wa punched out of an electrical steel sheet. Specifically, the rotor core 11 is formed by laminating laminated blocks 20 in the axial direction, each including laminated first iron core pieces Wa.

As shown in FIG. 3, each first iron core piece Wa includes dowels 18 that protrude toward one side in a plate thickness direction. The dowels 18 are located at equal intervals in the circumferential direction of the first iron core piece Wa.

Adjacent ones of the first iron core pieces Wa in each laminated block 20 are coupled to each other by crimping the dowels 18 to each other. The first iron core pieces Wa, which define one end surface of each laminated block 20 in the axial direction, each have through-holes 19 that extend through the first iron core pieces Wa in the axial direction. The first iron core piece Wa with the dowel 18 is coupled to the first iron core piece Wa with the through-hole 19 by fitting the dowel 18 into the through-hole 19. In this manner, the first iron core pieces Wa of each laminated block 20 are coupled to each other so that they are integrated with each other.

The first iron core piece Wa having the through-hole 19 in each laminated block 20 is not joined to the first iron core piece Wa of another laminated block 20 that is adjacent to the laminated block 20 having the first iron core piece Wa. The dowels 18 and the through-holes 19 are located on the radially outer side of the cooling passages 15, and located between two magnet accommodating holes 14 adjacent to each other in the circumferential direction.

As shown in FIG. 2, the rotor core 11 is formed by laminating, for example, six laminated blocks 20. The six laminated blocks 20 each include the first iron core pieces Wa punched out of a single electrical steel sheet, and do not include the first iron core pieces Wa punched out of a different electrical steel sheet. This reduces the variations in thickness when the laminated blocks 20 are laminated, that is, variations in thickness of the rotor core 11 (hereinafter referred to as the lamination thickness).

Hereinafter, the first to sixth laminated blocks 20 of the six laminated blocks 20 are referred to as the first block 21, the second block 22, the third block 23, the fourth block 24, the fifth block 25, and the sixth block 26, respectively. The first block 21 is an end of the rotor core 11 in the protruding direction of the dowels 18.

The thicknesses of the first block 21, the second block 22, the fifth block 25, and the sixth block 26 in the axial direction are substantially equal to each other. The thicknesses of the third block 23 and the fourth block 24 in the axial direction are substantially equal to each other, and are smaller than the thicknesses of the other laminated blocks 20 in the axial direction.

The outer circumferential surfaces of the first block 21 and the sixth block 26 each have welding grooves 33 at intervals in the circumferential direction. The welding grooves 33 of the first block 21 are located at the end of the outer circumferential surface of the first block 21 on a side opposite to the second block 22. The welding grooves 33 of the sixth block 26 are located at the end of the outer circumferential surface of the sixth block 26 on a side opposite to the fifth block 25. The welding grooves 33 are not included in the second block 22 to the fifth block 25. That is, the rotor core 11 includes two laminated blocks 20 each having the welding grooves 33 and four laminated blocks 20 each having no welding grooves 33. The welding groove 33 is an example of a groove.

A bead 33a is created in each welding groove 33 when the rotor core 11 and the end plates 32 are welded to each other. The welding groove 33 extends across the first iron core pieces Wa, which will be described later. The welding groove 33 is continuous with an end surface of the rotor core 11 in the axial direction.

To facilitate understanding, the end surface of each laminated block 20 on one side in the axial direction is hereinafter referred to as the front surface F, and the end surface on the opposite side to the front surface F of the laminated block 20 is hereinafter referred to as the rear surface B. The surface F is an end surface of the laminated block 20 on a side opposite to the side from which the dowel 18 protrudes. The front surface F and the rear surface B do not indicate the orientation of the rotor 10 during use.

Part of the axial passage 16 extends through the first block 21, the second block 22, the fifth block 25, and the sixth block 26.

As shown in FIG. 4A, the cooling passages 15 have the same shape in plan view of the front surfaces F of the first block 21, the second block 22, the fifth block 25, and the sixth block 26.

As shown in FIG. 2, the third block 23 and the fourth block 24 each have part of the axial passage 16, one of the two first passages 17a, and part of the second passage 17b.

Figure 5:
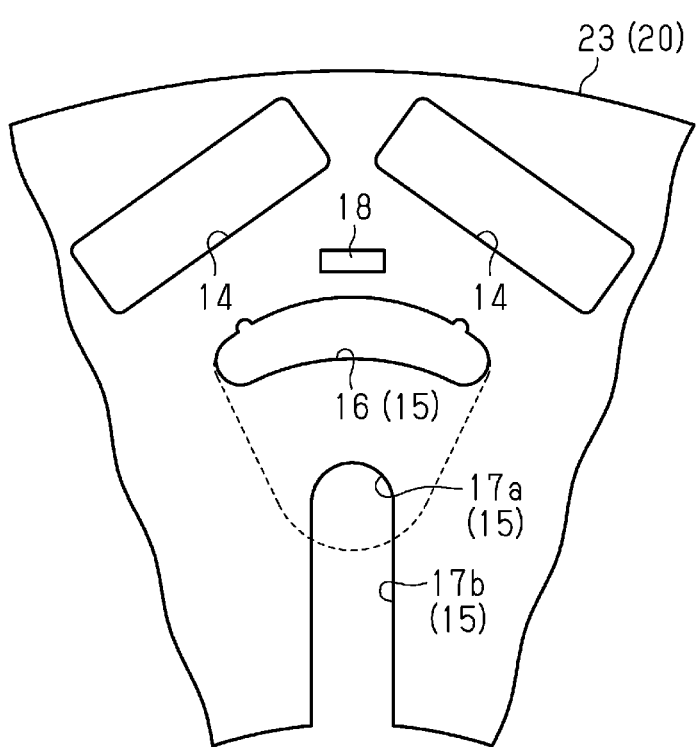
FIG. 5 is a plan view of the third block of the rotor core shown in FIG. 1.
Figure 6:
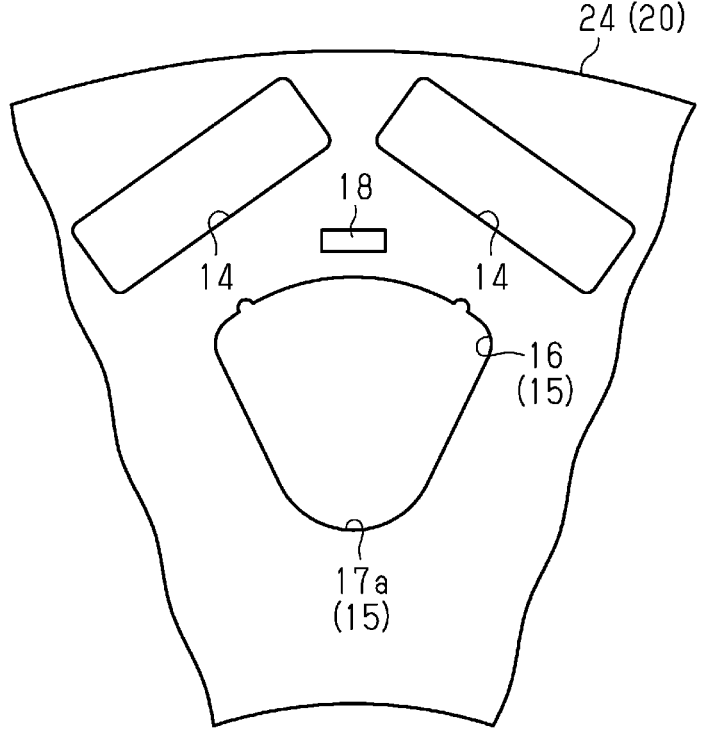
FIG. 6 is a plan view of the fourth block of the rotor core shown in FIG. 1.

As shown in FIGS. 5 and 6, the shapes of the cooling passages 15 in plan view of the front surfaces F of the third block 23 and the fourth block 24 are different from each other. The cooling passage 15 in plan view of the front surface F of the third block 23 and the cooling passage 15 in plan view of the rear surface B of the fourth block 24 have the same shape.

As shown in FIG. 1, the cooling passages 15 include a first cooling passage 15A, a second cooling passage 15B, and a third cooling passage 15C. The openings of these passages each have a different shape. The cooling passages 15 include, for example, one first cooling passage 15A, eight second cooling passages 15B, and one third cooling passage 15C.

The first cooling passage 15A and the third cooling passage 15C are located on opposite sides of the central hole 12. The imaginary axis extending in the protruding direction of the key 13 is an imaginary axis L1. The first cooling passage 15A and the third cooling passage 15C are two cooling passages 15 through which an imaginary axis L2 passes. The imaginary axis L2 is obtained by rotating the imaginary axis 1 about the axis C by a predetermined angle. The first cooling passage 15A and the third cooling passage 15C in the present embodiment are two cooling passages 15 through which the imaginary axis L2, obtained by rotating the imaginary axis L1 in the clockwise direction by 54° about the axis C, passes as viewed from the front surface F. The imaginary axis L1 connects central portions of the two keys 13 in the circumferential direction to each other. The imaginary axis L1 extends between two cooling passages 15 and between two magnet accommodating holes 14 adjacent to each other in the circumferential direction.

The cooling passages 15 other than the first cooling passage 15A and the third cooling passage 15C are the second cooling passages 15B. Thus, a second cooling passage 15B is symmetric to the first cooling passage 15A with respect to the imaginary axis L1. Similarly, a second cooling passage 15B is symmetric to the third cooling passage 15C with respect to the imaginary axis L1. Accordingly, when the laminated block 20 is turned upside down about the imaginary axis L1, the position of the first cooling passage 15A is replaced with that of the second cooling passage 15B, and the position of the third cooling passage 15C is replaced with that of the second cooling passage 15B.

Figure 7:
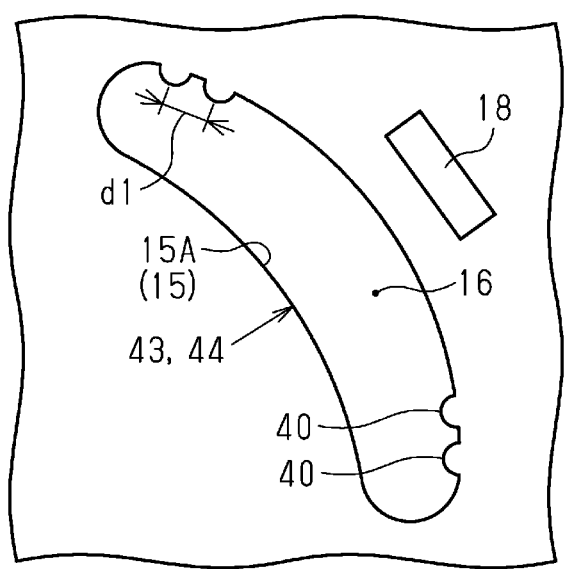
FIG. 7 is a plan view of the first cooling hole of the rotor core shown in FIG. 1.

As shown in FIG. 7, the first cooling passage 15A has first identification protrusions 40 that protrude from the inner circumferential surface of the axial passage 16 toward the inside of the axial passage 16. Each first identification protrusion 40 extends over the entire axial passage 16 in the axial direction. The first identification protrusion 40 is visible as viewed from the front surface F and the rear surface B.

For example, two first identification protrusions 40 are arranged on the radially outer portion of the inner circumferential surface of the axial passage 16 at each of the opposite ends in the circumferential direction. That is, the first cooling passage 15A has four first identification protrusions 40 in total.

The two first identification protrusions 40 located at one end of the axial passage 16 in the circumferential direction are spaced apart from each other. The distance between the two first identification protrusions 40 in plan view is referred to as the protrusion interval distance.

Figure 8:
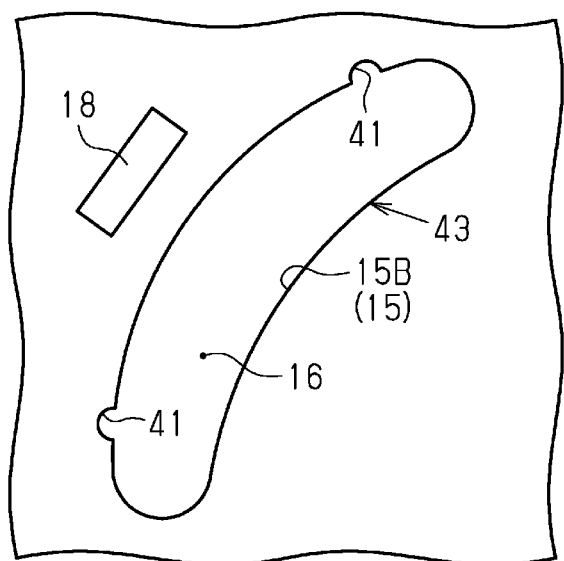
FIG. 8 is a plan view of the second cooling hole of the rotor core shown in FIG. 1.

As shown in FIG. 8, each second cooling passage 15B has identification grooves 41 recessed from the inner circumferential surface of the axial passage 16 toward the outside of the axial passage 16. Each identification groove 41 extends over the entire axial passage 16 in the axial direction. The identification groove 41 is visible as viewed from the front surface F and the rear surface B.

For example, one identification groove 41 is disposed in the radially outer portion of the inner circumferential surface of the axial passage 16 at each of the opposite ends in the circumferential direction. That is, each second cooling passage 15B has two identification grooves 41 in total.

Figure 9:
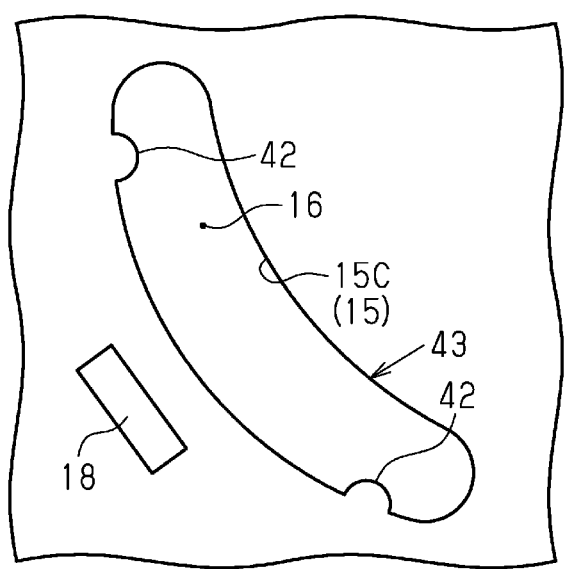
FIG. 9 is a plan view of the third cooling hole of the rotor core shown in FIG. 1.

As shown in FIG. 9, the third cooling passage 15C has second identification protrusions 42 that protrude from the inner circumferential surface of the axial passage 16 toward the inside of the axial passage 16. Each second identification protrusion 42 extends over the entire axial passage 16 in the axial direction. The second identification protrusion 42 is visible as viewed from the front surface F and the rear surface B.

For example, one second identification protrusion 42 is disposed on the radially outer portion of the inner circumferential surface of the axial passage 16 at each of the opposite ends in the circumferential direction. That is, the third cooling passage 15C has two second identification protrusions 42 in total.

As shown in FIGS. 7 to 9, orientation identification portions 43 are respectively disposed on the opposite end surfaces of each laminated block 20 in the axial direction. The orientation identification portions 43 are used to identify the orientation (i.e., front or rear) of the laminated block 20.

Figure 10:
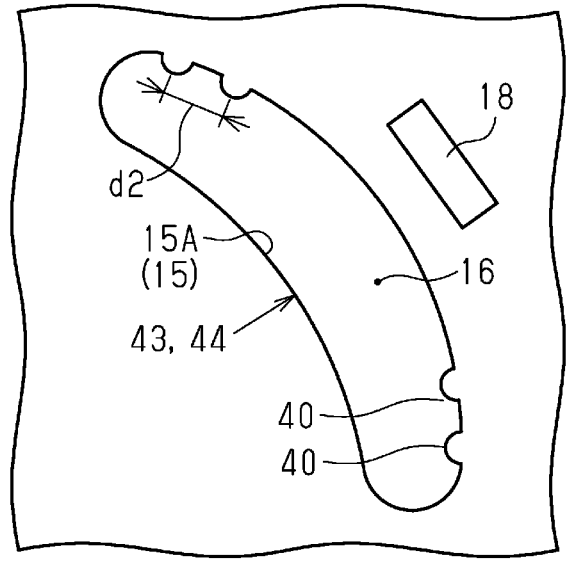
FIG. 10 is a plan view showing the first cooling hole of the rotor core manufactured in the second production line.

As shown in FIGS. 7 and 10, line identification portions 44 are respectively disposed on the opposite end surfaces of each laminated block 20 in the axial direction. The line identification portions 44 are used to identify the production line for the laminated block 20.

As shown in FIGS. 4A and 4B, type identification portions 45 are respectively disposed on the opposite end surfaces of each laminated block 20 in the axial direction. The type identification portions 45 are used to identify the type of the rotor 10.

In the method for manufacturing the rotor 10, which will be described later, the laminated blocks 20 are manufactured in two production lines. Hereinafter, one production line may be referred to as the first production line M1, and the other production line may be referred to as the second production line M2.

Further, in the method for manufacturing the rotor 10, two types of rotors 10 are manufactured. Hereinafter, one type may be referred to as the first type V1, and the other type may be referred to as the second type V2. For example, the first type V1 and the second type V2 each have a different type of rotor core 11 and a different type of magnets 30. Thus, the first type V1 and the second type V2 each have a different type of laminated blocks 20 of the rotor core 11.

As shown in FIGS. 7 to 9, the orientation identification portion 43 is defined by the openings of the cooling passages 15 in each laminated block 20. The orientation identification portion 43 is defined by the openings of the first cooling passage 15A, the second cooling passages 15B, and the third cooling passage 15C.

As shown in FIG. 1, as one end surface of the laminated block 20 is viewed, the orientation of the laminated block 20 is identified by the difference in the opening shapes of the two cooling passages 15 through which the imaginary axis L1, obtained by rotating the imaginary axis L2 by 54° in the clockwise direction about the axis C, passes. In the present embodiment, when the two cooling passages 15 on one end surface of the laminated block 20 are the first cooling passage 15A and the third cooling passage 15C, the one end surface is identified as the front surface F. Further, when the two cooling passages 15 on one end surface of the laminated block 20 are the second cooling passages 15B, the one end surface is identified as the rear surface F.

As shown in FIGS. 7 and 10, the line identification portion 44 is defined by the opening of the first cooling passage 15A in each laminated block 20.

Each production line of the laminated block 20 has a different protrusion interval distance between the first identification protrusions 40. For example, a protrusion interval distance d1 in the laminated block 20 of the first production line M1 is smaller than a protrusion interval distance d2 in the laminated block 20 of the second production line M2 (d1<d2). That is, the production line of the laminated block 20 can be identified from the protrusion interval distance.

As shown in FIGS. 4A and 4B, the type identification portion 45 includes two magnet accommodating holes 14 adjacent to each other on the opposite sides of the cooling passage 15 in the circumferential direction (hereinafter simply referred to as two magnet accommodating holes 14).

Each type of rotor 10 has a different identification angle that is formed by two magnet accommodating holes 14. For example, an identification angle θ1 in the laminated block 20 of the first type V1 is smaller than an identification angle θ2 in the laminated block 20 of the second type V2 (θ1<θ2). That is, the type of the laminated block 20 can be identified from the identification angle.

Magnet 30

As shown in FIG. 2, each magnet 30 has an elongated shape extending in the axial direction. The cross-sectional shape of the magnet 30 that is orthogonal to the axial direction is substantially rectangular.

The length of the magnet 30 in the axial direction may be the same as or shorter than the length of the magnet accommodating hole 14. One magnet 30 may be accommodated in each magnet accommodating hole 14, or multiple magnets 30 may be accommodated in each magnet accommodating hole 14.

Examples of the magnet 30 include a permanent magnet.

Resin Material 31

Each resin material 31 is a solidified resin filled in a corresponding magnet accommodating hole 14 that accommodates the magnet 30. The magnet 30 is fixed to the rotor core 11 by the resin material 31. The laminated blocks 20 are fixed to each other by the resin materials 31. For example, the resin materials 31 may cover the opposite end surfaces of the magnets 30 in the axial direction.

Examples of the resin material 31 include a thermosetting resin such as an epoxy resin.

End Plate 32

The two end plates 32 cover the opposite end surfaces of the rotor core 11 in the axial direction, respectively. One end plate 32 is welded to the first block 21, and the other end plate 32 is welded to the sixth block 26. In FIG. 1, the end plates 32 are not illustrated.

Each end plate 32 has a disc shape corresponding to the shape of the end surface of the rotor core 11 in the axial direction. The end plate 32 has a first through-hole 32a connected to the central hole 12 and a second through-hole 32b connected to each magnet accommodating hole 14.

Examples of the material of the end plate 32 include a metal material such as stainless steel.

Stator 50

As shown in FIG. 1, the stator 50 includes a stator core 51 and coils 56.

The stator core 51 includes a yoke 52, teeth 53, and slots 54. The yoke 52 has a cylindrical shape. The teeth 53 protrude radially inward from the yoke 52 and are located at intervals in the circumferential direction. Each slot 54 is created between adjacent ones of the teeth 53 in the circumferential direction.

The stator core 51 includes three fixed portions 55 that protrude radially outward from the yoke 52. The three fixed portions 55 are fastened to a housing (not shown) using bolts (not shown) so that the stator core 51 is fixed to the housing.

In the same manner as the rotor core 11, the stator core 51 is formed by laminating laminated blocks (not shown), each including laminated second iron core pieces Wb punched out of an electrical steel sheet.

The coil 56 consists of, for example, three-phase (i.e., U-, a V-, and W-phase) windings. Each phase winding is wound across the teeth 53.

Manufacturing Apparatus

The manufacturing apparatus used for manufacturing the rotor 10 and the stator 50 will now be described with reference to FIGS. 11 to 25, focusing on the components used to manufacture the rotor 10. The manufacturing apparatus includes pressing devices 60, a lamination thickness measuring device 70, a first transfer device 80, a correctness determination device 90, a lamination device 100, a crimping device 120, a magnet insertion device 130, a molding device 180, a removal device 200, and a welding device 210.

Pressing Device 60

Figure 11:
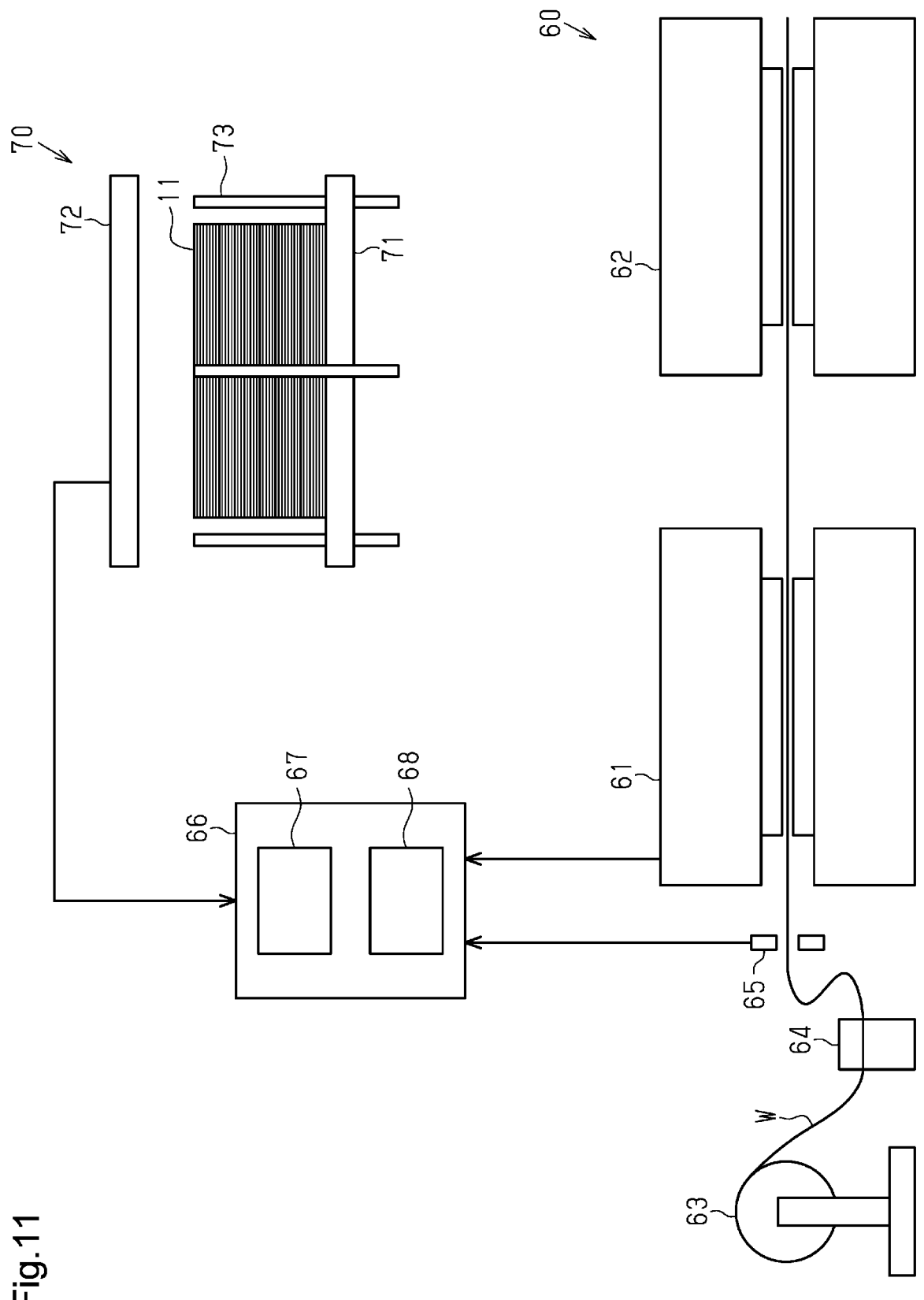
FIG. 11 is a schematic diagram showing the configuration of a pressing device and a lamination thickness measuring device in the embodiment.

As shown in FIG. 11, each pressing device 60 punches out the first iron core pieces Wa and the second iron core pieces Wb out of a plate-shaped workpiece W. The workpiece W is intermittently conveyed.

The pressing device 60 includes a rotor punching portion 61 that punches the first iron core pieces Wa out of the workpiece W and a stator punching portion 62 that punches the second iron core pieces Wb out of the workpiece W. Each of the rotor punching portion 61 and the stator punching portion 62 includes a progressive die that punches out the workpiece W after performing multiple machining steps, such as punching and dowel formation, on the workpiece W.

The rotor punching portion 61 is located upstream of the stator punching portion 62 in the conveying direction of the workpiece W (hereinafter simply referred to as the conveying direction). The rotor punching portion 61 is configured to punch the first iron core pieces Wa out of the workpiece W and form the laminated blocks 20. The stator punching portion 62 is configured to punch the second iron core pieces Wb out of the workpiece W out of which the first iron core pieces Wa have been punched and form laminated blocks (not shown). The stator punching portion 62 is configured to punch the second iron core pieces Wb concentrically with the first iron core pieces Wa out of a portion of the workpiece W on the outer circumferential side of the portion out of which the first iron core pieces Wa have been punched.

Figure 12:
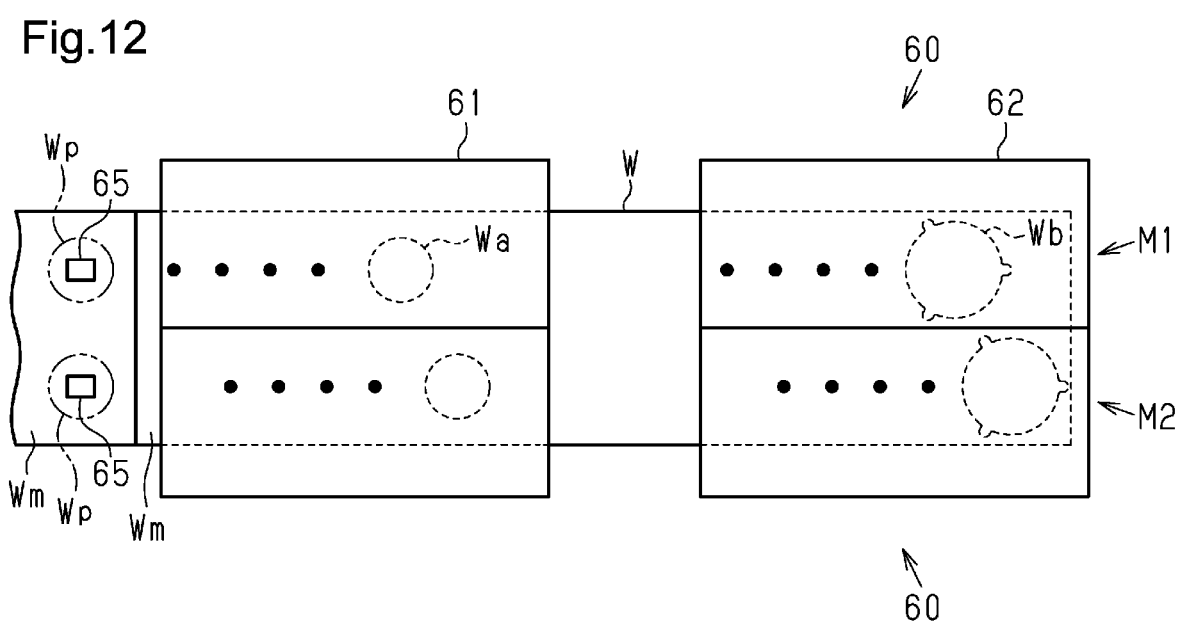
FIG. 12 is a plan view of the configuration of the pressing device shown in FIG. 11.

As shown in FIG. 12, the manufacturing apparatus includes two pressing devices 60, each on a different production line. The two pressing devices 60 are arranged side by side in the width direction of the workpiece W, which is orthogonal to the conveying direction. One of the two pressing devices 60 is included in the first production line M1, and the other pressing device 60 is included in the second production line M2.

In the rotor punching portion 61, in the die, the first iron core piece Wa punched out of the workpiece W is laminated on the second iron core piece Wa that will be punched out next. As shown in FIG. 3, this causes the dowels 18 of adjacent ones of the first iron core pieces Wa to be engaged with each other. Such lamination of the first iron core pieces Wa is repeated to form the laminated block 20.

In the rotor punching portion 61, each time a predetermined number of first iron core pieces Wa are punched out, the first iron core piece Wa having the through-hole 19 for engagement with the dowel 18 is punched out. The first iron core piece Wa having the through-hole 19 is not engaged with the first iron core piece Wa punched out immediately before. The rotor punching portion 61 sequentially forms the first block 21 to the sixth block 26 by punching out the first iron core piece Wa having the through-hole 19 each time a predetermined number of first iron core pieces Wa are punched out.

Similarly, each time a predetermined number of the second iron core pieces Wb are punched out, the stator punching portion 62 punches out the second iron core piece Wb having a through-hole, thereby sequentially forming a laminated block in which the second iron core pieces Wb are laminated.

As shown in FIG. 11, an uncoiler 63 that rotationally supports the workpiece W wound in a roll shape is disposed upstream of the rotor punching portion 61 in the conveying direction. The workpiece W pulled out of the uncoiler 63 is supplied to the rotor punching portion 61 and the stator punching portion 62 by a feeding device (not shown).

A welding machine 64 that welds the workpiece W is disposed downstream of the uncoiler 63 in the conveying direction. As shown in FIG. 12, the workpiece W is formed by welding ends (specifically, end surfaces) of strip-shaped base materials Wm by the welding machine 64. The base materials Wm are conveyed with the end surfaces joined to each other and integrated.

As shown in FIGS. 11 and 12, between the welding machine 64 and the rotor punching portion 61 in the conveying direction, a plate thickness sensor 65 that measures the plate thickness of the workpiece W is disposed in correspondence with each of the two pressing devices 60. The plate thickness sensor 65 measures a plate thickness t of a punchable portion Wp of the workpiece W from which each of the first iron core pieces Wa is to be punched. Examples of the plate thickness sensor 65 include a contactless sensor such as a laser displacement meter.

As shown in FIG. 11, the pressing device 60 includes a press controller 66 that controls the operation of the rotor punching portion 61.

The press controller 66 includes a memory 67 and a calculator 68. The memory 67 stores the plate thickness t of each punchable portion Wp measured by the plate thickness sensor 65. The calculator 68 estimates the lamination thickness of the laminated block 20 and a lamination thickness Tm of the rotor core 11 by sequentially accumulating the plate thicknesses t of the punchable portions Wp. The calculator 68 calculates an estimated lamination thickness Te as an estimated value of the lamination thickness Tm of the rotor core 11 by accumulating the lamination thicknesses of the laminated blocks 20.

For the estimated lamination thickness Te to fall within a predetermined range, the press controller 66 controls the operation of the rotor punching portion 61 so as to form the laminated blocks 20 by selectively punching the first iron core piece Wa having the through-hole 19.

The calculator 68 calculates a corrected value c by dividing the difference between the lamination thickness Tm of the rotor core 11 measured by the lamination thickness measuring device 70, which will be described later, and the estimated lamination thickness Te, by the number N of laminations of the first iron core pieces Wa of the rotor core 11. The calculator 68 calculates a corrected plate thickness t' obtained by adding the corrected value c to each plate thickness t of the punchable portion Wp measured by the plate thickness sensor 65. The calculator 68 accumulates the corrected plate thickness t' to calculate an estimated lamination thickness Te' obtained by correcting the estimated lamination thickness Te. The press controller 66 adjusts the number of laminations of the first iron core pieces Wa in the laminated block 20 such that the lamination thickness Tm of the rotor core 11 approaches the estimated lamination thickness Te'.

The press controller 66 can also execute the same control as the operation control on the rotor punching portion 61 on the stator punching portion 62.

Lamination Thickness Measuring Device 70

The lamination thickness measuring device 70 measures the lamination thicknesses of the rotor core 11 and the stator core 51. A case in which the lamination thickness Tm of the rotor core 11 is measured using the lamination thickness measuring device 70 will now be described.

The lamination thickness measuring device 70 includes a support member 71 that supports the lower surface of the rotor core 11, a pressure applying member 72 that presses the upper surface of the rotor core 11, and probes 73 that measure the distance between the support member 71 and the pressure applying member 72. The lamination thickness measuring device 70 includes, for example, three probes 73 concentrically disposed between the support member 71 and the pressure applying member 72 at intervals.

The lamination thickness measuring device 70 indirectly measures the lamination thickness Tm of the rotor core 11 based on the distance from the support member 71 to the pressure applying member 72 in each of the three probes 73 in a state in which pressure is applied to the rotor core 11 by the pressure applying member 72.

The lamination thickness measuring device 70 is configured to output a measurement result of the lamination thickness measuring device 70 to the press controller 66.

First Transfer Device 80

Figure 13:
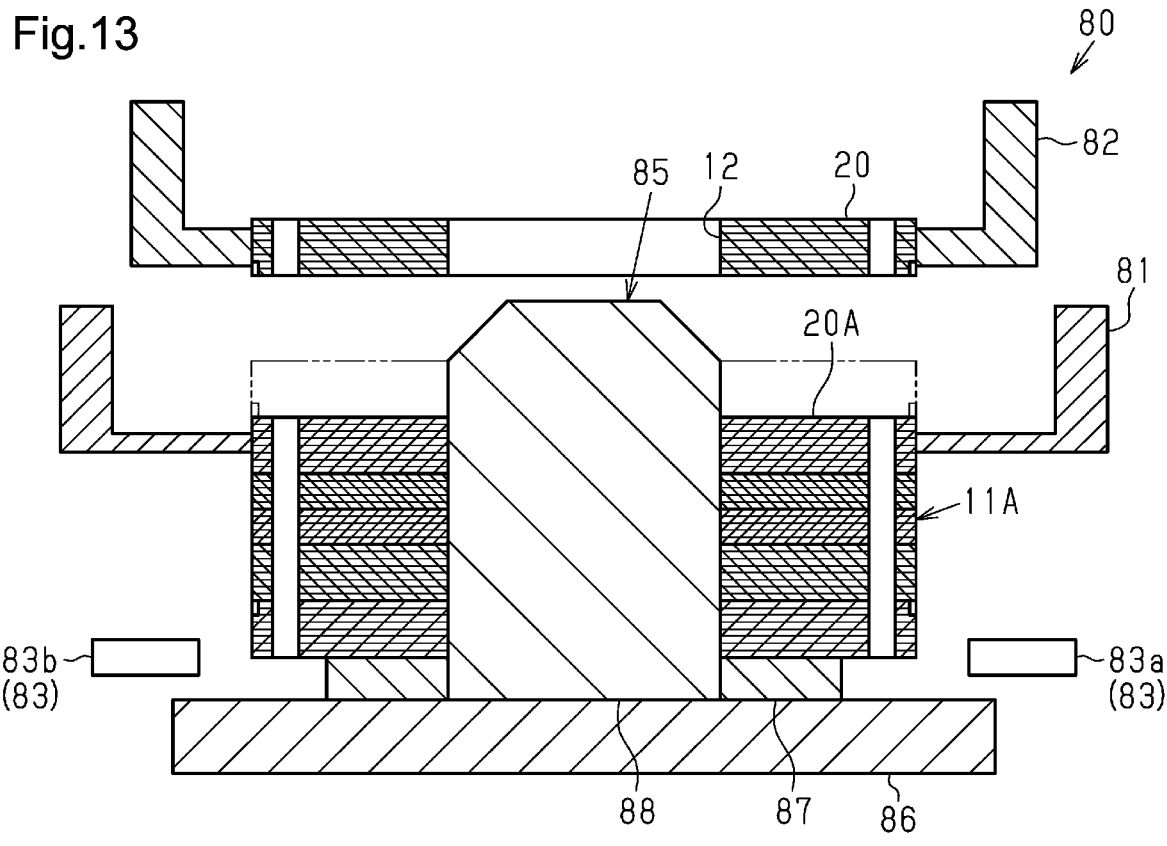
FIG. 13 is a cross-sectional view showing the configuration of the first transfer device in the embodiment.

As shown in FIG. 13, the first transfer device 80 individually extracts the laminated blocks 20 from a support jig 85 that supports a laminate 11A in which the laminated blocks 20 are laminated, and transfers the laminated block 20 to a transfer target. The transfer target is, for example, a correctness determination device 90, which will be described later.

The laminate 11A is formed by vertically laminating the laminated blocks 20 in an order opposite to the order of laminating the laminated blocks 20 of the rotor core 11.

The support jig 85 includes a first base plate 86, a spacer 87 that supports the lower surface of the laminate 11A, and a first post 88 that protrudes from the first base plate 86.

The first base plate 86 and the spacer 87 have a flat shape. The spacer 87 is fixed to the upper surface of the first base plate 86.

The first post 88 has a cylindrical shape. The first post 88 extends through the spacer 87. The first post 88 is inserted into the central hole 12 of each laminated block 20. A gap that permits each laminated block 20 to rotate relative to the first post 88 is created between the first post 88 and the central hole 12 of each laminated block 20.

The laminated blocks 20 are fitted into the first post 88 by, for example, an operator in an order opposite to the order of laminating the laminated blocks 20 of the rotor core 11.

The first transfer device 80 includes a restricting portion 81 that restricts the movement of the laminated blocks 20, a transfer portion 82 that transfers the laminated blocks 20, and a detector 83 that detects the position of the upper end surface of the uppermost laminated block 20.

The restricting portion 81 includes two chucks that clamp the outer circumferential surface of each laminated block 20. The chucks of the restricting portion 81 can be moved up and down in the vertical direction and can be moved toward and away from each other.

The portion of each chuck of the restricting portion 81 that comes into contact with the laminated block 20 is shaped in an arc that conforms to the outer circumferential surface of the laminated block 20.

The restricting portion 81 restricts the movement of the laminated block 20 located directly beneath the uppermost one of the laminated blocks 20 of the laminate 11A (hereinafter referred to as the second-tier block 20A) by clamping the second-tier block 20A.

The transfer portion 82 includes two chucks that clamp the outer circumferential surface of the laminated block 20. The chucks of the transfer portion 82 can be moved up and down in the vertical direction and can be moved toward and away from each other.

The portion of each chuck of the transfer portion 82 that comes into contact with the laminated block 20 is shaped in an arc that conforms to the outer circumferential surface of the laminated block 20.

The transfer portion 82 clamps the uppermost laminated block 20, extracts it out of the support jig 85, and transfers it to the correctness determination device 90.

The detector 83 is, for example, a transmissive photoelectric sensor including a light emitter 83a and a light receiver 83b. The light emitter 83a and the light receiver 83b are located on opposite sides of the laminate 11A. Although not shown in the drawings, an axis connecting the light emitter 83a to the light receiver 83b overlaps a portion of the laminate 11A excluding the central hole 12 as viewed in the vertical direction. That is, the axis overlaps a portion of the support jig 85 excluding the first post 88 as viewed in the vertical direction.

The detector 83 can be moved up and down in the vertical direction. When detecting the upper end surface of the laminate 11A, the detector 83 ascends from the lower end toward the upper end of the laminate 11A. While the detector 83 faces the laminate 11A, the light from the light emitter 83a is blocked by the laminate 11A and is thus not received by the light receiver 83b. When the detector 83 reaches the upper end of the laminate 11A, the light from the light emitter 83a is received by the light receiver 83b. In this manner, the detector 83 detects the position of the upper end surface of the laminate 11A.

The restricting portion 81 is configured to clamp the outer circumferential surface of a portion of the laminate 11A that is separated downward by a specified distance from the position of the upper end surface of the laminate 11A detected by the detector 83. The specified distance is the sum of the thickness T1 of the uppermost laminated block 20 and half the thickness T2 of the second-tier block 20A (T1+(T2/2)). That is, the restricting portion 81 is configured to clamp the outer circumferential surface of the central portion of the second-tier block 20A in the axial direction.

The transfer portion 82 is configured to clamp the outer circumferential surface of a portion of the laminate 11A that is separated downward from the position of the upper end surface of the laminate 11A by a distance corresponding to half the thickness T1 of the uppermost laminated block 20. The distance is detected by the detector 83. That is, the transfer portion 82 is configured to clamp the outer circumferential surface of the central portion of the uppermost laminated block 20 in the axial direction.

The first transfer device 80 determines which block, ranging from the first block 21 to the sixth block 26, is the uppermost laminated block 20 by counting the number of laminated blocks 20 extracted out of the support jig 85. The first transfer device 80 possesses information on the thicknesses of the first block 21 to the sixth block 26. This allows the first transfer device 80 to determine the values of the thickness T1 of the uppermost laminated block 20 and the thickness T2 of the second-tier block 20A by determining the type of the uppermost laminated block 20. As a result, the restricting portion 81 of the first transfer device 80 clamps the outer circumferential surface of the central portion of the second-tier block 20A in the axial direction.
Correctness Determination Device 90

Figure 14:
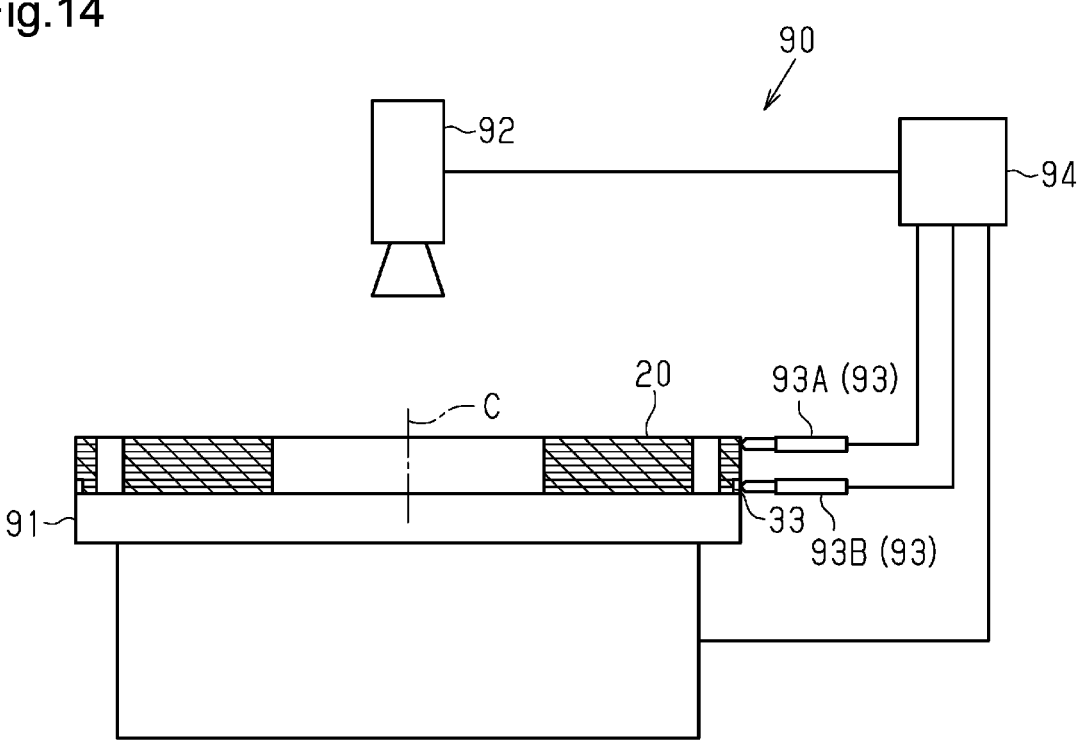
FIG. 14 is a cross-sectional view showing the configuration of the correctness determination device in the embodiment.

As shown in FIG. 14, the correctness determination device 90 determines whether the laminated block 20 transferred by the first transfer device 80 is a correct laminated block 20 that should be transferred to and laminated on the lamination device 100. Specifically, the correctness determination device 90 determines whether the orientation, laminating order, production line, and type of the laminated block 20 transferred by the first transfer device 80 are correct.

The correctness determination device 90 includes a rotary stage 91, an imaging device 92, a detector 93, and a controller 94.

The laminated block 20 transferred by the first transfer device 80 is mounted on the rotary stage 91. The rotary stage 91 can rotate the laminated block 20 about the axis C and position it at any position.

The imaging device 92 includes a camera that captures the entirety of one end surface of the laminated block 20 on the rotary stage 91.

The detector 93 detects the welding grooves 33 of the laminated block 20. The detector 93 includes two displacement sensors 93A, 93B that are vertically spaced apart from each other. The displacement sensors 93A, 93B face the upper and lower ends of the laminated block 20 on the rotary stage 91, respectively.

The controller 94 controls the operation of the rotary stage 91, the operation of the imaging device 92, and the operation of the detector 93.

The controller 94 performs image processing on the captured image of the laminated block 20 captured by the imaging device 92. After detecting the position of a key 13 of the laminated block 20 from the captured image, the controller 94 rotates the rotary stage 91 such that the key 13 is located at a predetermined position. This rotation causes the key 13 of the laminated block 20 to be positioned with respect to a key groove 103a of a second post 103, which will be described later (refer to FIG. 16). Further, when the laminated block 20 includes a welding groove 33, this rotation causes the welding groove 33 to face one of the two displacement sensors 93A, 93B.

A registered image is registered in advance in the controller 94. The registered image is an image of one end surface of a correct laminated block 20 in the axial direction. The controller 94 compares the registered image with the captured image to determine whether the captured laminated block 20 is a correct laminated block 20. Specifically, the controller 94 determines whether the orientation, production line, and type of the laminated block 20 are correct using the orientation identification portion 43, the line identification portion 44, and the type identification portion 45 of the laminated block 20, respectively. The controller 94 determines whether the laminating order of the laminated blocks 20 is correct from the shape of the front surface F of the laminated block 20 and the detection result of the detector 93. The laminating order of laminated blocks 20 refers to the order in which the laminated blocks 20 are laminated on a lamination jig 101 of the lamination device 100, which will be described later.

The correctness determination device 90 includes a counter (not shown). The counter counts the number of determinations that a correct laminated block 20 has been obtained by the correctness determination for the laminated block 20. When determining whether the laminated block 20 subject to determination is a correct first block 21, the correctness determination device 90 sets the number of determinations to 1. Each time the laminated block 20 subject to determination is determined as a correct laminated block 20, the correctness determination device 90 increments the number of determinations. In the case of determining that the laminated block 20 determined when the number of determinations is 6 is a correct sixth block 26, the correctness determination device 90 sets the number of determinations to 1.

Lamination device 100

Figure 15:
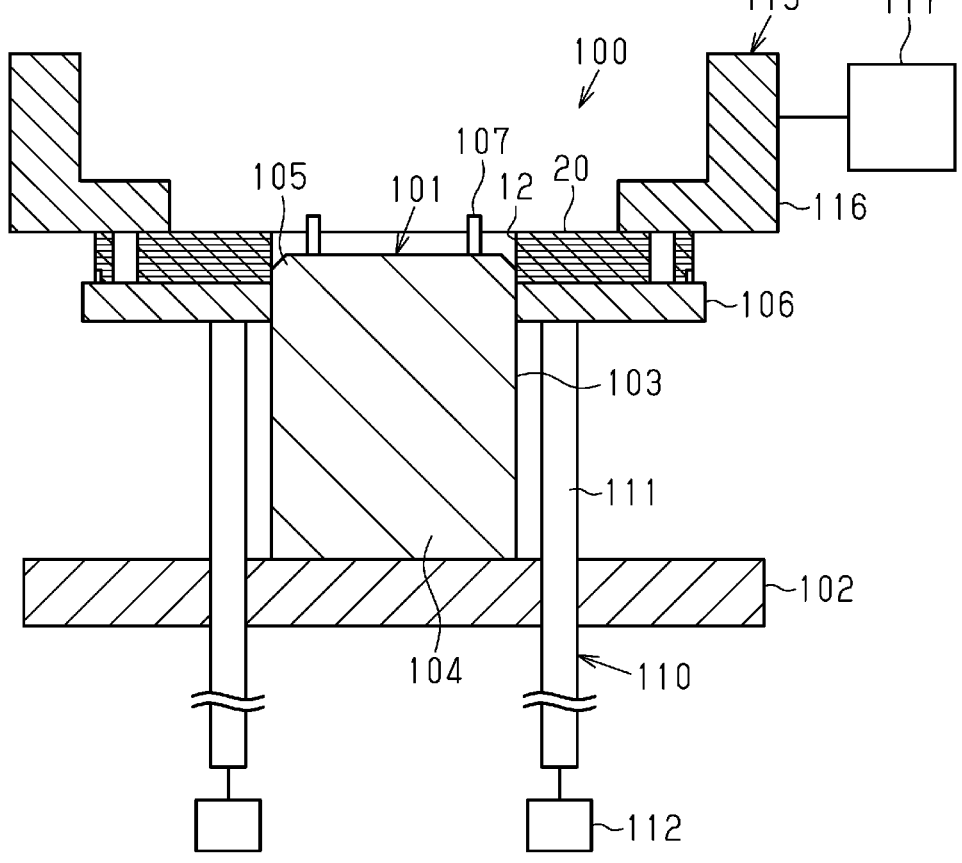
FIG. 15 is a cross-sectional view showing the configuration of the lamination device in the embodiment.

As shown in FIG. 15, the lamination device 100 forms the rotor core 11 by laminating laminated blocks 20.

The lamination device 100 includes the lamination jig 101, which supports the laminated blocks 20 in a laminated state, a lifting mechanism 110 that lifts and lowers a mounting table 106 (described below), and a second transfer device 115 that individually transfers the laminated blocks 20 to the lamination jig 101.

Lamination Jig 101

The lamination jig 101 includes a second base plate 102, a second post 103 protruding from the second base plate 102, and the mounting table 106 on which the laminated blocks 20 are mounted.

The second base plate 102 and the mounting table 106 have a flat shape.

The second post 103 has a cylindrical shape. The second post 103 extends through the mounting table 106. Each laminated block 20 is fitted into the second post 103. That is, the second post 103 is inserted into the central hole 12 of each laminated block 20.

Figure 16:
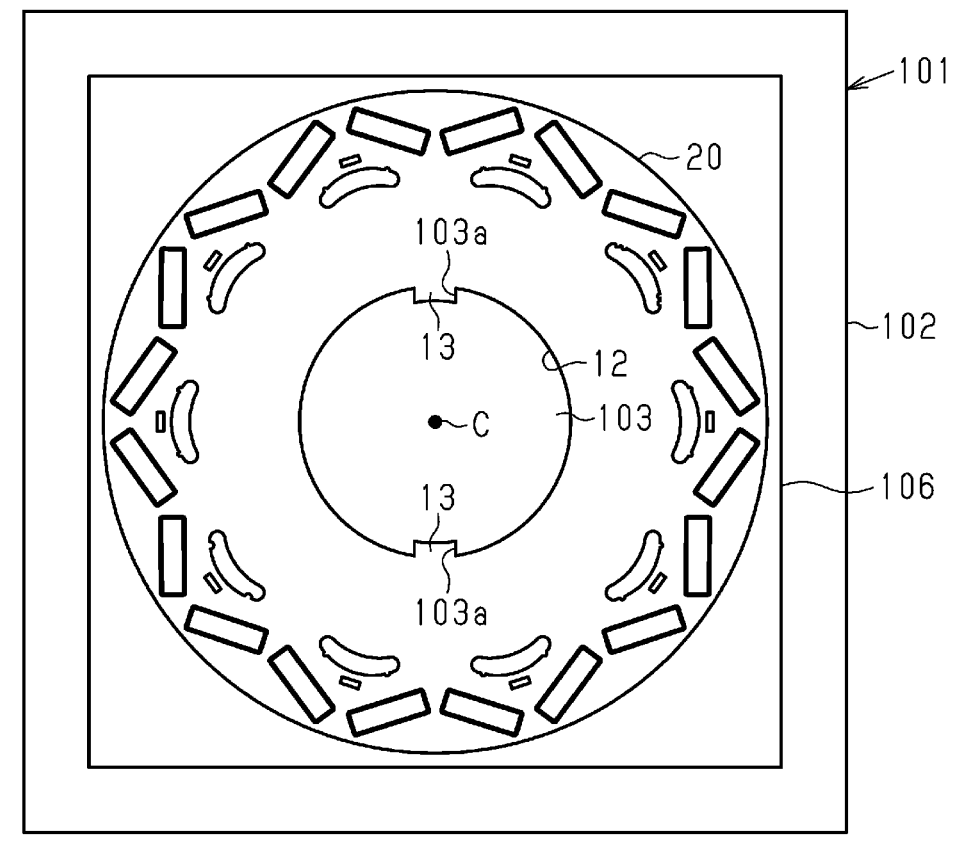
FIG. 16 is a plan view of the lamination jig shown in FIG. 15.

As shown in FIG. 16, the outer circumferential surface of the second post 103 has the key grooves 103a with which the keys 13 of each laminated block 20 are respectively engaged. Each key groove 103a is arranged over the entire the second post 103 in the longitudinal direction. The engagement of the key 13 with the key groove 103a causes each laminated block 20 to be positioned relative to the second post 103.

The laminated block 20 can be fitted to the second post 103 in two orientations rotated by 180° about the axis C as a rotation axis. The laminated blocks 20 supported by the lamination jig 101 may be laminated by rotational laminating, which involves rotating at least one laminated block 20 by a predetermined angle and then laminating the laminated block 20.

As shown in FIG. 15, the second post 103 includes a columnar portion 104 extending in the axial direction of the laminated blocks 20, and a tapered portion 105 at the tip of the columnar portion 104.

The outer diameter of the columnar portion 104 is entirely constant in the longitudinal direction. The outer diameter of the columnar portion 104 is slightly smaller than the outer diameter of each central hole 12 of the laminated block 20.

The outer diameter of the tapered portion 105 gradually decreases toward the tip. The tapered portion 105 has, for example, a truncated cone shape. The tapered portion 105 functions to guide the laminated block 20 toward the columnar portion 104.

Positioning pins 107 protrude from the tip surface of the tapered portion 105. The positioning pins 107 are used to position a cull plate 182, which will be described later, relative to the lamination jig 101.

The mounting table 106 can be moved up and down in the axial direction of the laminated block 20 with respect to the second post 103 by the lifting mechanism 110. The mounting table 106 includes two protrusions (not shown) that are respectively engaged with the key grooves 103a. The mounting table 106 can be moved up and down in the axial direction of the laminated block 20 with the protrusions respectively engaged with the key grooves 103a.

Lifting Mechanism 110

The lifting mechanism 110 includes shafts 111 that support the lower surface of the mounting table 106, and driving units 112 that respectively lift and lower the shafts 111 in the axial direction of the laminated block 20.

Each shaft 111 extends through the second base plate 102 at a portion of the second base plate 102 on the outer circumferential side of the second post 103.

Each driving unit 112 converts rotational motion of a motor (not shown) into linear motion of the shaft 111. A change in the rotation direction of the motor moves the shaft 111 up and down.

The upper end surface of each shaft 111 comes into contact with the lower surface of the mounting table 106 to support the lower surface of the mounting table 106. Thus, the mounting table 106 moves up and down as each shaft 111 moves up and down. That is, the mounting table 106 moves toward and away from the second base plate 102 as each shaft 111 moves up and down.

Second Transfer Device 115

The second transfer device 115 includes two clamping portions 116 that clamp the outer circumferential surface of the laminated block 20, and a load sensor 117 that detects load acting on the two clamping portions 116.

The two clamping portions 116 can convey the laminated block 20 while being clamped. The two clamping portions 116 can be moved up and down in the vertical direction and can be moved toward and away from each other. The two clamping portions 116 can downwardly press the upper surface of the laminated block 20 by descending in close proximity to each other.

The second transfer device 115 is configured to stop the operation of the two clamping portions 116 when the load detected by the load sensor 117 is larger than a predetermined load.

Crimping Device 120

Figure 17:
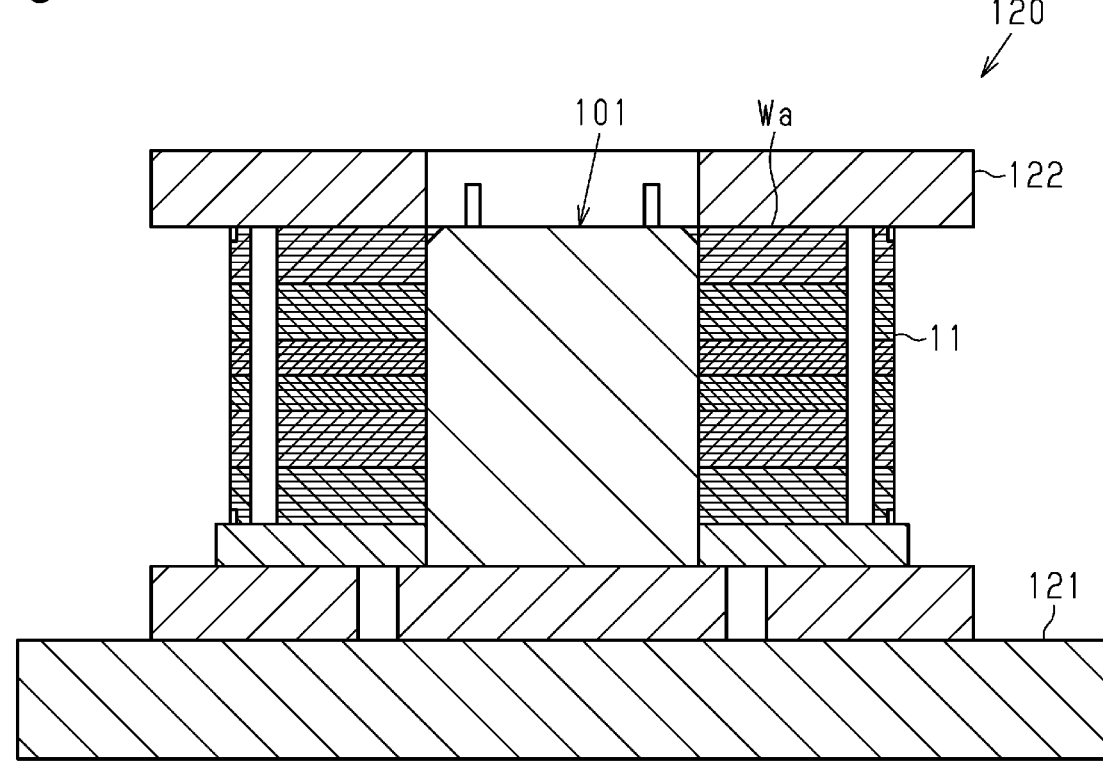
FIG. 17 is a cross-sectional view showing the configuration of the crimping device in the embodiment.

As shown in FIG. 17, the crimping device 120 crimps the dowels 18 of adjacent ones of the first iron core pieces Wa by applying pressure to the rotor core 11 in the axial direction.

The crimping device 120 includes a first mold 121 that supports the lower surface of the lamination jig 101, and a second mold 122 that presses the upper surface of the rotor core 11 supported by the lamination jig 101. The second mold 122 can be moved toward and away from the first mold 121.

The crimping device 120 uses the second mold 122 to press the upper surface of the rotor core 11, thereby crimping the dowels 18 of the adjacent first iron core pieces Wa in each laminated block 20 to each other.

The crimping device 120 includes a measuring device (not shown) that measures the distance between the first mold 121 and the second mold 122 with the rotor core 11 pressed. The thickness Tm of the rotor core 11 is indirectly measured by the measuring device.

Magnet Insertion Device 130

The magnet insertion device 130 inserts each magnet 30 into a corresponding magnet accommodating hole 14 of the rotor core 11.

Figure 18:
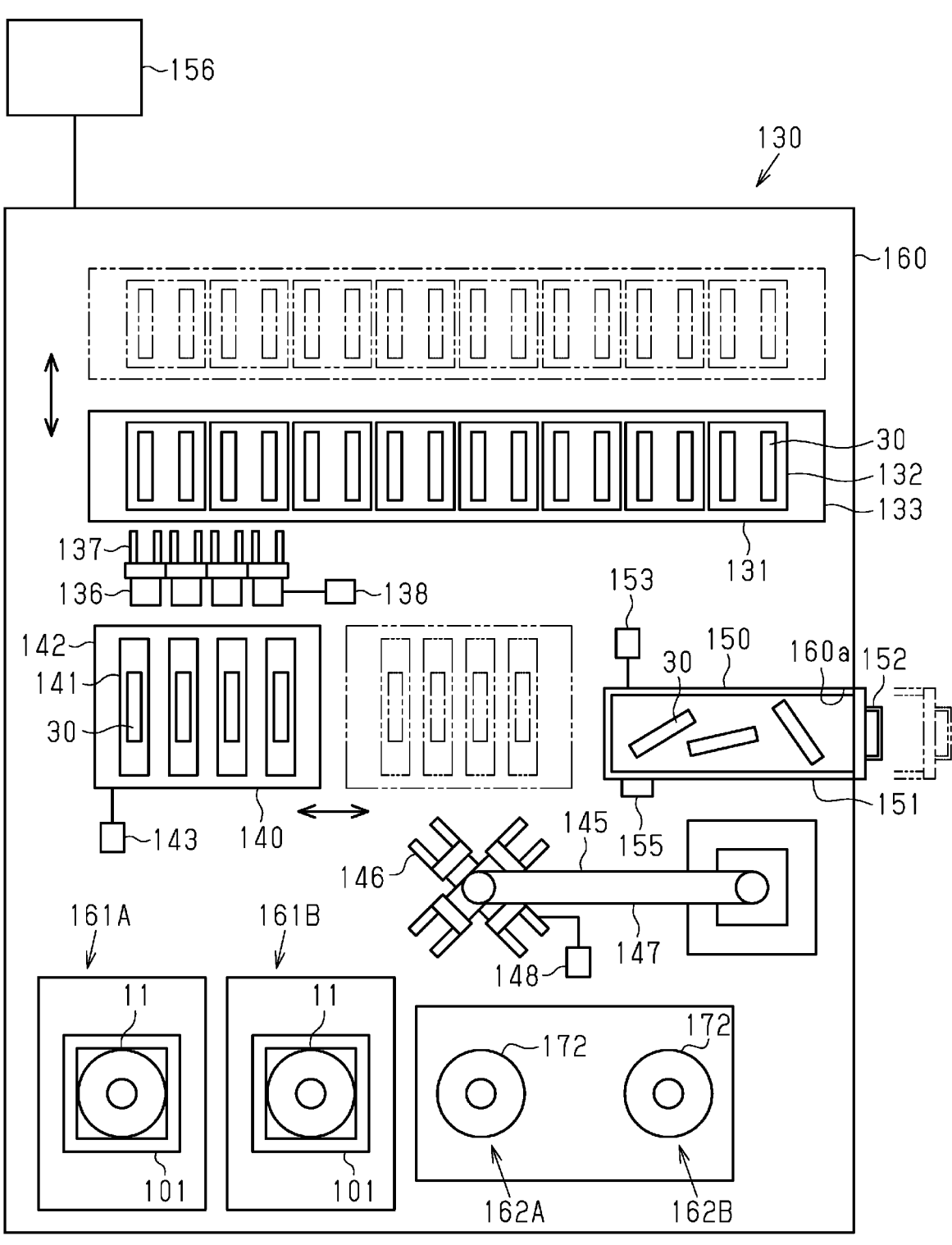
FIG. 18 is a plan view showing the configuration of the magnet insertion device in the embodiment.

As shown in FIG. 18, the magnet insertion device 130 includes a supply mechanism 131, an extraction mechanism 136, an alignment mechanism 140, an insertion mechanism 145, a collection container 150, a locking mechanism 155, and a controller 156.

The supply mechanism 131 includes magazines 132, each accommodating magnets 30. The extraction mechanism 136 extracts the magnets 30 from each magazine 132. The alignment mechanism 140 aligns the magnets 30 extracted by the extraction mechanism 136. The insertion mechanism 145 inserts each magnet 30 into a corresponding magnet accommodating hole 14 of the rotor core 11. The collection container 150 collects the magnets 30 that are not accommodated in the magnet accommodating holes 14. The locking mechanism 155 restricts opening and closing of the collection container 150. The controller 156 controls operations of the supply mechanism 131, the extraction mechanism 136, the alignment mechanism 140, the insertion mechanism 145, and the locking mechanism 155.

The magnet insertion device 130 includes a housing 160 that accommodates the supply mechanism 131, the extraction mechanism 136, the alignment mechanism 140, the insertion mechanism 145, and the collection container 150. The side surface of the housing 160 includes an opening 160a that is opened and closed by the collection container 150.

The magnet insertion device 130 includes two insertion stations 161A, 161B that insert the magnets 30 into the rotor core 11, and two push stations 162A, 162B that push the magnets 30 into the rotor core 11 using a push jig 172, which will be described later. The insertion stations 161A, 161B and the push stations 162A, 162B are located inside the housing 160.

The rotor core 11 supported by the lamination jig 101 is conveyed to the insertion stations 161A, 161B from the outside of the magnet insertion device 130. After passing through the insertion stations 161A, 161B, the rotor core 11 is conveyed to the push stations 162A, 162B. The rotor core 11 into which the magnets 30 have been pushed at the push stations 162A, 162B is conveyed to the outside of the magnet insertion device 130.

In the rotor core 11 of the first type V1, the magnets 30 are inserted at the insertion station 161A and then pushed at the push station 162A. In the rotor core 11 of the second type V2, the magnets 30 are inserted at the insertion station 161B and then pushed at the push station 162B. The magnet insertion device 130 selectively operates the insertion stations 161A, 161B and the push stations 162A, 162B according to the type of the rotor 10.

Supply Mechanism 131

The supply mechanism 131 includes the magazines 132 and an elongated sliding table 133 to which the magazines 132 are fixed. The magazines 132 are arranged in parallel in the longitudinal direction of the sliding table 133.

Figure 19:
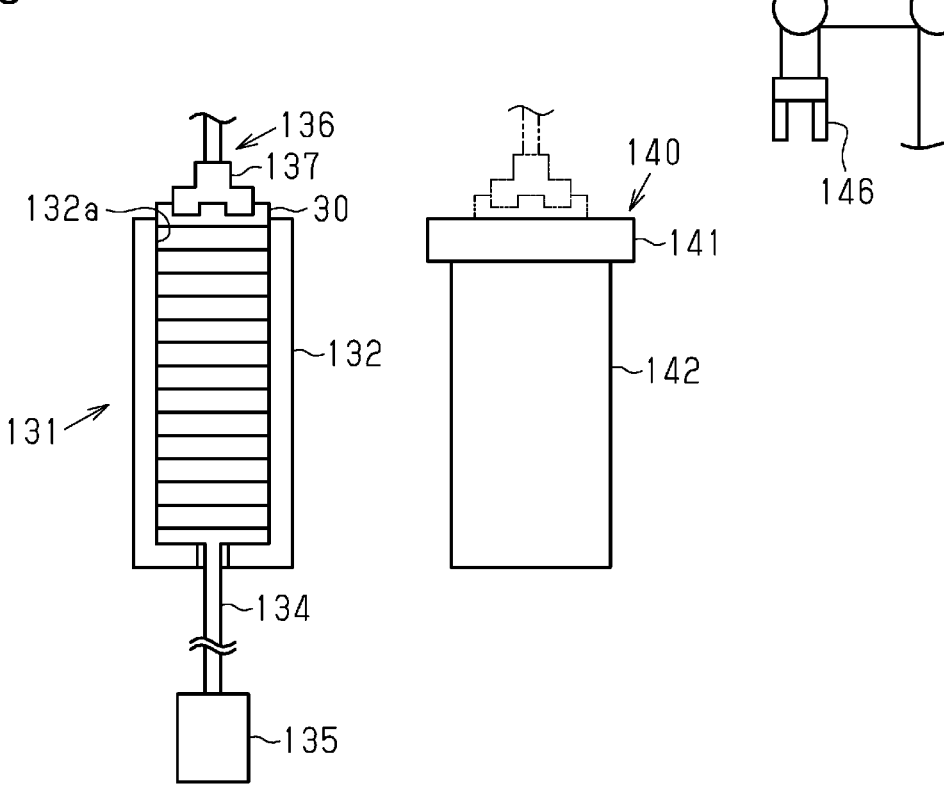
FIG. 19 is a side view of the configuration of the magnet insertion device shown in FIG. 18.

As shown in FIG. 19, each magazine 132 accommodates the magnets 30 laminated one above the other. The magazine 132 has an upper opening 132a. A rod 134 that supports the lowermost magnet 30 is disposed inside the magazine 132. The rod 134 is coupled to an actuator 135 that moves the rod 134 up and down in the vertical direction. When the rod 134 is raised by the actuator 135, the magnets 30 are raised inside the magazine 132. Thus, the magnets 30 are exposed to the outside through the upper opening 132a.

As shown in FIG. 18, the sliding table 133 is slidable in the lateral direction of the sliding table 133. The sliding of the sliding table 133 switches the position of the supply mechanism 131 between an extraction position, at which the magnets 30 are extracted by the extraction mechanism 136, and a replacement position, at which the magazine 132 is replaced with a new one. As indicated by the long dashed double-short dashed line in FIG. 18, the replacement position is farther away from the extraction mechanism 136 than the extraction position in the lateral direction.

Extraction Mechanism 136

The extraction mechanism 136 faces the supply mechanism 131 on one side of the sliding table 133 in the lateral direction. The extraction mechanism 136 includes chucks 137 that hold and extract the magnets 30 exposed from the magazine 132. The extraction mechanism 136 can extract the magnets 30 out of the magazine 132 and convey them to the alignment mechanism 140 (refer to FIG. 19). The extraction mechanism 136 is movable between the supply mechanism 131 and the alignment mechanism 140.

The extraction mechanism 136 includes a first sensor 138 that detects whether each chuck 137 holds the magnet 30. For example, the first sensor 138 outputs an ON signal to the controller 156 when the magnet 30 held by the extraction mechanism 136 is detected, and outputs an OFF signal to the controller 156 when no magnet 30 is detected.

Alignment Mechanism 140

The alignment mechanism 140 is located on the opposite side of the extraction mechanism 136 from the supply mechanism 131. The alignment mechanism 140 includes mounting portions 141 arranged in parallel, and a pitch changer 142 that changes the interval between the mounting portions 141.

The magnets 30 extracted out of the magazine 132 by the extraction mechanism 136 are respectively mounted on the mounting portions 141. The alignment mechanism 140 can align the magnets 30 by changing the interval between the mounting portions 141 using the pitch changer 142. The alignment mechanism 140 aligns the magnets 30 in accordance with the interval between chucks 146 of the insertion mechanism 145, which will be described below.

The alignment mechanism 140 includes a second sensor 143 that detects whether a magnet 30 is mounted on each mounting portion 141. For example, the second sensor 143 outputs an ON signal to the controller 156 when the magnet 30 on the mounting portion 141 is detected, and outputs an OFF signal to the controller 156 when no magnet 30 is detected.

The alignment mechanism 140 is slidable between a mounting position, at which the magnets 30 are mounted by the extraction mechanism 136, and a supply position, at which the magnets 30 are supplied to the insertion mechanism 145. As indicated by the long dashed double-short dashed line in FIG. 18, the supply position is farther away from the extraction mechanism 136 than the mounting position in the longitudinal direction of the sliding table 133.

Insertion Mechanism 145

The insertion mechanism 145 includes a robotic arm 147 with the chucks 146. The chucks 146 can hold the magnets 30 mounted on the mounting portion 141 of the alignment mechanism 140 at the supply position.

The insertion mechanism 145 includes a third sensor 148 that detects whether each chuck 146 holds a magnet 30. For example, the third sensor 148 outputs an ON signal to the controller 156 when the magnet 30 held by the insertion mechanism 145 is detected, and outputs an OFF signal to the controller 156 when no magnet 30 is detected.

As described above, each type of rotor 10 has a different angle of the magnet accommodating hole 14 with respect to the circumferential direction. The orientation of each chuck 146 of the robotic arm 147 is set according to the angle of the magnet accommodating hole 14. Different types of chucks 146 are attached to and detached from the robotic arm 147 depending on the type of the rotor 10.

The insertion mechanism 145 conveys the magnets 30 to one of the insertion stations 161A, 161B depending on the type of the rotor 10 to be manufactured.

Figure 20:
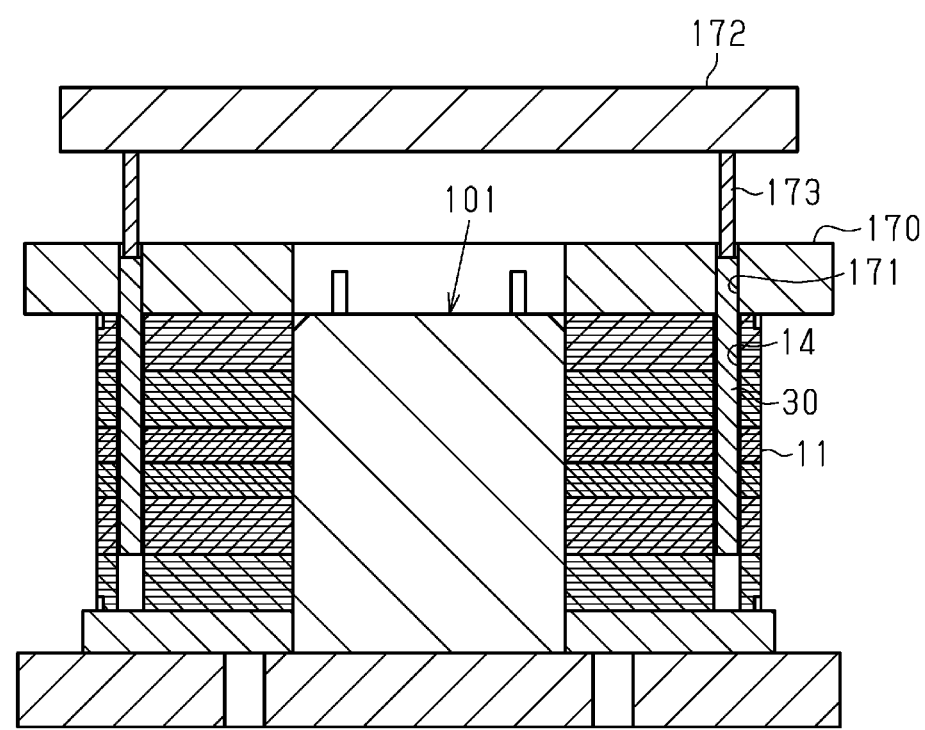
FIG. 20 is a cross-sectional view showing the configuration of the guide jig and the push jig in the embodiment.

As shown in FIG. 20, at the insertion stations 161A, 161B, a guide jig 170 that guides the insertion of the magnets 30 into the magnet accommodating holes 14 are mounted on the upper surface of the rotor core 11. The guide jig 170 has guide holes 171 respectively connected to the magnet accommodating holes 14.

The insertion mechanism 145 respectively inserts the magnets 30 into the magnet accommodating holes 14 through the guide holes 171. Since part of each magnet 30 is inserted into a corresponding magnet accommodating hole 14, the magnet 30 protrudes from the guide hole 171.

At the push stations 162A, 162B, the ends of the magnets 30 protruding from the guide holes 171 are pushed by the push jig 172. The push jig 172 includes push portions 173 that are respectively inserted into the guide holes 171.

Collection Container 150

As shown in FIG. 18, the collection container 150 can open and close the opening 160a of the housing 160. The collection container 150 includes a collection portion 151 that collects the magnets 30, and a handle 152 fixed to the collection portion 151.

The collection portion 151 has a box shape with an open top. The opening 160a of the housing 160 is opened and closed by a part of the side wall of the collection portion 151. With the opening 160a closed by the collection container 150, the collection portion 151 is located inside the housing 160.

The handle 152 protrudes from the side wall of the collection portion 151, which opens and closes the opening 160a, and is located outside the housing 160.

The collection container 150 is slidable between a collection position, at which the magnets 30 can be collected by the insertion mechanism 145, and a discharge position, at which the magnets 30 can be discharged to the outside. The collection container 150 at the collection position closes the opening 160a. The collection container 150 at the discharge position opens the opening 160a.

The opening and closing of the collection container 150 is detected by an open-close sensor 153 that is disposed in the housing 160. For example, the open-close sensor 153 outputs an OFF signal to the controller 156 when the collection container 150 opens the opening 160a, and outputs an ON signal to the controller 156 when the collection container 150 closes the opening 160a.

Locking Mechanism 155

The locking mechanism 155 is configured to lock the collection container 150 at the collection position. The locking mechanism 155 restricts opening and closing of the collection container 150 by engaging with the collection portion 151, and permits opening and closing of the collection container 150 by disengaging from the collection portion 151.

The locking mechanism 155 locks the collection container 150 at the collection position during operation of the magnet insertion device 130. When the type of the rotor 10 manufactured using the magnet insertion device 130 is switched, the locking mechanism 155 unlocks the collection container 150 to permit opening and closing of the collection container 150. Specifically, when the presence of the magnet 30 is not confirmed by all of the first sensor 138 of the extraction mechanism 136, the second sensor 143 of the alignment mechanism 140, and the third sensor 148 of the insertion mechanism 145 during the type switching, the locking mechanism 155 unlocks the collection container 150.

Controller 156

When the insertion mechanism 145 holds magnets 30 during the type switching, the controller 156 controls the insertion mechanism 145 to transfer the magnets 30 to the collection container 150.

When the magnets 30 are mounted on the mounting portion 141 during the type switching, the controller 156 controls the insertion mechanism 145 to transfer the magnets 30 to the collection container 150.

When the extraction mechanism 136 is holding the magnets 30 during the type switching, the controller 156 controls the extraction mechanism 136 to transfer the magnets 30 to the mounting portion 141.

The controller 156 controls the locking mechanism 155 to lock the collection container 150 at the collection position until the type switching is performed. When the magnets 30 are not present in any of the extraction mechanism 136, the mounting portion 141, and the insertion mechanism 145 during the type switching, the controller 156 controls the locking mechanism 155 to unlock the collection container 150.

When the position of the collection container 150 shifts from the discharge position to the collection position during the type switching, the controller 156 controls the locking mechanism 155 to lock the collection container 150 at the collection position. Until the locking is completed, the controller 156 controls the insertion mechanism 145 so as not to insert each magnet 30 into a corresponding magnet accommodating hole 14.

Molding Device 180

Figure 21:
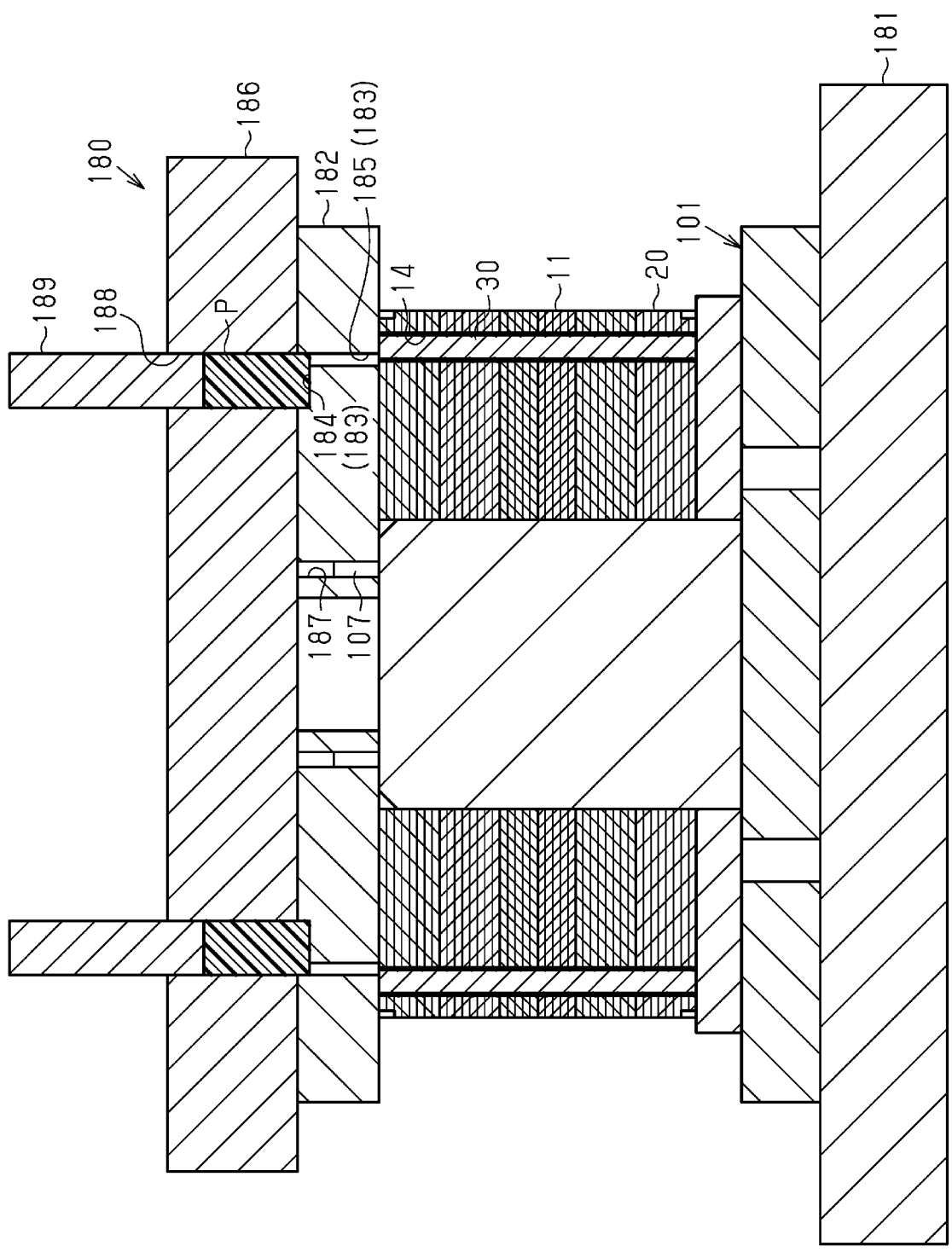
FIG. 21 is a cross-sectional view showing the configuration of the molding device in the embodiment.

As shown in FIG. 21, the molding device 180 fixes the magnets 30 to the rotor core 11 by filling each magnet accommodating hole 14 with a corresponding resin material 31 and solidifying the resin material 31.

The molding device 180 includes a fixed mold 181, the cull plate 182, and a movable mold 186. The fixed mold 181 includes a support surface that supports the lower surface of the lamination jig 101 on which the rotor core 11 is supported. The cull plate 182 is mounted on the upper surface of the rotor core 11. The movable mold 186 is located on the opposite side of the cull plate 182 from the fixed mold 181 such that the movable mold 186 can be moved toward and away from the fixed mold 181.

Figures 22, 23:
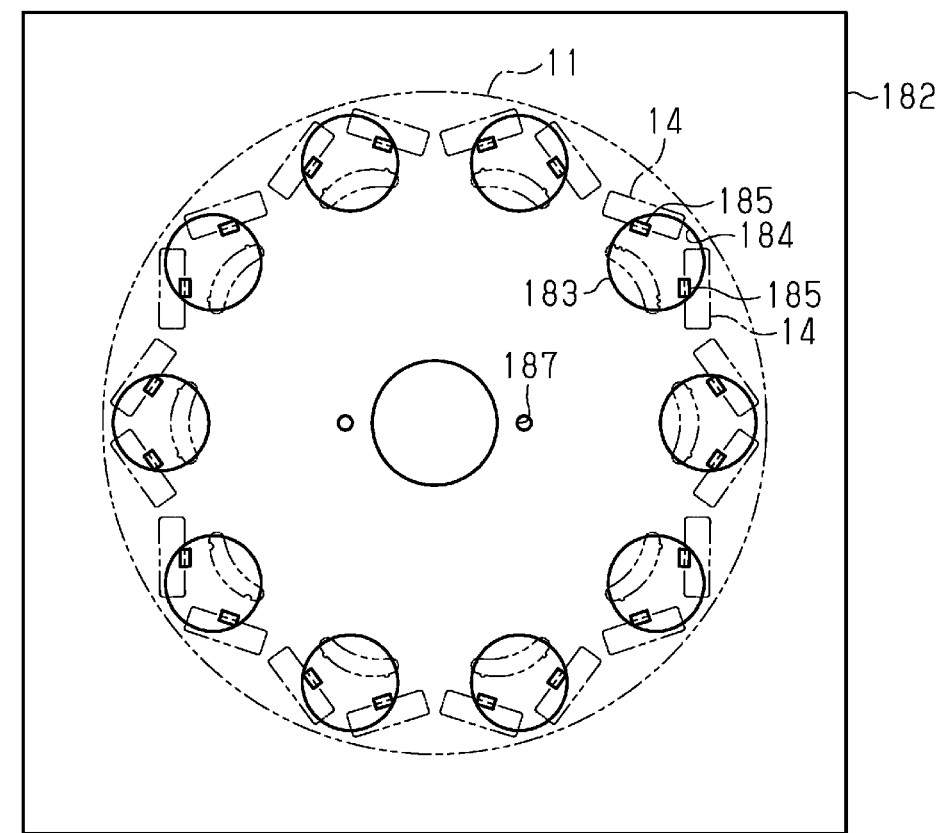
FIG. 22 is a plan view of the cull plate shown in FIG. 21.
FIG. 23 is a schematic diagram showing the configuration of a removal device in the embodiment.

As shown in FIG. 22, the cull plate 182 has, for example, a quadrangular shape in plan view. The cull plate 182 has supply ports 183 from which resin is filled into the magnet accommodating holes 14, respectively. The supply ports 183 are arranged at equal intervals in the circumferential direction. Each supply port 183 is located at a position corresponding to a portion between two magnet accommodating holes 14.

Each supply port 183 has a runner 184 and two connection holes 185 connected to the runner 184.

As shown in FIG. 21, the runners 184 open in the upper surface of the cull plate 182. Each connection hole 185 opens in the bottom surface of a corresponding runner 184 and extends through the cull plate 182 in the thickness direction. Each connection hole 185 connects the runner 184 to the magnet accommodating hole 14.

The central portion of the cull plate 182 includes positioning holes 187 into which the positioning pins 107 are respectively inserted. The insertion of the positioning pins 107 into the positioning holes 187 positions the cull plate 182 and the rotor core 11 such that the supply ports 183 are respectively connected to the magnet accommodating holes 14.

The movable mold 186 has supply passages 188 into which resin is supplied to the supply ports 183, respectively. A resin pellet P made of thermosetting resin is disposed in each supply passage 188. The resin pellet P is heated by, for example, a heater (not shown) disposed inside the movable mold 186 so that the resin pellet P melts inside the supply passage 188.

The molding device 180 includes plungers 189 that can be respectively inserted into and removed from the supply passages 188. In order to fill the magnet accommodating hole 14 with the resin melted inside the supply passage 188, each plunger 189 applies pressure to the resin.

Removal Device 200

As shown in FIG. 23, the removal device 200 uses the extrusion jig 190 to extrude solidified materials R of the resin materials 31 respectively remaining in the supply ports 183 of the cull plate 182, thereby removing the solidified materials R from the cull plate 182.

The removal device 200 includes the extrusion jig 190 and a conveying device 195. The extrusion jig 190 is configured to extrude the solidified materials R from the cull plate 182. The conveying device 195 is configured to convey the cull plate 182 from the molding device 180 and press the cull plate 182 against the extrusion jig 190.

Figure 24:
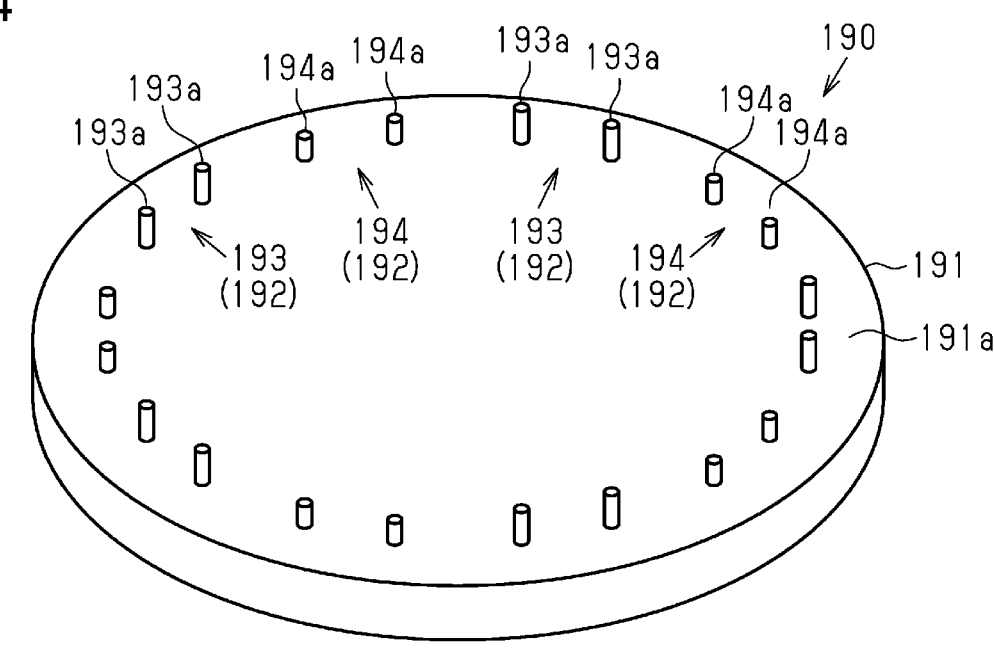
FIG. 24 is a perspective view of the extrusion jig shown in FIG. 23.

As shown in FIGS. 23 and 24, the extrusion jig 190 includes a base 191 and extrusion portions 192 that protrude from the base 191.

The base 191 has an opposing surface 191a that opposes one end surface of the cull plate 182 in the thickness direction; specifically, a surface of the cull plate 182 on which the connection holes 185 are open. The opposing surface 191a has a flat shape. The extrusion portions 192 protrude from the opposing surface 191a and are arranged at intervals in the circumferential direction.

As shown in FIG. 24, the extrusion portions 192 include first extrusion portions 193 and second extrusion portions 194. The first extrusion portions 193 and the second extrusion portions 194 are alternately arranged in the circumferential direction.

The first extrusion portion 193 includes two first extrusion pins 193a that are respectively inserted into two connection holes 185 of the cull plate 182. The second extrusion portion 194 includes two second extrusion pins 194a that are respectively inserted into two connection holes 185 of the cull plate 182.

The protrusion amounts of the second extrusion portions 194 from the opposing surface 191a are smaller than the protrusion amounts of the first extrusion portions 193 from the opposing surface 191a. That is, the protrusion amounts of the second extrusion pins 194a from the opposing surface 191a are smaller than the protrusion amounts of the first extrusion pins 193a from the opposing surface 191a. With the extrusion jig 190 mounted, the tips of the first extrusion pins 193a are respectively located at higher positions than the tips of the second extrusion pins 194a.

As shown in FIG. 23, the conveying device 195 includes two supporting portions 196, two pressing portions 197, and two coupling portions 198.

The two supporting portions 196 support the lower surfaces of the opposite ends of the cull plate 182 in the width direction. The two pressing portions 197 press the upper surfaces of the opposite ends of the cull plate 182 in the width direction. The two pressing portions 197 and the two supporting portions 196 face each other in the vertical direction. The two coupling portions 198 respectively couple the supporting portions 196 to the pressing portions 197. The distance between the supporting portions 196 and the pressing portions 197 in the vertical direction is greater than the thickness of the cull plate 182. Thus, in a state in which the two supporting portions 196 support the cull plate 182, a gap is created between the lower surface of each pressing portion 197 and the upper surface of the cull plate 182.

Welding Device 210

Figure 25:
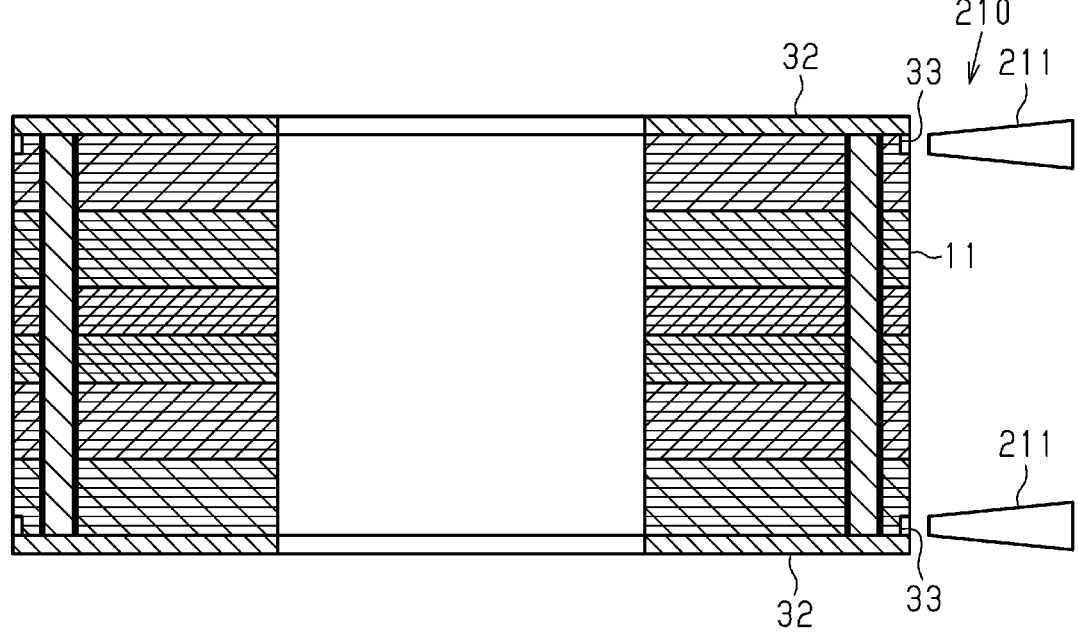
FIG. 25 is a cross-sectional view showing the configuration of the welding device in the embodiment.

As shown in FIG. 25, the welding device 210 welds the end plates 32 to the opposite end surfaces of the rotor core 11 in the axial direction.

The welding device 210 includes welding torches 211 that weld the rotor core 11 to the end plates 32. Examples of the welding method include laser welding.

Each welding torch 211 can be moved up and down in the axial direction of the rotor core 11. The welding torch 211 performs welding between the rotor core 11 and the end plates 32 while moving inside the welding groove 33 in the axial direction.

Method for Manufacturing Rotor 10

Figure 26:
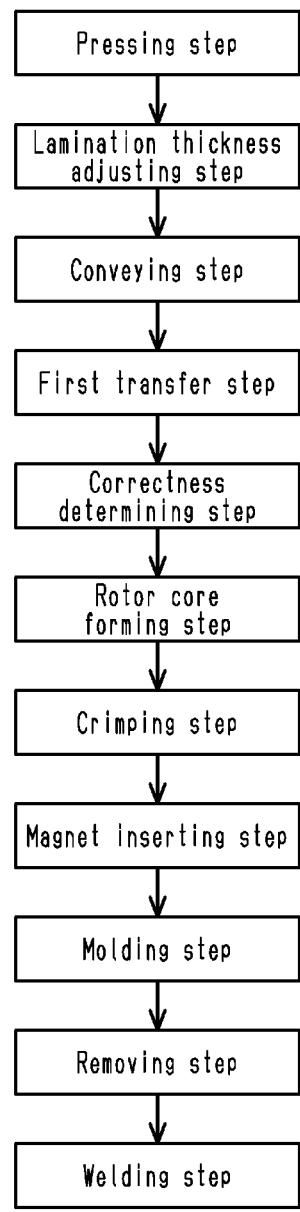
FIG. 26 is a flowchart illustrating the procedure of the method for manufacturing the rotor.

As shown in FIG. 26, the method for manufacturing the rotor 10 includes a pressing step, a lamination thickness adjusting step, a conveying step, a first transfer step, a correctness determining step, a rotor core forming step, a crimping step, a magnet inserting step, a molding step, a removing step, and a welding step.

Pressing Step

As shown in FIG. 12, in the pressing step, the rotor punching portion 61 performs multiple machining processes on the intermittently conveyed workpiece W and then punches the first iron core pieces Wa out of the workpiece W.

The pressing step includes, for example, a punching step, a dowel forming step, a dowel removing step, and a block forming step.

In the punching step, multiple machining steps are performed on the workpiece W to machine the central hole 12 of the rotor core 11, the cooling passages 15, and the magnet accommodating holes 14.

In the dowel forming step, the dowels 18 bulging from the workpiece W toward one side in the plate thickness direction are formed. The dowel forming step is performed before or after the punching step or performed between the machining processes of the punching step.

In the dowel removing step, the dowels 18 formed on the workpiece W are selectively punched out. This creates through-holes 19 (refer to FIG. 3) in the workpiece W.

In the block forming step, the rotor punching portion 61 punches the first iron core pieces Wa having the dowels 18 out of the workpiece W and laminates the first iron core pieces Wa to form the laminated block 20. In the block forming step, each time a predetermined number of the first iron core pieces Wa are laminated from the workpiece W, the first iron core piece Wa having the through-hole 19 is punched out.

As shown in FIG. 3, the first iron core piece Wa having the through-hole 19 is not engaged with the dowel 18 of the first iron core piece Wa that was punched immediately before. Thus, with the first iron core piece Wa having the through-hole 19 as a boundary, the laminated blocks 20 are formed. The first to sixth blocks 21 to 26, each having a different shape, are formed by punching out the first iron core piece Wa having the through-hole 19 at a predetermined time.

Lamination Thickness Adjusting Step

The lamination thickness adjustment step adjusts the number of laminations of the first iron core pieces Wa in the laminated block 20. The lamination thickness adjusting step is performed in each of the two pressing devices 60. Hereinafter, the lamination thickness adjusting step performed in one pressing device 60 will be described, and the lamination thickness adjusting step performed in the other pressing device 60 will not be performed.

The lamination thickness adjustment step includes a plate thickness measuring step, a lamination thickness estimating step, a lamination thickness measuring step, and a corrected value calculating step.

In the plate thickness measuring step, the plate thickness t of each punchable portion Wp is measured by the plate thickness sensor 65.

In the lamination thickness estimating step, the estimated lamination thickness Te is calculated as an estimated value of the lamination thickness Tm of the rotor core 11 by accumulating the plate thicknesses t of the punchable portions Wp. In the lamination thickness measuring step, the lamination thickness Tm of the rotor core 11 for which the estimated lamination thickness Te has been calculated is measured. The lamination thickness measuring step is performed before the crimping step. Specifically, the lamination thickness measuring step is performed after the block forming step and before the conveying step, which will be described later.

In the corrected value calculating step, the corrected value c is calculated by dividing the difference between the lamination thickness Tm of the rotor core 11 measured in the lamination thickness measuring step and the estimated lamination thickness Te, by the number N of laminations of the first iron core pieces Wa of the rotor core 11.

In the lamination thickness estimating step performed after the corrected value calculating step, the estimated lamination thickness Te' is calculated by accumulating the corrected plate thickness t', which is obtained by adding corrected value c to the plate thickness t of each punchable portion Wp. In the subsequent block forming step, the number of laminations of the first iron core pieces Wa in the laminated block 20 is adjusted such that the lamination thickness Tm of the rotor core 11 approaches the estimated lamination thickness Te'.

The procedure of the lamination thickness adjusting step will now be described with reference to the flowchart shown in FIG. 27.

Figure 27:
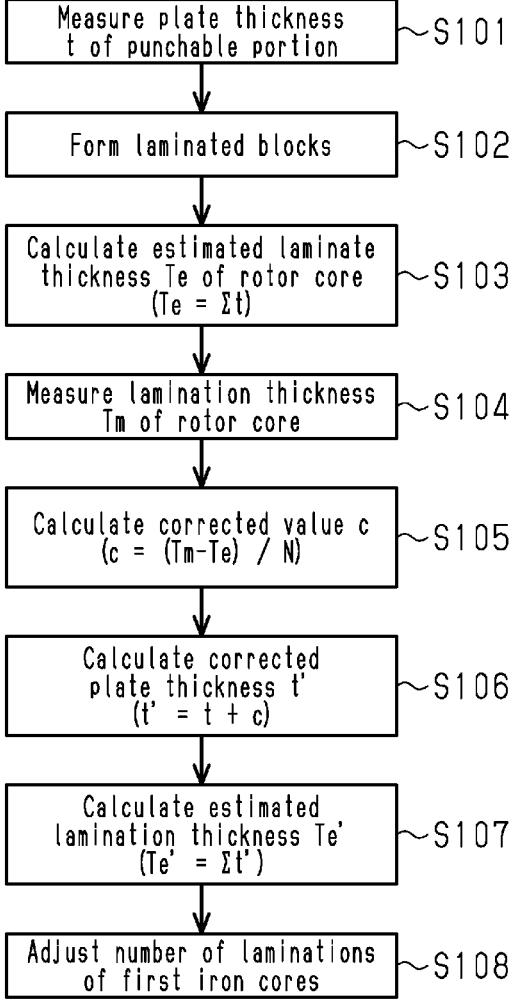
FIG. 27 is a flowchart illustrating the procedure of the lamination thickness adjusting step.

As shown in FIG. 27, each time the workpiece W is fed by the feeding device, the plate thickness sensor 65 measures the plate thickness t of each punchable portion Wp (step S101). The information on the plate thickness t measured by the plate thickness sensor 65 is stored in the memory 67 of the press controller 66.

Next, the laminated blocks 20 are formed in the block forming step (step S102).

Then, each time the punchable portion Wp is punched out or before the punchable portion Wp is punched out, the calculator 68 estimates the lamination thickness of the laminated block 20 and the lamination thickness Tm of the rotor core 11 by sequentially accumulating the plate thickness t of the punchable portion Wp. The calculator 68 calculates the estimated lamination thickness Te (Te=Σt), as the estimated value of the lamination thickness Tm of the rotor core 11 including the first block 21 to the sixth block 26, by accumulating the lamination thicknesses of the first block 21 to the sixth block 26 (step S103). The number of laminations N of the first iron core pieces Wa of the rotor core 11 for which the estimated lamination thickness Te has been calculated is the number of laminations obtained when the estimated lamination thickness Te is closest to a desired lamination thickness in the rotor core 11. Thus, the number of laminations N of the first iron core pieces Wa of the rotor core 11 may be different for each rotor core 11.

Hereinafter, the estimated lamination thickness Te of the rotor core 11 including an initial set of the first block 21 to the sixth block 26 formed from a single base material Wm of the workpiece W is referred to as an estimated lamination thickness Te1. Further, the estimated lamination thickness Te of the rotor core 11 including a second set of the first block 21 to the sixth block 26 formed from a single base material Wm of the workpiece W is referred to as an estimated lamination thickness Te2.

Subsequently, the lamination thickness measuring device 70 measures the lamination thickness Tm of the rotor core 11 for which the estimated lamination thickness Te has been calculated (step S104).

The rotor core 11 of which the lamination thickness Tm is measured in step S104 is formed by, for example, laminating the first block 21 to the sixth block 26 by an operator. The rotor core 11 may be formed through rotational lamination of the laminated blocks 20. In step S104, for example, the lamination thicknesses Te1, Te2 of the rotor core 11 for which the estimated lamination thicknesses Tm1, Tm2 have been calculated are measured.

Next, the calculator 68 calculates the corrected value c (c=(Tm−Te)/N) by dividing the difference between the lamination thickness Tm of the rotor core 11 measured in step S104 and the estimated lamination thickness Te, by the number N of laminations of the first iron core pieces Wa of the rotor core 11 (step S105). The corrected value c may be positive or negative.

In step S105, for example, the calculator 68 calculates a corrected value c1 based on the difference between the lamination thickness Tm1 and the estimated lamination thickness Te1, and calculates a corrected value c2 based on the difference between the lamination thickness Tm2 and the estimated lamination thickness Te2. In step S105, the average value of the corrected values c1, c2 may be used as the corrected value c.

Then, the calculator 68 calculates a corrected plate thickness t' (t'=t+c) by adding the corrected value c to the plate thickness t of each punchable portion Wp (step S106). The corrected plate thickness t' is a value obtained by correcting a measurement error in the plate thickness sensor 65 for the plate thickness t, which is a measured value of the plate thickness sensor 65.

In step S106, the calculator 68 adds the same corrected value c to the plate thickness t of each punchable portion Wp located in a single base material Wm. When the type of the base material Wm out of which the first iron core piece Wa is punched is switched to a new one, the calculator 68 calculates a new corrected value c for the new base material Wm. Until the new corrected value c is calculated, the calculator 68 calculates the estimated lamination thickness Te obtained by accumulating the plate thickness t, which is the measured value of the plate thickness sensor 65.

Subsequently, the calculator 68 calculates the estimated lamination thickness Te' (Te'=Σt') of the rotor core 11 by accumulating the corrected plate thicknesses t' (step S107).

In the subsequent block forming step, the pressing device 60 adjusts the number of laminations, which is the number of punched-out first iron core pieces Wa in the laminated block 20, such that the lamination thickness Tm of the rotor core 11 approaches the estimated lamination thickness Te' (step S108). In other words, the pressing device 60 adjusts the number of laminations of the first iron core pieces Wa in the laminated block 20 such that the estimated lamination thickness Te' is closest to the desired lamination thickness in the rotor core 11.

In step S108, the number of laminations of the first iron core pieces Wa is increased or decreased relative to the number of laminations of the first iron core pieces Wa of the first block 21 to the sixth block 26 formed in step S102. In step S108, at least one first iron core piece Wa is increased or decreased in any one of the first block 21 to the sixth block 26. When the corrected value c is sufficiently smaller than the plate thickness t, the first iron core piece Wa is not increased or decreased.

Conveying Step

Figure 28:
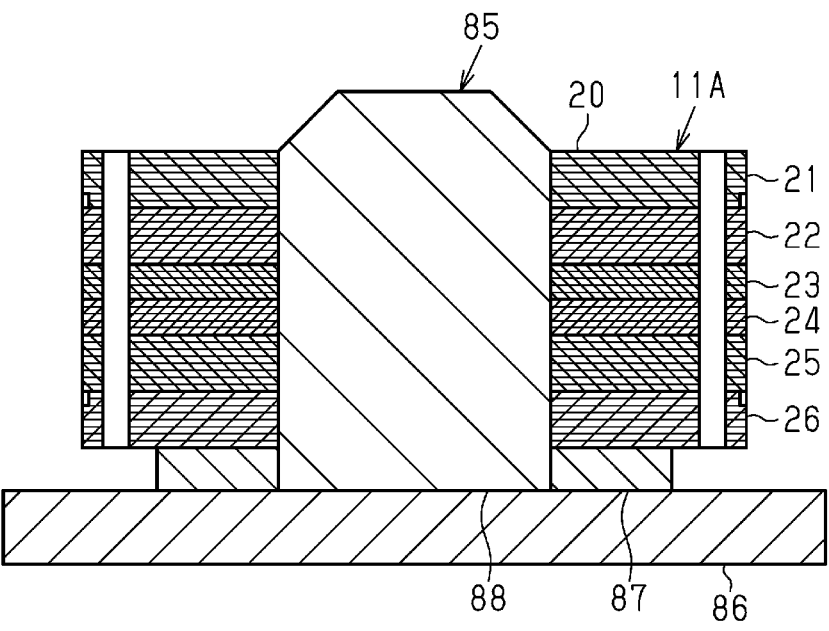
FIG. 28 is a cross-sectional view showing the state in which the laminate is supported by the support jig in the conveying step.
Figure 29:
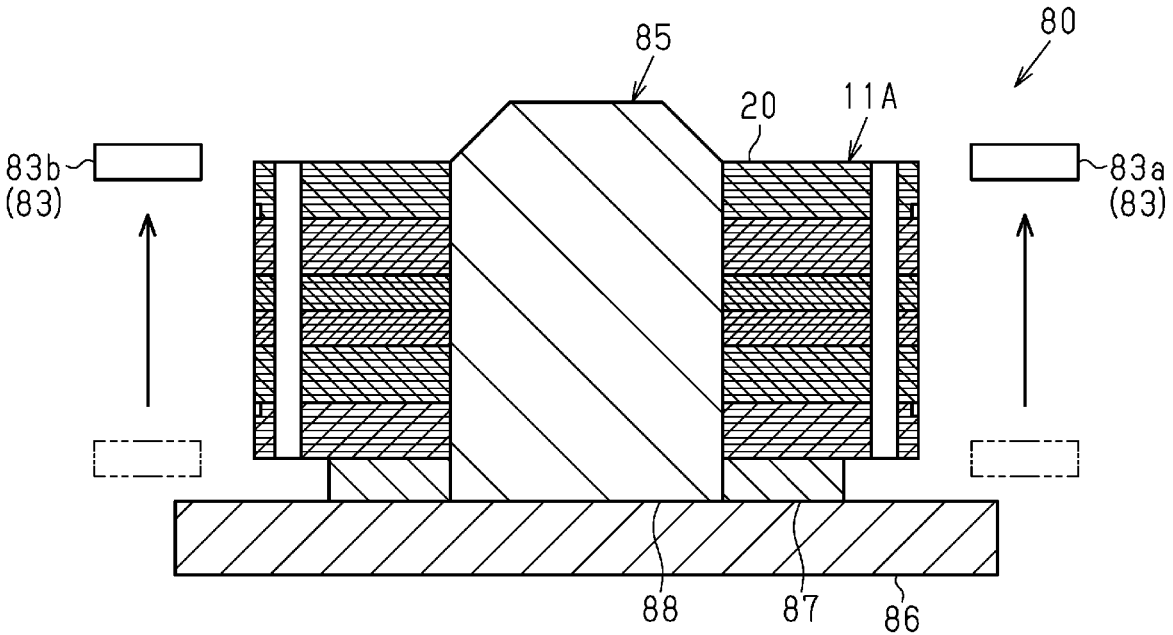
FIG. 29 is a cross-sectional view showing the state in which the detector is raised in the first transfer step.

As shown in FIGS. 28 and 29, in the conveying step, the laminate 11A in which the laminated blocks 20 formed in the block forming step are laminated is conveyed toward the first transfer device 80, with the laminate 11A supported by the support jig 85. The support jig 85 supporting the laminate 11A is conveyed toward the first transfer device 80 by, for example, a motor roller (not shown).

As shown in FIG. 28, on the support jig 85, for example, the laminated blocks 20 are laminated by an operator in an order opposite to the order of laminating the laminated blocks 20 in the rotor core 11. That is, the sixth block 26 to the first block 21 are laminated on the support jig 85 in order from the bottom. In the present embodiment, the rotation phases of the laminated blocks 20 in the laminate 11A are not aligned with each other.

As described above, a gap that permits each of the laminated blocks 20 to rotate relative to the first post 88 is provided between the first post 88 and the central hole 12 of the laminated block 20. This allows the operator to readily fit the laminated blocks 20 into the first post 88. Further, the laminated blocks 20 can be readily extracted out of the support jig 85 in the first transfer step, which will be described later.

First Transfer Step

In the first transfer step, the laminated blocks 20 are individually extracted by the first transfer device 80 out of the support jig 85 supporting the laminate 11A and transferred to the correctness determination device 90.

As shown in FIG. 29, in the first transfer step, first, the detector 83 ascends from the lower end toward the upper end of the laminate 11A. When the detector 83 reaches the upper end of the laminate 11A, the light from the light emitter 83$a$ is received by the light receiver 83$b$. Thus, the detector 83 detects the position of the upper end surface of the uppermost laminated block 20 in the laminate 11A.

Figure 30:
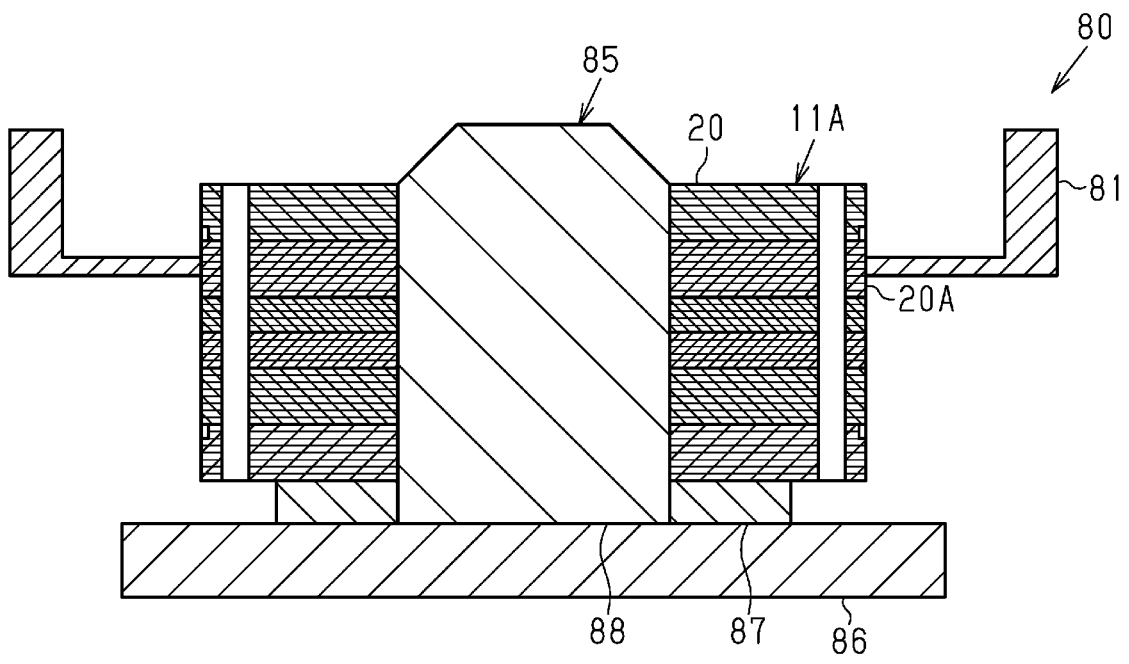
FIG. 30 is a cross-sectional view showing the state in which the laminated block is clamped by the restricting portion in the first transfer step.

As shown in FIG. 30, then, the restricting portion 81 clamps the outer circumferential surface of the portion of the laminate 11A that is separated downward by the specified distance from the position of the upper end surface of the laminate 11A detected by the detector 83. As described above, the specified distance is the sum of the thickness T1 of the uppermost laminated block 20 and half the thickness T2 of the second-tier block 20A. That is, the restricting portion 81 clamps the outer circumferential surface of the central portion of the second-tier block 20A in the axial direction. Thus, the movement of the second-tier block 20A in the axial direction is restricted.

Figure 31:
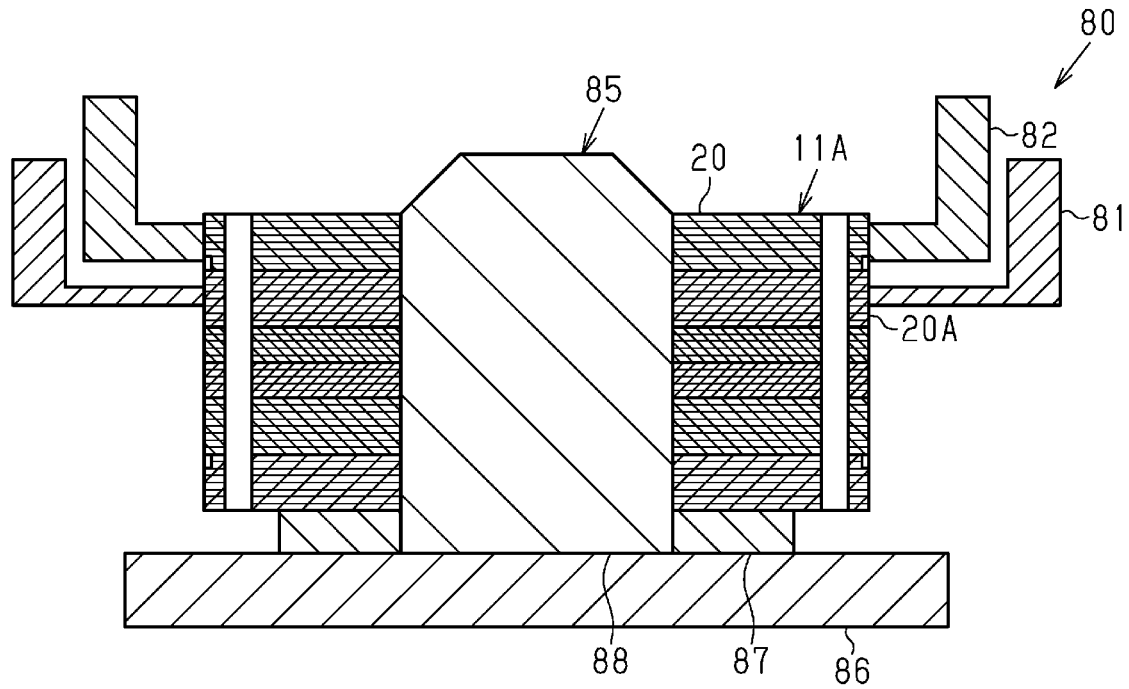
FIG. 31 is a cross-sectional view showing a state in which the transfer portion is clamping the laminated block in the first transfer step.

Next, as shown in FIG. 31, the transfer portion 82 clamps the outer circumferential surface of the portion of the laminate 11A that is separated downward from the position of the upper end surface of the laminate 11A by the distance corresponding to half the thickness T1 of the uppermost laminated block 20, which is detected by the detector 83. That is, the transfer portion 82 clamps the outer circumferential surface of the central portion of the uppermost laminated block 20 in the axial direction.

Figure 32:
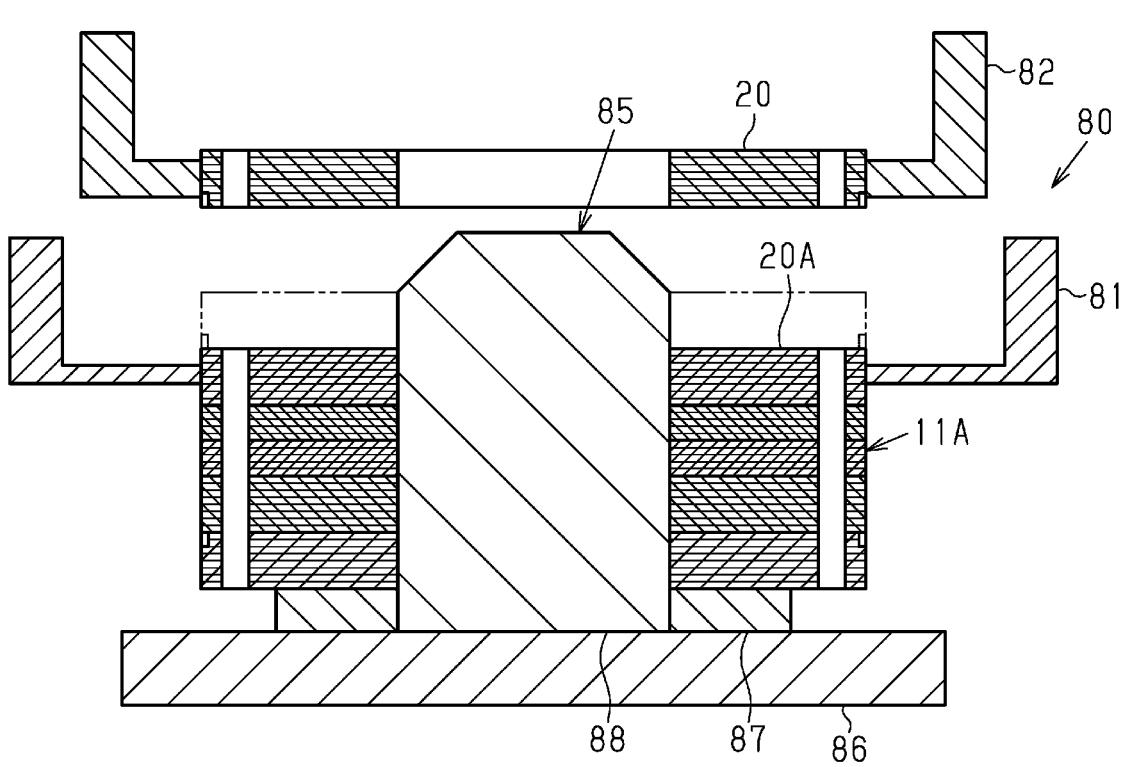
FIG. 32 is a cross-sectional view showing a state in which the transfer portion is transferring the laminated block in the first transfer step.

As shown in FIG. 32, then, the transfer portion 82 clamps and raises the uppermost laminated block 20. Thus, the uppermost laminated block 20 is extracted out of the support jig 85.

Figure 33:
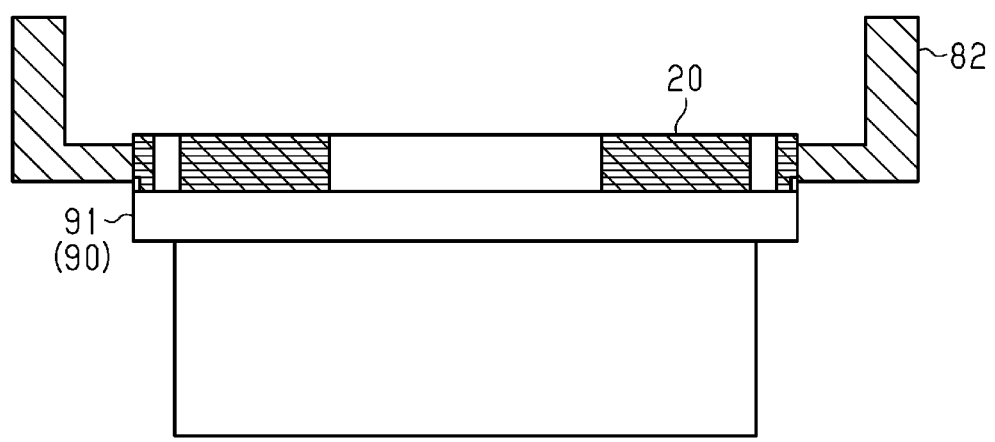
FIG. 33 is a cross-sectional view showing a state in which the transfer portion has transferred the laminated block to the correctness determination device in the first transfer step.

As shown in FIG. 33, the transfer portion 82 mounts the laminated block 20, which has been extracted out of the support jig 85, on the rotary stage 91 of the correctness determination device 90.

In the first transfer step, the uppermost laminated block 20 is sequentially extracted out of the support jig 85 and transferred to the correctness determination device 90. That is, in the first transfer step, the first block 21 to the sixth block 26 are sequentially extracted out of the support jig 85. When the sixth block 26 is extracted, the restricting portion 81 stops operating.

Correctness Determination Step

The correctness determining step determines whether the laminated block 20 that is to be laminated on the lamination jig 101 is a correct laminated block 20. The correctness determining step is an example of a laminated block correctness determining method.

The correctness determining step includes an imaging step, an orientation determining step, a laminating order determining step, a production line determining step, and a type determining step.

Imaging Step

As shown in FIG. 14, in the imaging step, the imaging device 92 captures one end surface of the laminated block 20 in the axial direction mounted on the rotary stage 91. Thus, the imaging device 92 acquires a captured image of the laminated block 20.

Figure 34A:
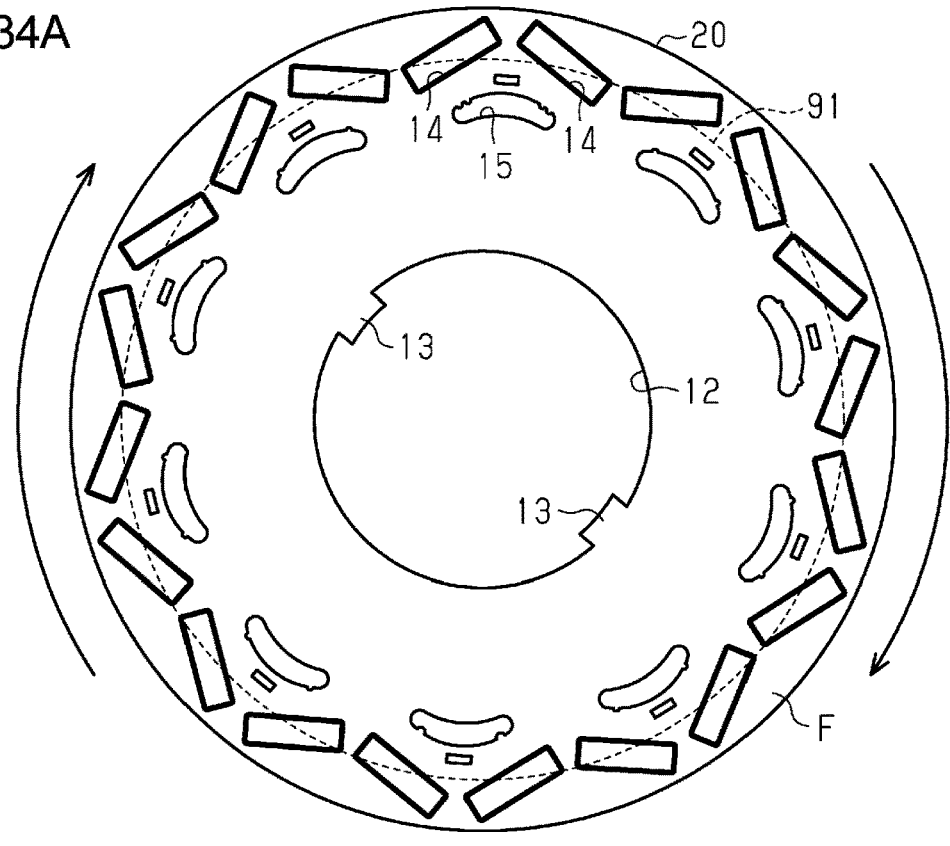
FIG. 34A is a plan view showing a state in which the rotary stage is rotating in the correctness determining step.

As shown in the FIG. 34A, the rotation phases of the laminated blocks 20 transferred to the rotary stage 91 by the first transfer device 80 may be different for each laminated block 20. Thus, the controller 94 detects the position of a key 13 of the laminated block 20 by performing image processing on the captured image acquired from the imaging device 92.

Figure 34B:
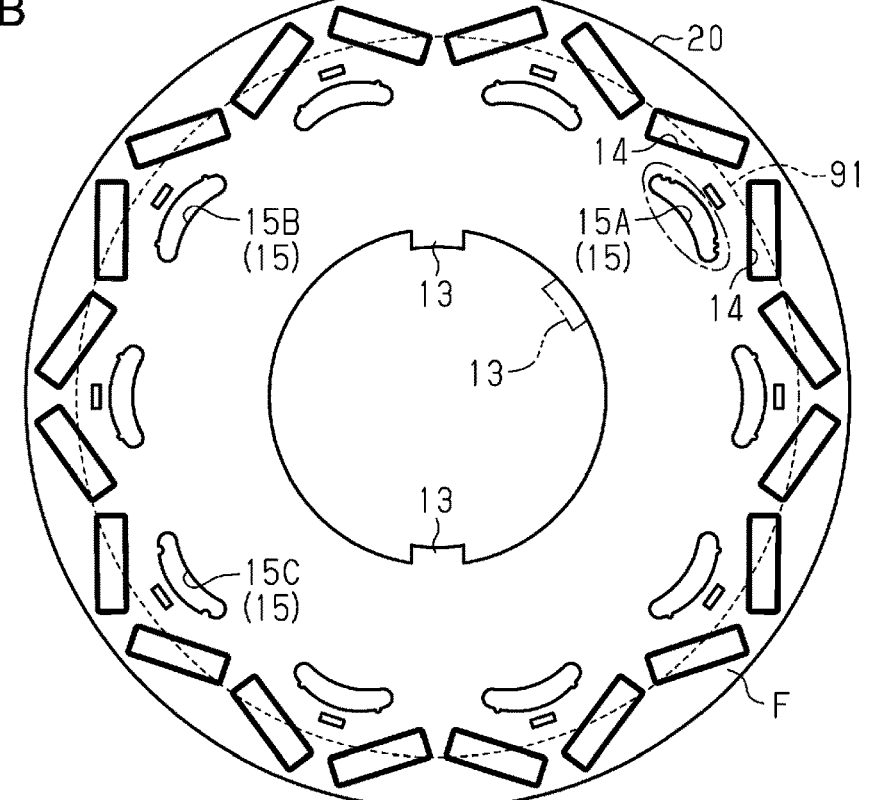
FIG. 34B is a plan view showing a state in which the laminated block is positioned in the correctness determining step.

As shown in FIG. 34B, the controller 94 rotates the rotary stage 91 such that the position of the key 13 becomes a predetermined position. This rotation causes the key 13 of the laminated block 20 to be positioned with respect to the key groove 103$a$ of the second post 103, which will be used in the subsequent rotor core forming step (refer to FIG. 16). Further, when the laminated block 20 includes the welding groove 33, this rotation causes the welding groove 33 to face one of the two displacement sensors 93A, 93B (refer to FIG. 14).

Subsequently, the imaging device 92 acquires a captured image of the laminated block 20 by capturing the end surface of the laminated block 20 that has been positioned. In the orientation determining step, the laminating order determining step, the production line determining step, and the type determining step, the captured image and the registered image of the positioned laminated block 20 are compared with each other.

Orientation Determining Step

In the orientation determining step, the controller 94 determines whether the orientation of the laminated block 20 is correct by comparing the orientation identification portion 43 in the registered image with the orientation identification portion 43 in the captured image. In the orientation determining step, the controller 94 compares the opening shape of the cooling passage 15 in the registered image with the opening shape of the cooling passage 15 in the captured image.

As shown in FIG. 34B, in the orientation determining step, comparison is made for a cooling passage 15 in a predetermined region as one end surface of the laminated block 20 is viewed. The predetermined region includes the cooling passage 15 on the radially outer side of the key 13 that is on the upper side as one end surface of the laminated block 20 is viewed when the key 13 is virtually rotated by 54° in the clockwise direction. In FIG. 34B, the position of the virtually rotated key 13 is indicated by the long dashed double-short dashed line, and the cooling passage 15 in the predetermined region is surrounded by the alternate long and short dashed line.

In the orientation determining step, first, the controller 94 determines whether the cooling passage 15 in the predetermined region of the captured image is the first cooling passage 15A, the second cooling passage 15B, or the third cooling passage 15C. When determining that the cooling passage 15 in the predetermined region is the first cooling passage 15A or the third cooling passage 15C, the controller 94 determines that the imaging surface of the laminated block 20 is the front face F. When determining that the cooling passage 15 in the predetermined region is the second cooling passage 15B, the controller 94 determines that the imaging surface of the laminated block 20 is the rear surface B. When determining that the imaging surface of the laminated block 20 is the rear surface B, the controller 94 determines that the correct laminated block 20 is not transferred to the correctness determination device 90, and stops the operation of the correctness determination device 90.

Laminating Order Determining Step

The laminating order determining step determines whether the laminating order of the laminated blocks 20 is correct from the determination result of a block determining step and the detection result of a groove detecting step. The block determining step determines the type of the laminated block 20 from the captured image of the laminated block 20. The groove detecting step uses the two displacement sensors 93A, 93B to detect the presence or absence of the welding groove 33 in the laminated block 20 and detect the position of the welding groove 33. The laminating order determining step is performed on the laminated block 20 of which the imaging surface is determined as the front surface F in the orientation determining step.

The block determining step and the groove detecting step will now be described in detail.

Block Determining Step

In the block determining step, the controller 94 determines the type of the laminated block 20 by comparing the shape of the front surface F of the laminated block 20 in the registered image with the shape of the front surface F of the laminated block 20 in the captured image. Specifically, the controller 94 determines the type of the laminated block 20 by comparing the shapes of the cooling passages 15 viewed from the front surface F between the registered image and the captured image.

As shown in FIG. 4A, the front surfaces F in the first block 21, the second block 22, the fifth block 25, and the sixth block 26 have substantially the same shape. Thus, it is difficult to determine the types of these laminated blocks 20 from the captured image. As shown in FIGS. 5 and 6, the shape of the front surface F of each of the third block 23 and the fourth block 24 is different from the shapes of the front surfaces F of the other laminated blocks 20. Thus, it is easy to determine the types of these laminated blocks 20 from the captured image.

As shown in FIG. 35, in the block determining step, the controller 94 determines whether the laminated block 20 is the third block 23 or the fourth block 24 and whether the laminated block 20 is neither the third block 23 nor the fourth block 24.

Groove Detecting Step

As shown in FIG. 14, in the groove detecting step, the two displacement sensors 93A, 93B measure the recess in the outer circumferential surface of the laminated block 20. The groove detecting step is performed on the laminated block 20 determined as neither the third block 23 nor the fourth block 24 in the block determining step. That is, the groove detecting step is performed on the first block 21, the second block 22, the fifth block 25, and the sixth block 26, not on the third block 23 or the fourth block 24.

In the groove detecting step, when one of the two displacement sensors 93A, 93B detects a recess having a predetermined depth in the outer circumferential surface of the laminated block 20, the controller 94 determines the recess as the welding groove 33. Further, the controller 94 determines which of the two displacement sensors 93A, 93B has detected the welding groove 33, thereby determining the position of the welding groove 33 in the laminated block 20.

As shown in FIG. 35, when the displacement sensor 93A does not detect the welding groove 33 and the displacement sensor 93B detects the welding groove 33 in the laminated block 20 that has undergone the groove detecting step, the controller 94 determines that the laminated block 20 is the first block 21. In FIG. 35, to facilitate understanding, the displacement sensor 93A is referred to as the upper sensor, and the displacement sensor 93B is referred to as the lower sensor.

When the displacement sensor 93A detects the welding groove 33 and the displacement sensor 93B does not detect the welding groove 33 in the laminated block 20 that has undergone the groove detecting step, the controller 94 determines that the laminated block 20 is the sixth block 26.

When neither of the displacement sensors 93A, 93B detects the welding groove 33 in the laminated block 20 that has undergone the groove detecting step, the controller 94 determines that the laminated block 20 is the second block 22 or the fifth block 25.

In the laminating order determining step, the controller 94 determines that the laminating order of the laminated block 20 is correct when the value of the number of determinations counted by the counter matches the lamination number of the laminated block 20 of which the type has been determined. The lamination number indicates the ordinal number of the laminated block 20 in the rotor core 11. The lamination numbers 1 to 6 are set to the first block 21 to the sixth block 26, respectively.

For example, when the number of determinations is 1, the controller 94 determines that the first block 21 having lamination number 1 is a correct laminated block 20.

In the present embodiment, the second block 22 and the fifth block 25 have the same shape. Thus, in the laminating order determining step, the laminating order of the laminated block 20 is determined without distinguishing between the second block 22 and the fifth block 25. Accordingly, for example, when the number of determinations is 2, the second block 22 having lamination number 2 or the fifth block 25 having lamination number 5 is determined as a correct laminated block 20.

When the controller 94 sequentially determines each of the first block 21 to the sixth block 26 as a correct laminated block 20, the value of the number of determinations is set to 1.

In the laminating order determining step, for example, when the laminated block 20 that is determined as being correct or incorrect when the number of determinations is 1 is the second block 22 having laminating number 2, the controller 94 determines that the laminating order of the laminated blocks 20 is incorrect. When determining that the laminating order of the laminated blocks 20 is incorrect, the controller 94 determines that the correct laminated block 20 has not been transferred to the correctness determination device 90 and stops the operation of the correctness determination device 90.

After the laminating order determining step, the controller 94 may rotate the rotary stage 91 by 180° such that the first cooling passage 15A and the third cooling passage 15C are switched to each other. Thus, in the rotor core forming step, which will be described later, the laminated blocks 20 are rotationally laminated.

The laminating order determining step may determine whether the laminating order of the first block 21 and the sixth block 26 is correct only from the detection result of the groove detecting step.

Production Line Determining Step

The production line determining step may determine whether the production line of the laminated block 20 is correct by comparing the line identification portion 44 in the registered image with the line identification portion 44 in the captured image. In other words, the production line determining step determines whether the laminated block 20 has been manufactured on a correct production line.

In the production line determining step, the controller 94 compares the opening shape of the first cooling passage 15A in the registered image with the opening shape of the first cooling passage 15A in the captured image. The production line determining step is performed on the laminated block 20 of which the imaging surface has been determined as the front surface F in the orientation determining step.

In the production line determining step, the controller 94 compares the protrusion interval distance of the first cooling passage 15A in the registered image with the protrusion interval distance of the first cooling passage 15A in the captured image. For example, when the correct production line is the first production line M1, the controller 94 determines whether the protrusion interval distance in the captured image is the protrusion interval distance d1 (refer to FIG. 7).

When the protrusion interval distances match between the registered image and the captured image, the controller 94 determines that the production line of the laminated block 20 is correct. When the protrusion interval distances do not match between the registered image and the captured image, the controller 94 determines that the production line of the laminated block 20 is incorrect.

In the production line determining step, when determining that the production line of the laminated block is incorrect, the controller 94 determines that the correct laminated block 20 has not been transferred to the correctness determination device 90 and stops the operation of the correctness determination device 90.

Type Determining Step

The type determining step determines whether the type of the laminated block 20 is correct by comparing the type identification portion 45 in the registered image with the type identification portion 45 in the captured image.

In the type determining step, the controller 94 compares two magnet accommodating holes 14 in the registered image with two magnet accommodating holes 14 in the captured image. The type determining step is performed on the laminated block 20 of which the imaging surface has been determined as the front surface F in the orientation determining step.

In the type determining step, the controller 94 compares the identification angle formed by the two magnet accommodating holes 14 in the registered image with the identification angle formed by the two magnet accommodating holes 14 in the captured image. For example, when the correct type is the first type V1, the controller 94 determines whether the identification angle in the captured image is the identification angle θ1 (refer to FIG. 4A).

When the identification angles match between the registered image and the captured image, the controller 94 determines that the type of the laminated block 20 is correct. When the identification angles do not match between the registered image and the captured image, the controller 94 determines that the type of the laminated block 20 is incorrect.

In the type determining step, when determining that the type of the laminated block is incorrect, the controller 94 determines that the correct laminated block 20 has not been transferred to the correctness determination device 90 and stops the operation of the correctness determination device 90.

As described above, prior to the rotor core forming step, it is determined whether the laminated block 20 that is to be laminated on the lamination jig 101 is a correct laminated block 20.

In the correctness determining step of the present embodiment, the orientation determining step, the laminating order determining step, the production line determining step, and the type determining step are performed on the basis of a single captured image of the aligned laminated block 20. Thus, the number of times the aligned laminated block 20 is captured is only one.

Figure 36:
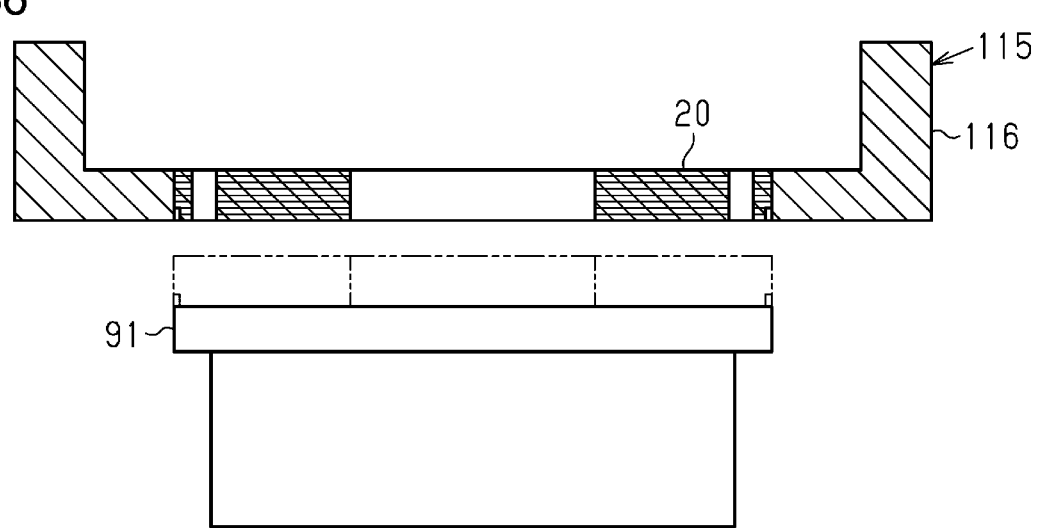
FIG. 36 is a cross-sectional view showing a state in which the second transfer device is transferring the laminated block from the correctness determination device.

As shown in FIG. 36, the laminated block 20 determined as a correct laminated block 20 in the correctness determining step is conveyed toward the lamination jig 101 by the second transfer device 115.

Rotor Core Forming Step

The rotor core forming step forms the rotor core 11 by laminating the laminated blocks 20 while supporting them with the lamination jig 101.

The rotor core forming step includes a lifting step, a fitting step, and a laminating step.

Lifting Step

Figure 37:
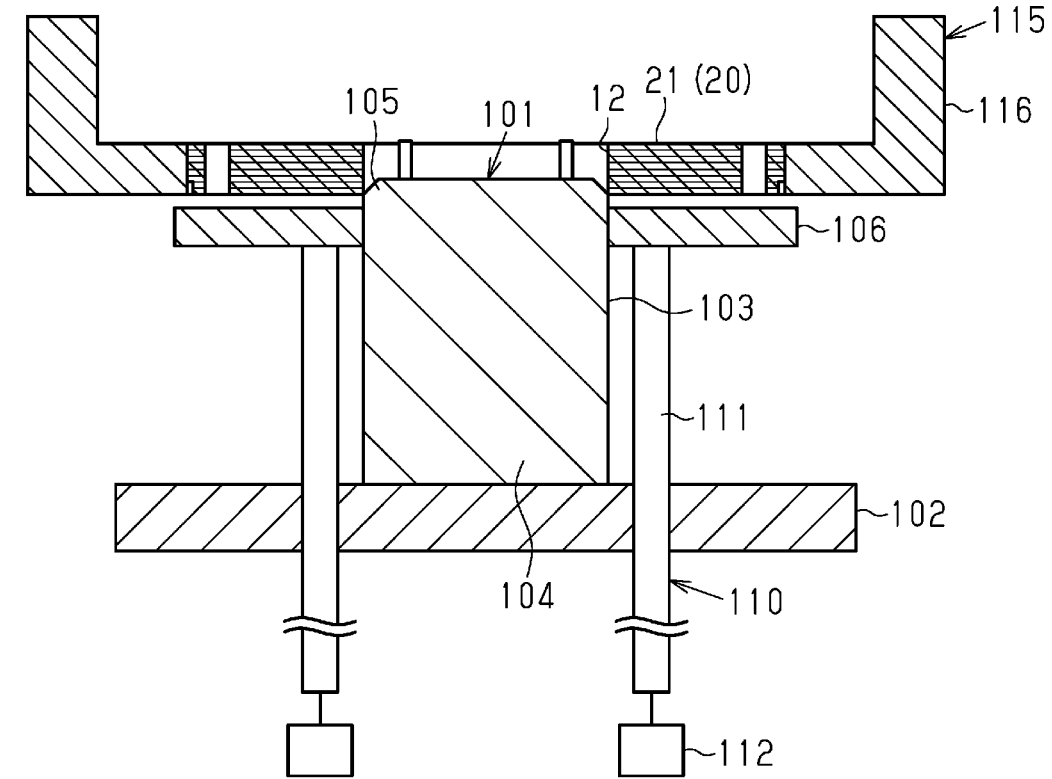
FIG. 37 is a cross-sectional view showing a state immediately before the first block is fitted into the lamination jig in the rotor core forming step.

As shown in FIG. 37, in the lifting step, the lifting mechanism 110 is operated to lift the mounting table 106. The position of the upper surface of the lifted mounting table 106 is lower than the position of the tapered portion 105 of the second post 103.

Fitting Step

In the fitting step, the first block 21 to the sixth block 26 conveyed from the correctness determination device 90 are sequentially fitted into the second post 103 by the second transfer device 115.

As described above, in the correctness determining step, the keys 13 of the laminated block 20 and the key grooves 103a of the second post 103 are aligned with each other. This allows the second transfer device 115 to fit the laminated block 20 into the second post 103 by moving the laminated block 20 up and down and in a perpendicular direction.

In the fitting step, first, the two clamping portions 116 of the second transfer device 115 cause the first block 21 to fall from above the lamination jig 101 with the mounting table 106 lifted, thereby fitting the first block 21 into the second post 103.

Specifically, the two clamping portions 116 clamping the first block 21 is lowered from above the second post 103. The clamping portion 116 stops with only the tapered portion 105 of the second post 103 located inside the central hole 12 of the first block 21.

Figure 38:
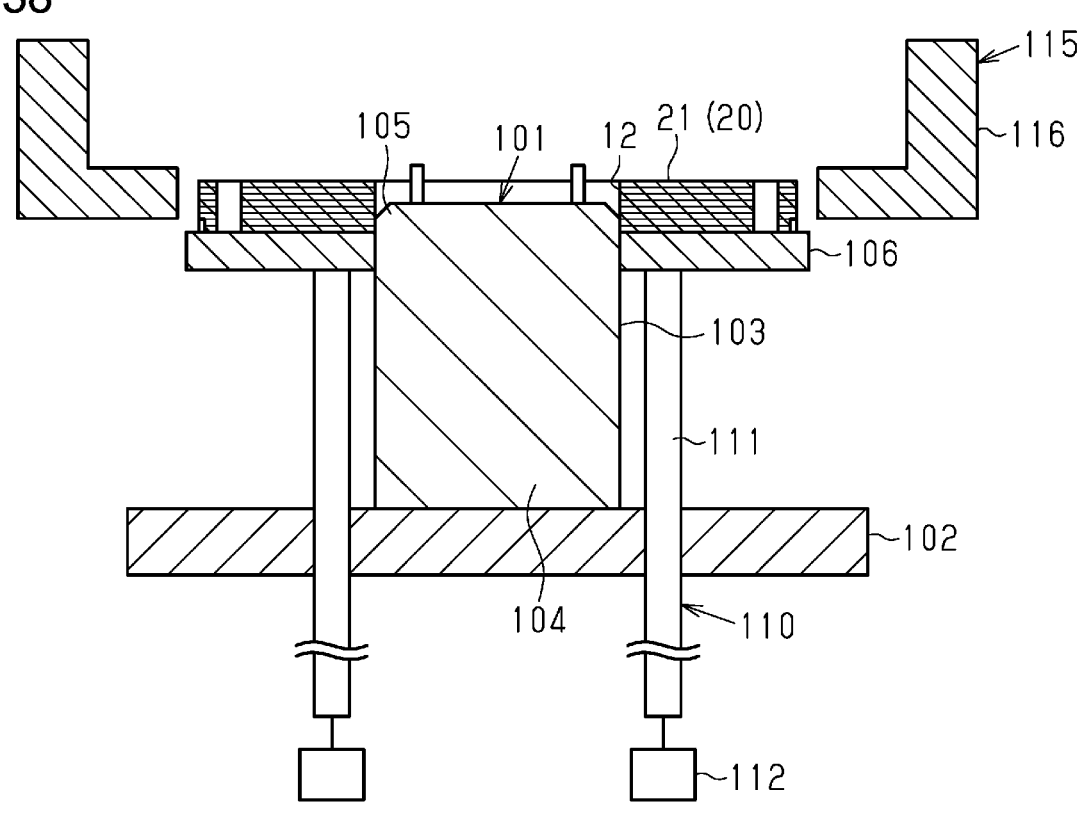
FIG. 38 is a cross-sectional view showing a state in which the first block is mounted on the mounting table in the rotor core forming step.

As shown in FIG. 38, then, the two clamping portions 116 release the clamped first block 21 to cause the first block 21 to fall along the second post 103. Thus, the first block 21 is fitted into the second post 103 and mounted on the upper surface of the mounting table 106.

Laminating Step

Figure 39:
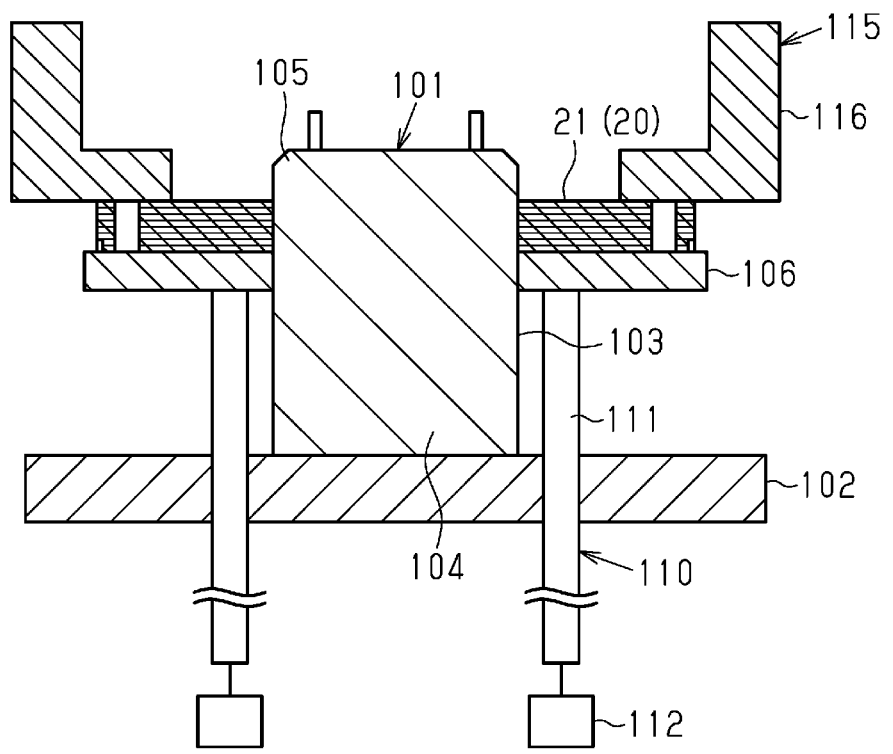
FIG. 39 is a cross-sectional view showing a state in which the first block is pressed by the second transfer device in the rotor core forming step.

As shown in FIG. 39, in the laminating step, first, the two clamping portions 116 are lifted above the second post 103 and then moved toward each other. Accordingly, the lower surface of each of the two clamping portions 116 faces the upper surface of the first block 21. Thereafter, the two clamping portions 116 are lowered toward the first block 21 so that the upper surface of the first block 21 is pressed toward the mounting table 106.

When the two clamping portions 116 press the upper surface of the first block 21, the mounting table 106 is lowered by the same distance as the distance by which the two clamping portions 116 press the first block 21. That is, the upper surface of the first block 21 is pressed by the two clamping portions 116 with the lower surface of the first block 21 supported by the mounting table 106.

Figure 40:
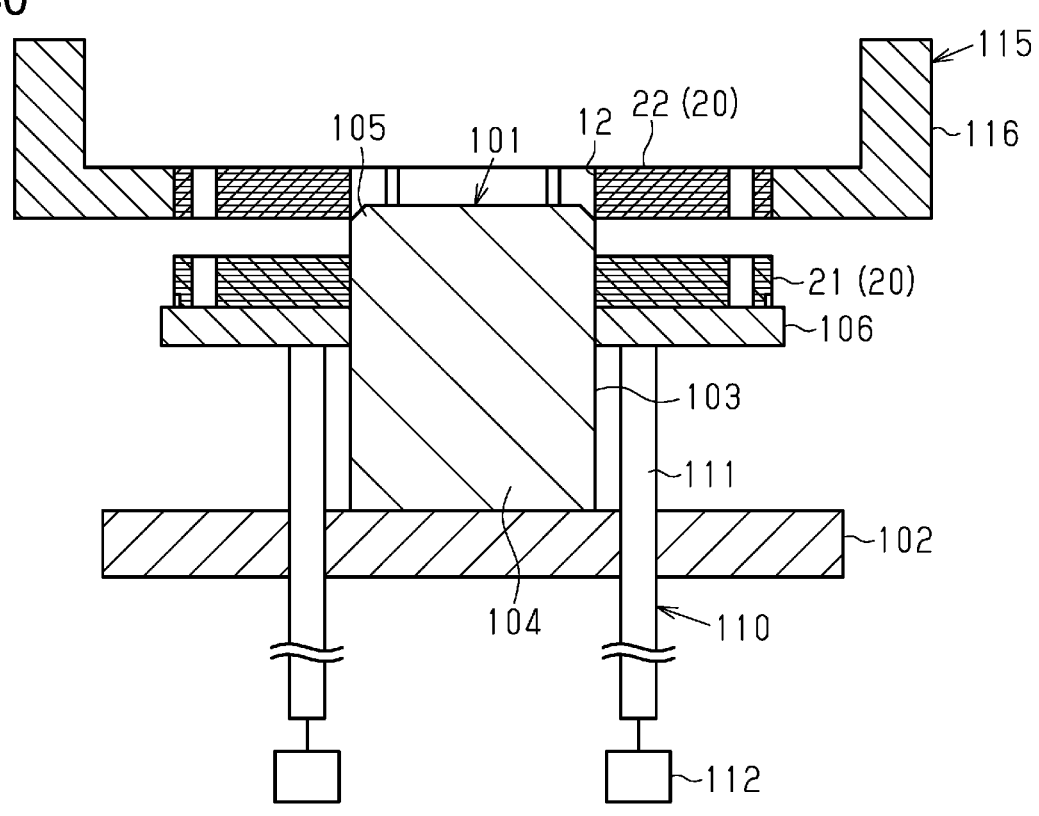
FIG. 40 is a cross-sectional view showing a state in which the second block is transferred by the second transfer device in the rotor core forming step.

As shown in FIG. 40, subsequently, in the same manner as the first block 21, the two clamping portions 116 cause the second block 22 to fall from above the lamination jig 101, thereby fitting the second block 22 into the second post 103.

Figure 41:
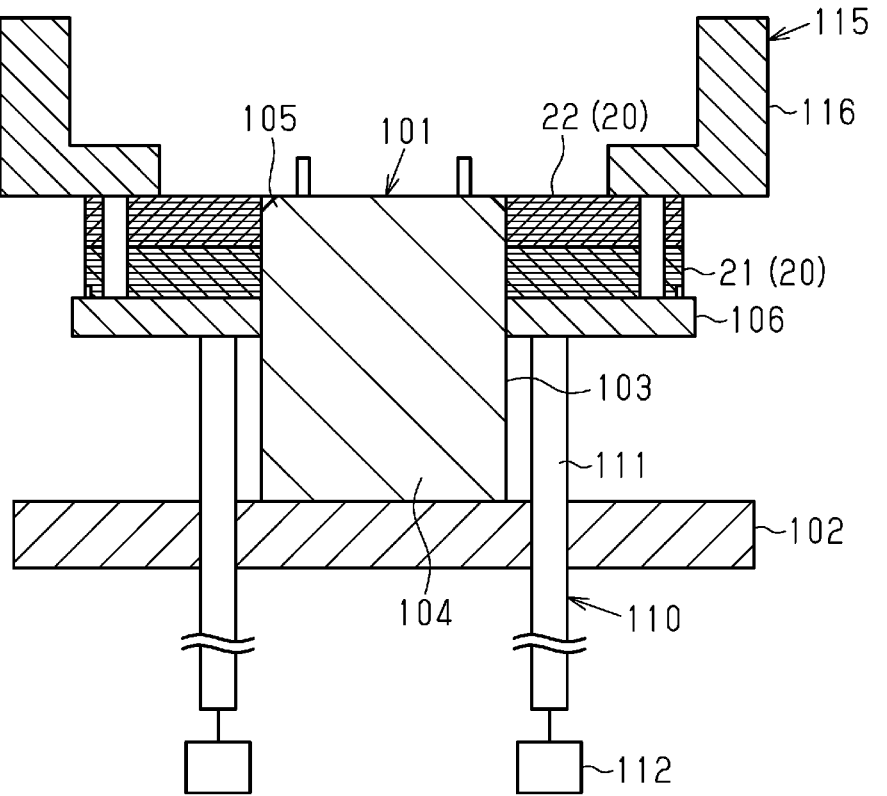
FIG. 41 is a cross-sectional view showing a state in which the second block is pressed by the second transfer device in the rotor core forming step.

As shown in FIG. 41, then, in the same manner as the first block 21, the two clamping portions 116 press the upper surface of the second block 22, and the mounting table 106 falls down.

Figure 42:
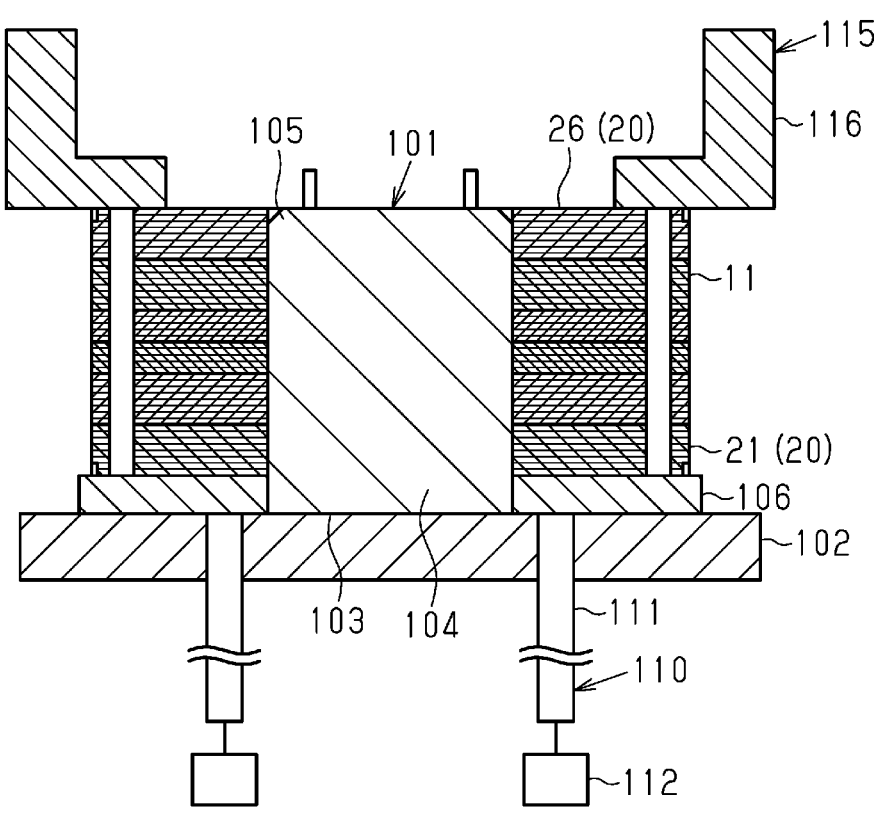
FIG. 42 is a cross-sectional view showing a state in which the sixth block is pressed by the second transfer device in the rotor core forming step.

As shown in FIG. 42, as described above, each time the laminated block 20 is fitted into the second post 103, the two clamping portions 116 press the upper surface of the laminated block 20 and the mounting table 106 falls down. Accordingly, the rotor core 11 supported by the lamination jig 101 is formed by laminating the first block 21 to the sixth block 26 in this order.

As shown in FIG. 15, when the two clamping portions 116 press the upper surface of the laminated block 20 toward the mounting table 106, the load acting on the two clamping portions 116 is measured by the load sensor 117. In the laminating step, when it is determined that the load is larger than a predetermined load, the second transfer device 115 stops the operation of the two clamping portions 116.

Crimping Step

Figure 43:
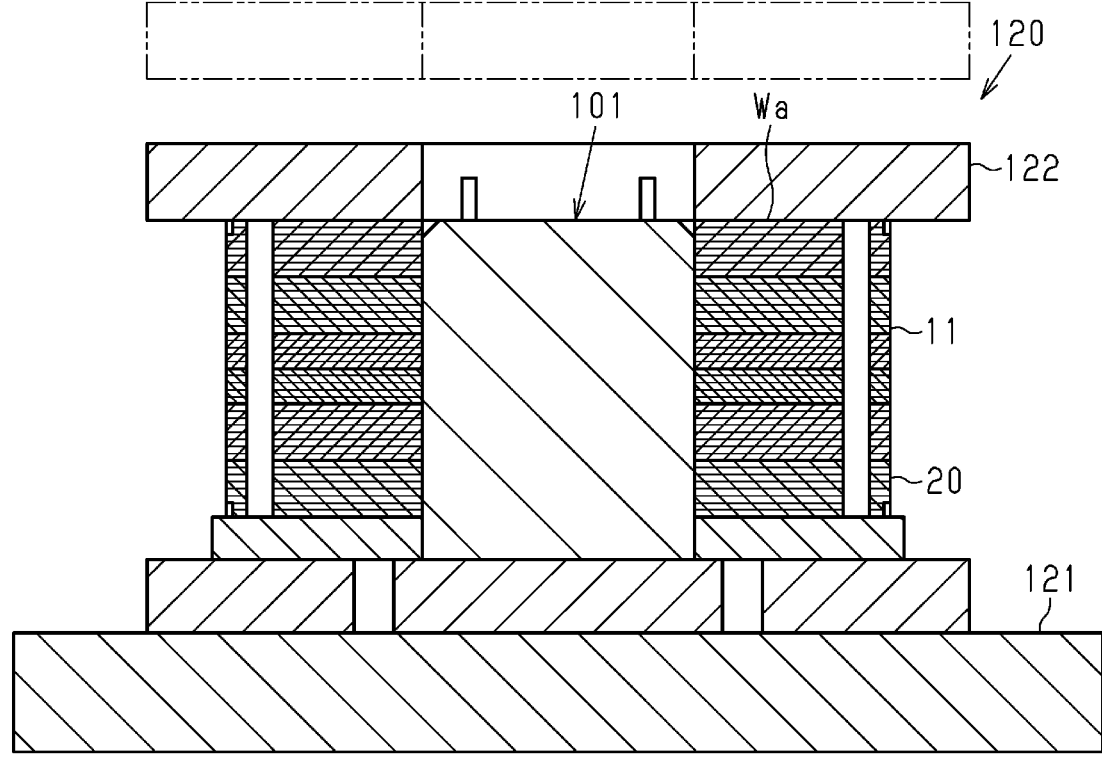
FIG. 43 is a cross-sectional view showing a state in which the first mold presses the rotor core in the crimping step.

As shown in FIG. 43, the crimping step crimps the dowels 18 of adjacent ones of the first iron core pieces Wa in the laminated block 20 to each other by applying pressure to the rotor core 11.

In the crimping step, first, the lamination jig 101 is mounted on the first mold 121. Then, the upper surface of the rotor core 11 supported by the lamination jig 101 is pressed by the second mold 122. Thus, the dowels 18 of the adjacent first iron core pieces Wa in each laminated block 20 are crimped to each other. This reduces the gap between first iron core pieces Wa in the rotor core 11.

In the crimping step, the lamination thickness Tm of the rotor core 11 is indirectly measured from the distance between the first mold 121 and the second mold 122, which has been measured by the measuring device (not shown), with the rotor core 11 pressed.

When the lamination thickness Tm of the rotor core 11 measured in the crimping step is not within a predetermined range, the number N of laminations of the first iron core pieces Wa in the rotor core 11 is adjusted. Specifically, when the lamination thickness Tm of the rotor core 11 exceeds the predetermined range, for example, an operator removes at least one iron core piece Wa from the rotor core 11. When the lamination thickness Tm of the rotor core 11 is less than the predetermined range, for example, an operator adds at least one iron core piece Wa to the rotor core 11. The added first iron core piece Wa does not need to be formed with the dowel 18. When the first iron core piece Wa is added, the first iron core piece Wa is fixed to another first iron core pieces Wa through resin solidification of in the molding step, which will be described below.

Magnet Inserting Step

In the magnet inserting step, each magnet 30 is inserted into a corresponding magnet accommodating hole 14 of the rotor core 11 that has undergone the crimping step.

In the magnet inserting step, the insertion station 161A and the push station 162A, or the insertion station 161B and the push station 162B are operated depending on the type of the rotor 10. A case in which the insertion station 161A and the push station 162A are operated will now be described as an example of the magnet inserting step.

Figure 44:
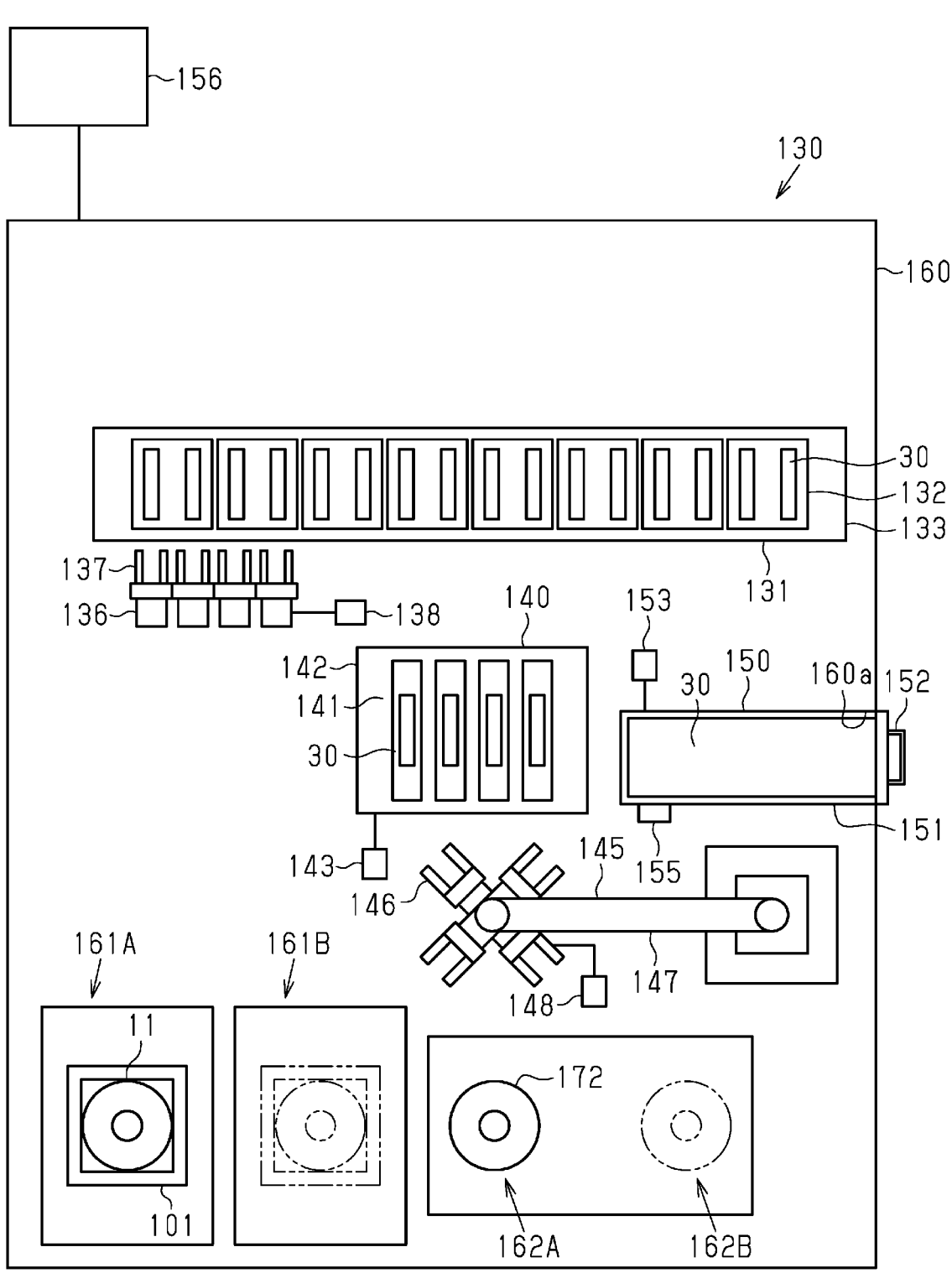
FIG. 44 is a plan view showing a state in which the alignment mechanism is located at the supply position in the magnet inserting step.

As shown in FIG. 44, in the magnet inserting step, first, the sliding table 133 slides so that the position of the supply mechanism 131 is set to the extraction position.

Figure 45:
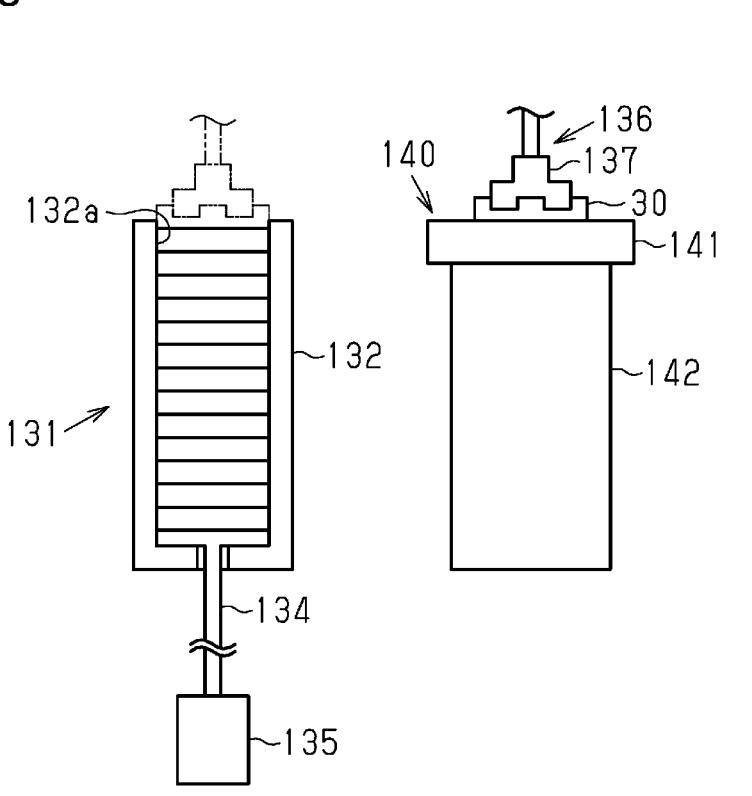
FIG. 45 is a side view showing the state in which the extraction mechanism has mounted the magnet on the mounting portion in the magnet inserting step.

As shown in FIG. 45, next, the extraction mechanism 136 holds and extracts the magnets 30 out of the magazines 132 of the supply mechanism 131 at the extraction position. The extraction mechanism 136 extracts, for example, four magnets 30 out of each of the magazines 132 at a time.

Next, the extraction mechanism 136 individually mounts the magnets 30 on each of the mounting portions 141 of the alignment mechanism 140 at the mounting position. The extraction mechanism 136 then moves toward the magazines 132 to extract the next magnet 30.

Figure 46:
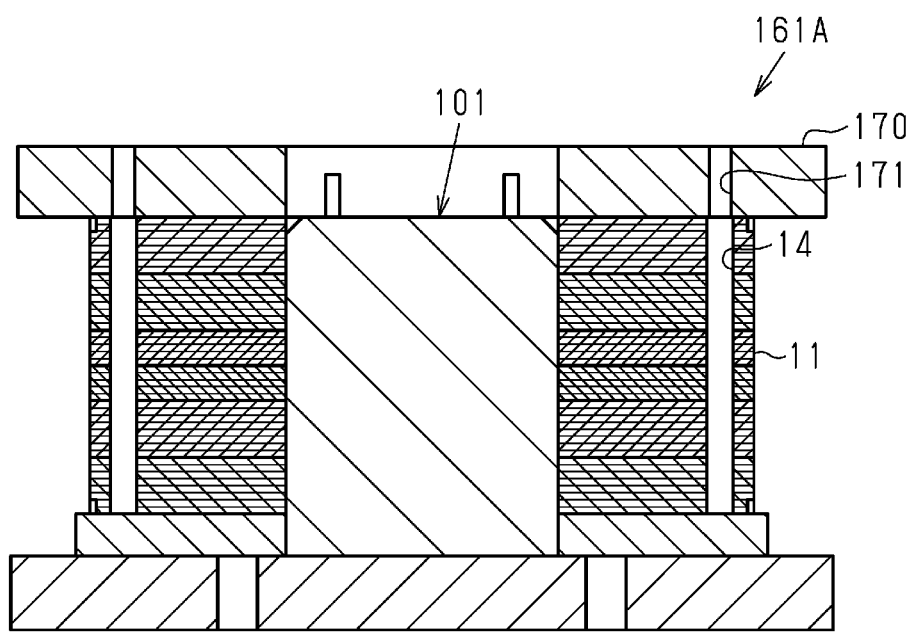
FIG. 46 is a cross-sectional view showing a state in which the guide jig is mounted on the rotor core in the magnet inserting step.

As shown in FIG. 44, then, the alignment mechanism 140 slides from the mounting position to the supply position, and the pitch changer 142 sets the interval between the mounting portions 141 to a predetermined interval. The interval between the mounting portions 141 is determined in advance according to the type of the rotor 10. As shown in FIG. 46, the rotor core 11 supported by the lamination jig 101 is conveyed to the insertion station 161A.

At the insertion station 161A, the guide jig 170 is mounted on the upper surface of the rotor core 11. The guide jig 170 is positioned in advance such that the guide holes 171 are respectively connected to the magnet accommodating holes 14.

Next, the insertion mechanism 145 holds all the magnets 30 mounted on the mounting portion 141, and moves toward the insertion station 161A. When all of the magnets 30 mounted on the mounting portion 141 are held by the insertion mechanism 145, the alignment mechanism 140 moves from the supply position to the mounting position.

Figure 47:
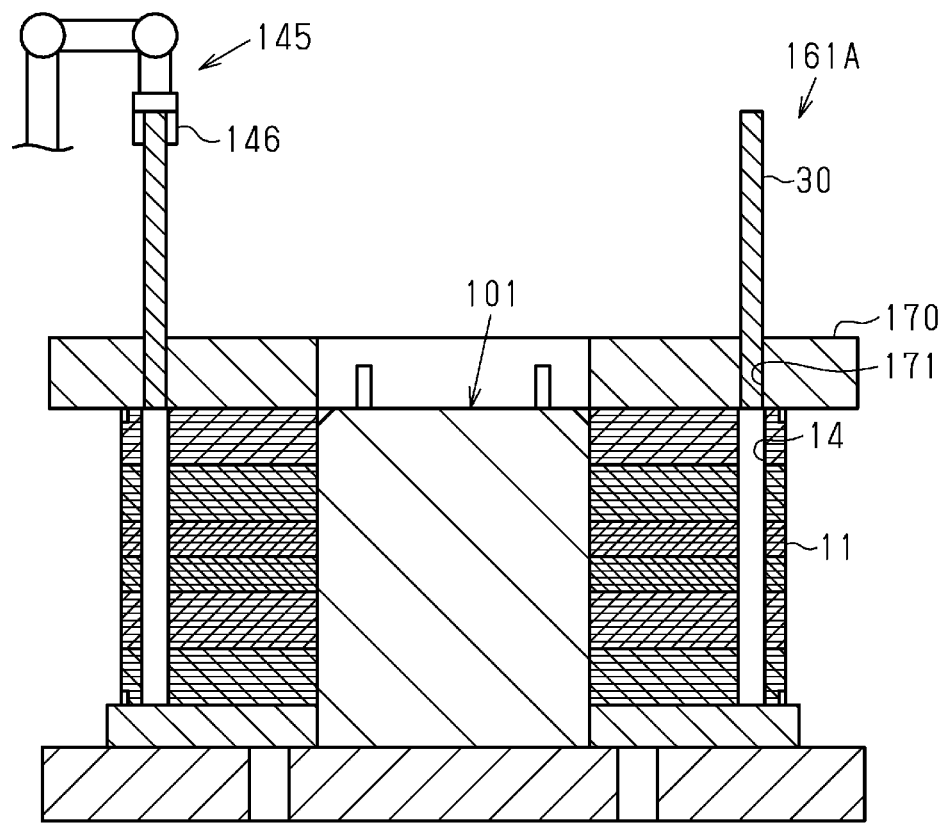
FIG. 47 is a cross-sectional view showing a state in which the magnets are inserted by the guide jig in the magnet inserting step.

As shown in FIG. 47, next, the insertion mechanism 145 respectively inserts the magnets 30 into the magnet accommodating holes 14 of the rotor core 11 using the guide jig 170. Although not illustrated, for example, the insertion mechanism 145 inserts all the magnets 30 held by the chucks 146 into the magnet accommodating holes 14, respectively.

The insertion mechanism 145 repeats a step that holds a magnet 30 on the mounting portion 141 and inserts the magnet 30 into the magnet accommodating hole 14 a number of times. Thus, the magnets 30 are respectively inserted into all the magnet accommodating holes 14 of the rotor core 11. One end of each magnet 30 inserted into a corresponding magnet accommodating hole 14 by the insertion mechanism 145 protrudes from the guide hole 171 of the guide jig 170.

Next, the rotor core 11 with the end of the magnet 30 protruding from the guide hole 171 is conveyed to the push station 162A together with the lamination jig 101.

Figure 48:
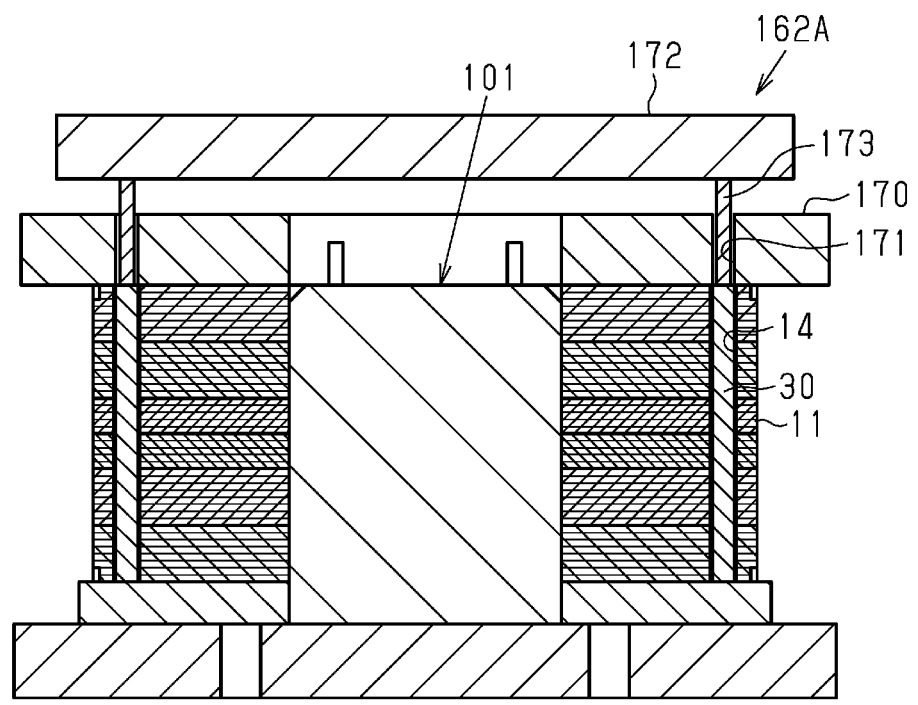
FIG. 48 is a cross-sectional view showing a state in which the magnets are pushed by the push jig in the magnet inserting step.

As shown in FIG. 48, at the push station 162A, the push jig 172 disposed above the guide jig 170 descends so that the magnets 30 respectively protruding from the guide holes 171 are collectively pushed into the magnet accommodating holes 14. Thus, each magnet 30 is accommodated in a corresponding magnet accommodating hole 14.

Subsequently, after the push jig 172 and the guide jig 170 are retracted from the rotor core 11, the rotor core 11 supported by the lamination jig 101 is conveyed to the outside of the magnet insertion device 130.

Remaining Prevention Process

The magnet insertion device 130 temporarily stops operating when the type switching for switching the type of the rotor 10 to be manufactured is performed. The magnets 30 may remain in at least one of the extraction mechanism 136, the alignment mechanism 140, and the insertion mechanism 145. To solve this problem, the controller 156 of the magnet insertion device 130 executes the remaining prevention process when the type switching is performed. The remaining prevention process prevents the magnets 30 of the type manufactured prior to the type switching from remaining inside the magnet insertion device 130.

After the remaining prevention process is executed, the magnets 30 are collected in the collection container 150 in a case in which the magnets 30 are located in the extraction mechanism 136, the alignment mechanism 140, and the insertion mechanism 145 during the type switching.

The procedure of the remaining prevention process will now be described with reference to the flowchart illustrated in FIG. 49.

The remaining prevention process is executed when the controller 156 receives a type switching command signal. The command signal is sent to the controller 156 by, for example, an operator operating a type switch (not shown) disposed in the magnet insertion device 130.

Figure 49:
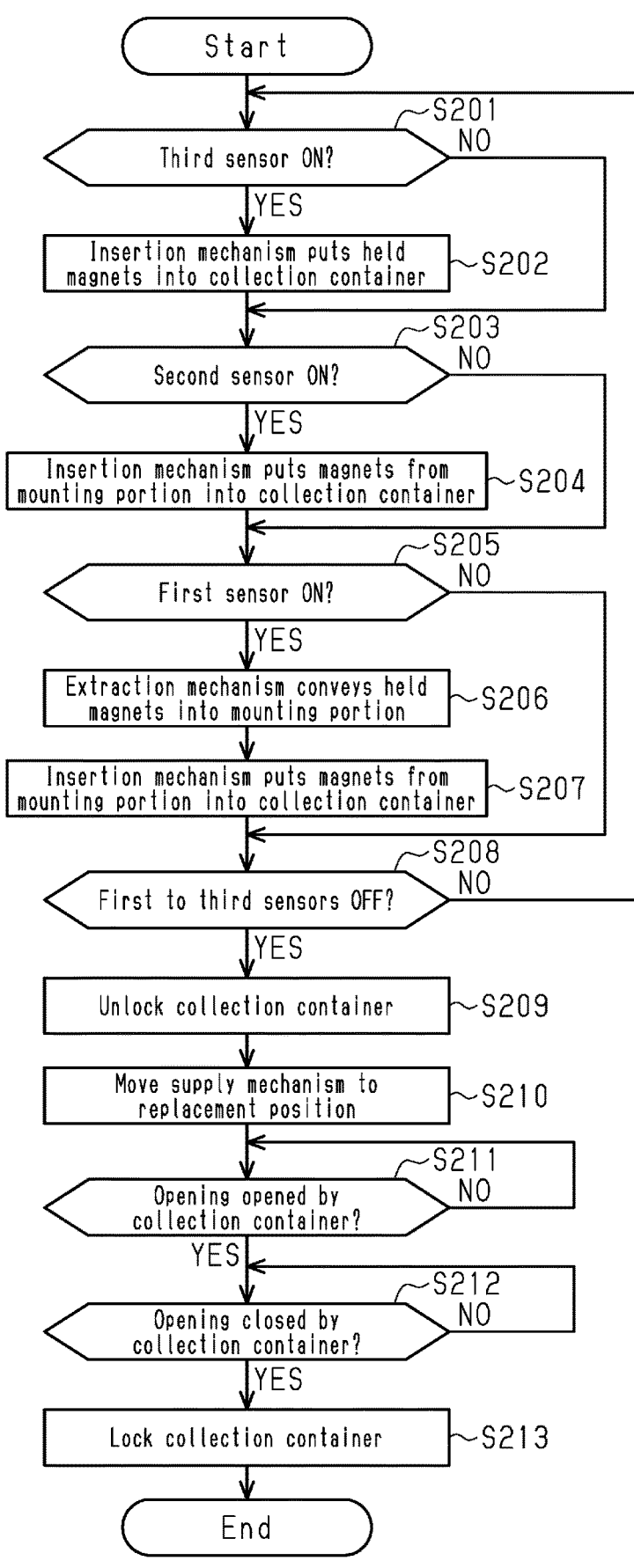
FIG. 49 is a flowchart illustrating the procedure of a remaining prevention process.

As illustrated in FIG. 49, in the remaining prevention process, the controller 156 determines whether the third sensor 148 of the insertion mechanism 145 is ON (step S201). When the third sensor 148 is ON (step S201: YES), that is, when it is determined that the insertion mechanism 145 is holding the magnets 30, the insertion mechanism 145 puts the held magnets 30 into the collection container 150 (step S202). When the third sensor 148 is not ON (step S201: NO), that is, when it is determined that the insertion mechanism 145 is not holding the magnets 30, the controller 156 executes step S203, which will be described later.

Subsequent to step S202, the controller 156 determines whether the second sensor 143 of the alignment mechanism 140 is ON (step S203). When the second sensor 143 is ON (step S203: YES), that is, when it is determined that the magnets 30 are mounted on the mounting portion 141, the insertion mechanism 145 puts the magnets 30 from the mounting portion 141 into the collection container 150 (step S204). When the second sensor 143 is ON in step S203, the position of the alignment mechanism 140 is set to the supply position. When the second sensor 143 is not ON (step S203: NO), that is, when it is determined that the magnets 30 are not mounted on the mounting portion 141, the controller 156 executes step S205, which will be described later.

Subsequent to step S204, the controller 156 determines whether the first sensor 138 of the extraction mechanism 136 is ON (step S205). When the first sensor 138 is ON (step S205: YES), that is, when it is determined that the extraction mechanism 136 is holding the magnets 30, the magnets 30 held by the extraction mechanism 136 are conveyed to the mounting portion 141 (step S206). When the first sensor 138 is ON in step S205, the position of the alignment mechanism 140 is set to the mounting position. When the first sensor 138 is not ON (step S205: NO), that is, when it is determined that the extraction mechanism 136 is not holding the magnets 30, the controller 156 executes step S208, which will be described later.

Subsequent to step S206, the insertion mechanism 145 puts the magnets 30 from the mounting portion 141 into the collection container 150 (step S207). Prior to step S207, the position of the alignment mechanism 140 is set to the supply position.

By performing steps S201 to S207, all the magnets 30 remaining in the extraction mechanism 136, the alignment mechanism 140, and the insertion mechanism 145 are collected in the collection container 150.

Next, the controller 156 determines whether the first sensor 138, the second sensor 143, and the third sensor 148 are OFF (step S208). When the first sensor 138, the second sensor 143, and the third sensor 148 are OFF (step S208: YES), the locking mechanism 155 unlocks the collection container 150 (step S209). Thus, the collection container 150 is slidable from the collection position to the discharge position. When the first sensor 138, the second sensor 143, and the third sensor 148 are not OFF (step S208: NO), the controller 156 executes the process of step S201.

Next, the supply mechanism 131 is moved from the extraction position to the replacement position (step S210). Thus, for example, the magazine 132 is replaced with a new one by an operator. The new magazine 132 accommodates a magnet 30 of a type used after the type switching is performed.

Then, the controller 156 determines whether the collection container 150 has opened the opening 160a of the housing 160 from the detection result of the open-close sensor 153 (step S211). When the open-close sensor 153 is OFF, that is, when it is determined that the collection container 150 has opened the opening 160a (step S211: YES), the controller 156 proceeds to step S212. When determining that the collection container 150 has not opened the opening 160a (step S211: NO), the controller 156 repeats the process of step S211.

In step S212, the controller 156 determines whether the collection container 150 has closed the opening 160a from the detection result of the open-close sensor 153 (step S212). When the open-close sensor 153 is ON, that is, when it is determined that the collection container 150 has closed the opening 160a (step S212: YES), the locking mechanism 155 locks the collection container 150 at the collection position (step S213). When it is determined that the collection container 150 has not closed the opening 160a (step S212: NO), the controller 156 repeats the process of step S212.

When the magnets 30 are collected in the collection container 150 by executing steps S201 to S208, for example, the operator slides the collection container 150 from the collection position to the discharge position and removes the magnets 30 from the collection container 150 after step S209. Since the collection container 150 opens the opening 160a, the process of the controller 156 shifts from step S211 to step S212.

Subsequently, for example, the operator slides the collection container 150 from the discharge position to the collection position after removing the magnets 30. The collection container 150 closes the opening 160a. As a result, the controller 156 shifts from step S212 to step S213.

As described above, when the position of the collection container 150 shifts from the discharge position to the collection position during the type switching, the controller 156 controls the locking mechanism 155 to lock the collection container 150 at the collection position. Further, until the locking is completed, the controller 156 controls the insertion mechanism 145 so as not to insert the magnet 30 into the magnet accommodating hole 14. Specifically, the controller 156 does not operate the insertion mechanism 145 until the locking is completed.

Molding Step

Figure 50:
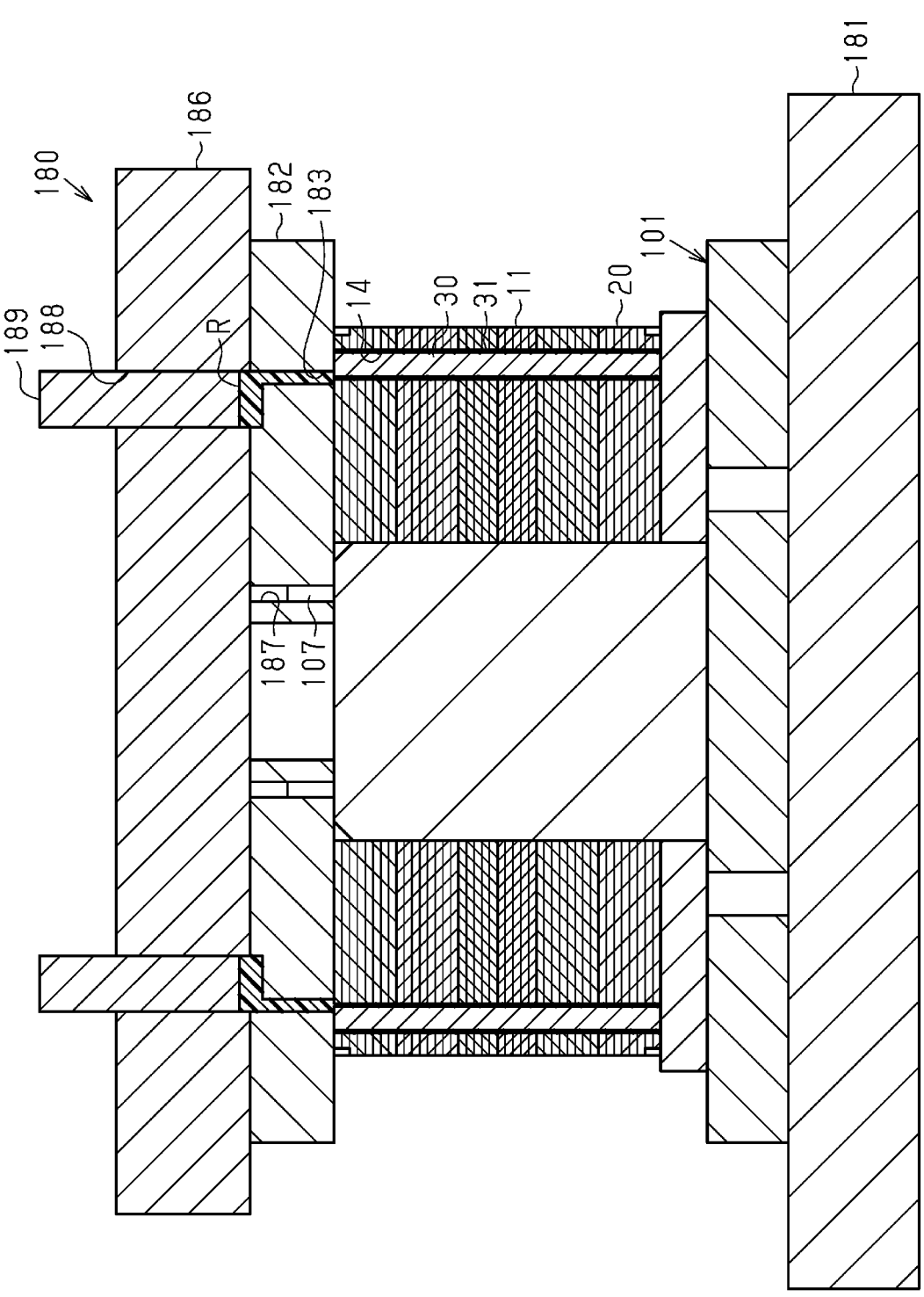
FIG. 50 is a cross-sectional view showing a state in which the magnet accommodating holes are respectively filled with the magnets in the molding step.

As shown in FIG. 50, the molding step fills each magnet accommodating hole 14 with a corresponding resin material 31 of the rotor core 11 and solidifies the resin material 31, thereby fixing the magnets 30 to the rotor core 11.

In the molding step, first, the cull plate 182 is mounted on the upper surface of the rotor core 11 supported by the lamination jig 101. The magnets 30 are accommodated in the rotor core 11 in advance.

Next, the lamination jig 101, the rotor core 11, and the cull plate 182 are put into a heating device (not shown) and preheated to a predetermined temperature. Further, the molding device 180 is preheated to the predetermined temperature.

Then, the lamination jig 101 is mounted on the fixed mold 181 of the molding device 180. Subsequently, the movable mold 186 descends to come into contact with the upper surface of the cull plate 182.

As shown in FIG. 21, next, the resin pellet P held by a robotic hand (not shown) is disposed in the supply passage 188. The resin pellet P disposed in the supply passage 188 is melted by the heat of the preheating.

As shown in FIG. 50, the plungers 189 then descend so that pressure is applied to the resin materials 31 with the resin pellets P in a molten state. Thus, the resin materials 31 are filled into the magnet accommodating holes 14 through the supply ports 183 of the cull plate 182, respectively. The resin materials 31 filled in the magnet accommodating holes 14 are solidified by the heat of the preheating. Thus, the laminated blocks 20 are fixed to each other, and the magnets 30 are fixed to the rotor core 11.

Part of each resin material 31 remains in a corresponding supply port 183 of the cull plate 182 without being filled in a corresponding magnet accommodating hole 14. Thus, the solidified material R of the resin material 31 remains in each supply port 183 of the cull plate 182.

Next, the movable mold 186 ascends. Then, the cull plate 182 on the upper surface of the rotor core 11 is extracted to the outside by the conveying device 195.

Subsequently, the mounting table 106 is pressed upward by pressing portions (not shown) that extend through the second base plate 102 and press the lower surface of the mounting table 106. Thus, the mounting table 106 is separated from the second base plate 102 together with the rotor core 11. In this manner, the rotor core 11 is removed from the lamination jig 101.

Removing Step

In the removing step, the extrusion jig 190 is used to extrude solidified materials R of the resin materials 31 respectively remaining in the supply ports 183 of the cull plate 182, thereby removing the solidified materials R from the cull plate 182.

Figure 51:
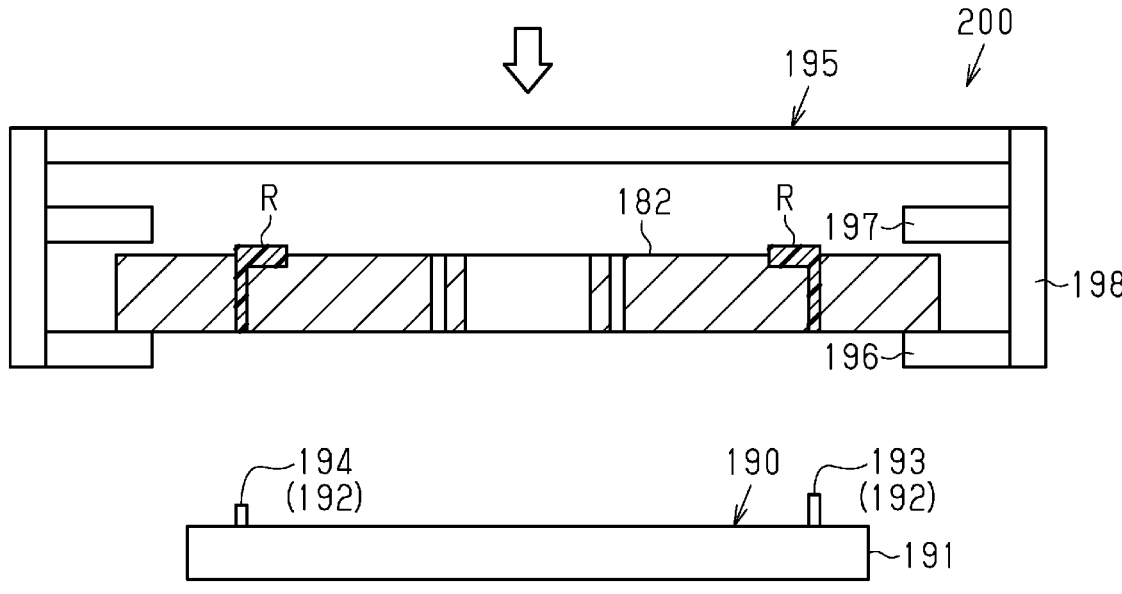
FIG. 51 is a cross-sectional view showing a state in which the conveying device is lowered in the removing step.

As shown in FIG. 51, in the removing step, first, the conveying device 195 conveys the cull plate 182 to a position above the extrusion jig 190, with the cull plate 182 supported by the two supporting portions 196.

Next, when the conveying device 195 descends, the extrusion portions 192 of the extrusion jig 190 come into respective contact with the solidified materials R remaining on the cull plate 182. Specifically, only the first extrusion portions 193 come into respective contact with the solidified materials R remaining on the cull plate 182.

Figure 52:
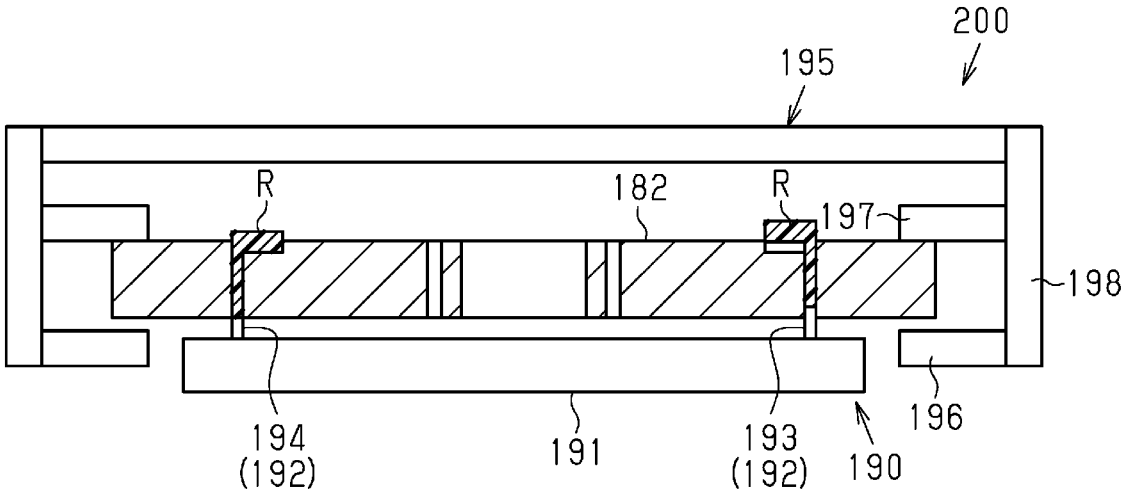
FIG. 52 is a cross-sectional view showing a state in which the solidified materials are respectively extruded out of the cull plate by the first extrusion portions in the removing step.

As shown in FIG. 52, when the conveying device 195 further descends, the upper surface of the cull plate 182 is pressed by the two pressing portions 197. Accordingly, since the solidified materials R are respectively pressed against the first extrusion portions 193, the solidified materials R are extruded from the cull plate 182 by the first extrusion portions 193.

Figure 53:
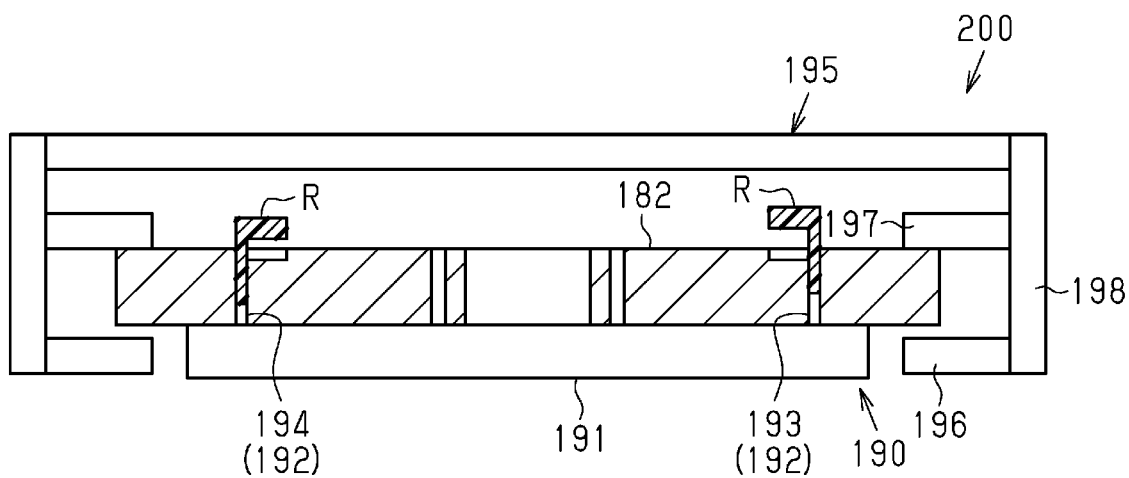
FIG. 53 is a cross-sectional view showing a state in which the solidified materials are respectively extruded out of the cull plate by the second extrusion portions in the removing step.

As shown in FIG. 53, next, when the conveying device 195 further descends, the solidified materials R remaining on the cull plate 182 are respectively pressed against the second extrusion portions 194. As a result, the solidified substances R are respectively extruded from the cull plate 182 by the second extrusion portions 194.

The solidified materials R extruded out of the cull plate 182 are, with their close contact with the cull plate 182 released, located inside the supply ports 183. The solidified materials R extruded out of the cull plate 182 are adsorbed by an adsorption device (not shown) and removed from the cull plate 182.

Welding Step

Figure 54:
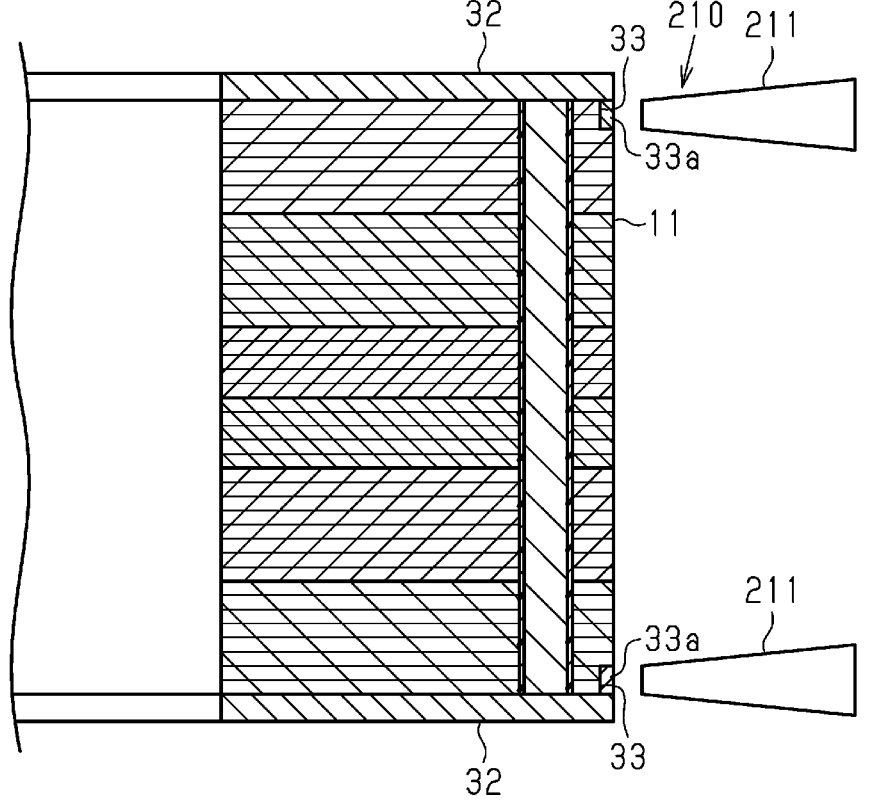
FIG. 54 is a cross-sectional view showing a state in which the rotor core and the end plates are welded to each other in the welding step.

As shown in FIG. 54, the welding step welds the rotor core 11 to the end plates 32.

In the welding step, first, the end plates 32 are disposed on the opposite end surfaces of the rotor core 11 in the axial direction.

Next, the welding torch 211 welds the rotor core 11 to the end plates 32. This creates the beads 33a in the welding grooves 33, respectively.

In the manner described above, the rotor 10 is manufactured.

The operation and advantages of the present embodiment will now be described.

(1) The groove detecting step detects the presence or absence of the welding groove 33 in the laminated block 20 and detects the position of the welding groove 33. The laminating order determining step determines whether the laminating order of the laminated blocks 20 is correct from the detection result of the groove detecting step.

Such a method determines whether the lamination order of laminated blocks 20 is correct by detecting the presence or absence of the welding groove 33 in each laminated block 20 and detecting the position of the welding groove 33. This limits situations in which the laminating order of the laminated blocks 20 are incorrect during lamination of the laminated blocks 20. Thus, erroneous coupling of the laminated blocks 20 is limited.

(2) The production line determining step determines whether the production line of a laminated block 20 is correct by comparing the line identification portion 44 in the registered image with the line identification portion 44 in the captured image.

Such a method determines whether the production line of the laminated block 20 is correct by comparing the line identification portions 44 between the registered image and the captured image. This limits situations in which laminated blocks 20, each having a different production line, are laminated with one another during lamination of the laminated blocks 20. Thus, erroneous coupling of the laminated blocks 20 is limited.

(3) The type determining step determines whether the type of a laminated block 20 is correct by comparing the type identification portion 45 in the registered image with the type identification portion 45 in the captured image.

Such a method determines whether the type of the laminated block 20 is correct by comparing the type identification portions 45 between the registered image and the captured image. This limits situations in which different types of laminated blocks 20 are laminated with one another during lamination of the laminated blocks 20. Thus, erroneous coupling of the laminated blocks 20 is limited.

(4) The orientation determining step determines whether the orientation of the laminated block 20 is correct by comparing the orientation identification portion 43 in the registered image with the orientation identification portion 43 in the captured image.

Such a method determines whether the orientation of the laminated block 20 is correct by comparing the orientation identification portions 43 between the registered image and the captured image. This limits situations in which the orientations of laminated blocks 20 are incorrect during lamination of the laminated blocks 20. Thus, erroneous coupling of the laminated blocks 20 is limited.

(5) The orientation determining step determines whether the orientation of a laminated block 20 is correct by comparing the opening shape of the cooling passage 15 located in the predetermined region in the registered image with the opening shape of the cooling passage 15 located in the predetermined region in the captured image.

The second cooling passage 15B is symmetric to the first cooling passage 15A, which is located at the predetermined region as one end surface of the laminated block 20 is viewed, with respect to the imaginary axis. Thus, even when the laminated block 20 is turned upside down, the cooling passage 15 in the predetermined region is the first cooling passage 15A or the second cooling passage 15B. Accordingly, the orientation of the laminated block 20 is determined by comparing the opening shapes of the cooling passages 15 in the predetermined region between the registered image and the captured image. This limits erroneous coupling of the laminated blocks 20.

Modifications

The present embodiment may be modified as follows. The present embodiment and the following modifications can be combined as long as they remain technically consistent with each other.

The orientation determining step, the production line determining step, and the type determining step may each be performed based on a captured image individually captured in a corresponding step.

The order of performing the type determining step and the production line determining step is not particularly limited.

The type determining step may be omitted from the correctness determining step.

The line identification portion 44 may be defined by the opening of the second cooling passage 15B. In this case, the second cooling passage 15B has multiple identification grooves 41, and the interval between the identification grooves 41 is different for each production line.

The production line determining step may be omitted from the correctness determining step.

The orientation identification portion 43 may be used to identify the orientation of a laminated block 20 from the difference in shape between the dowels 18 or between the magnet accommodating holes 14. Alternatively, the orientation identification portion 43 may be used to identify the orientation of a laminated block 20 from a pattern formed on each of the opposite end surfaces of the laminated block 20.

The registered image may be an image of the front surface F or an image of the rear surface B. In a case in which the registered image is the front surface F, the orientation determining step determines that the orientation of a laminated block 20 is correct when the orientation identification portions 43 in the predetermined region match between the registered image and the captured image. In a case in which the registered image is the rear surface B, the orientation determining step determines that the orientation of a laminated block 20 is correct when the orientation identification portions 43 in the predetermined region do not match between the registered image and the captured image.

The orientation determining step may be omitted from the correctness determining step.

When laminated blocks 20 can be identified from a combination of the presence or absence of the welding groove 33 and the position of the welding groove 33, the lamination order determining step may determine whether the lamination order of the laminated blocks 20 is correct only from the detection result of the groove detecting step. Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A laminated block correctness determining method for determining whether a laminated block to be laminated is a correct laminated block when manufacturing a laminated iron core by laminating cylindrical laminated blocks, each including laminated iron core pieces, wherein
the laminated blocks include a laminated block that has a groove formed on an outer circumferential surface of the laminated block and a laminated block that does not have the groove, and
the laminated block correctness determining method comprises:
detecting presence or absence of the groove in the laminated block, the detecting presence or absence of the groove includes detecting a position of the groove when detecting the groove; and
determining whether a laminating order of the laminated blocks is correct from a detection result of the detecting presence or absence of the groove,
wherein, in a state in which the laminating order of the laminated blocks is determined to be correct from the detection result, the laminated blocks are laminated, and
wherein, in a state in which the laminating order of the laminated blocks is determined to be incorrect from the detection result, the laminated blocks are prevented from being laminated.

2. The laminated block correctness determining method according to claim 1, wherein opposite end surfaces of each of the laminated blocks in an axial direction respectively include line identification portions used to identify a production line of the laminated block, and the laminated block correctness determining method further comprises:

acquiring, with an imaging device, a captured image of the laminated block by capturing one end surface of the laminated block in the axial direction; and determining whether the production line of the laminated block is correct by comparing the line identification portion in a registered image with the line identification portion in the captured image, the registered image being an image of one end surface of the correct laminated block in the axial direction registered in advance.

3. The laminated block correctness determining method according to claim 2, wherein orientation identification portions are respectively disposed on the opposite end surfaces of each of the laminated blocks, the orientation identification portions being used to identify an orientation of the laminated block, and the laminated block correctness determining method further comprises:

determining whether the orientation of the laminated block is correct by comparing the orientation identification portion in the registered image with the orientation identification portion in the captured image.

4. The laminated block correctness determining method according to claim 3, wherein each of the laminated blocks includes:

a central hole;

cooling passages which are arranged at intervals in a circumferential direction, which open in the opposite end surfaces, and through which a cooling medium flows; and a key that protrudes from an inner surface of the central hole, the cooling passages include:

a first cooling passage located in a predetermined region as the one end surface is viewed; and a second cooling passage symmetric to the first cooling passage with respect to an imaginary axis extending in a protruding direction of the key, the second cooling passage having an opening shape that is different from an opening shape of the first cooling passage, the orientation identification portions each include the first cooling passage and the second cooling passage, and the determining whether the orientation of the laminated block is correct includes determining whether the orientation of the laminated block is correct by comparing the opening shape of the cooling passage located in the predetermined region in the registered image with the opening shape of the cooling passage located in the predetermined region in the captured image.

5. The laminated block correctness determining method according to claim 1, wherein opposite end surfaces of each of the laminated blocks in an axial direction respectively include type identification portions used to identify a type of the laminated block, and the laminated block correctness determining method further comprises:

acquiring, with an imaging device, a captured image of the laminated block by capturing one end surface of the laminated block in the axial direction; and determining whether the type of the laminated block is correct by comparing the type identification portion in a registered image with the type identification portion in the captured image, the registered image being an image of one end surface of the correct laminated block in the axial direction registered in advance.

6. The laminated block correctness determining method according to claim 5, wherein orientation identification portions are respectively disposed on the opposite end surfaces of each of the laminated blocks, the orientation identification portions being used to identify an orientation of the laminated block, and the laminated block correctness determining method further comprises:

determining whether the orientation of the laminated block is correct by comparing the orientation identification portion in the registered image with the orientation identification portion in the captured image.

7. The laminated block correctness determining method according to claim 6, wherein each of the laminated blocks includes:

a central hole;

cooling passages which are arranged at intervals in a circumferential direction, which open in the opposite end surfaces, and through which a cooling medium flows; and a key that protrudes from an inner surface of the central hole, the cooling passages include:

a first cooling passage located in a predetermined region as the one end surface is viewed; and a second cooling passage symmetric to the first cooling passage with respect to an imaginary axis extending in a protruding direction of the key, the second cooling passage having an opening shape that is different from an opening shape of the first cooling passage, the orientation identification portions each include the first cooling passage and the second cooling passage, and the determining whether the orientation of the laminated block is correct includes determining whether the orientation of the laminated block is correct by comparing the opening shape of the cooling passage located in the predetermined region in the registered image with the opening shape of the cooling passage located in the predetermined region in the captured image.

* * * * *